(12) United States Patent
Ono et al.

(10) Patent No.: US 7,760,441 B2
(45) Date of Patent: Jul. 20, 2010

(54) ZOOM LENS AND IMAGING APPARATUS INCORPORATING THE SAME

(75) Inventors: Kenji Ono, Shibuya-ku (JP); Keisuke Ichikawa, Shibuya-ku (JP); Fumikazu Kanetaka, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 220 days.

(21) Appl. No.: 12/215,204

(22) Filed: Jun. 24, 2008

(65) Prior Publication Data

US 2009/0067061 A1 Mar. 12, 2009

(30) Foreign Application Priority Data

Jun. 29, 2007 (JP) ............................. 2007-171424

(51) Int. Cl.
*G02B 15/14* (2006.01)
(52) U.S. Cl. ...................................... 359/687
(58) Field of Classification Search ................ 359/676, 359/683, 687
See application file for complete search history.

(56) References Cited

U.S. PATENT DOCUMENTS 5,189,558 A * 2/1993 Ishii et al. .................. 359/687
6,744,571 B2 * 6/2004 Ishii et al. .................. 359/795

FOREIGN PATENT DOCUMENTS

JP 09-184982 7/1997
JP 11-119100 4/1999
JP 2001-133687 5/2001
JP 2006-171055 6/2006

* cited by examiner

*Primary Examiner*—Scott J Sugarman
(74) *Attorney, Agent, or Firm*—Kenyon & Kenyon LLP

(57) ABSTRACT

The invention relates to a zoom lens and an imaging apparatus incorporating the same. More particularly, the invention is concerned with a zoom lens that is downsized for use with imaging apparatus inclusive of video cameras and digital cameras. The zoom lens comprises a positive first group G1, a negative lens group G2, a positive third group G3, a positive fourth group G4 and an aperture stop S. At least the first group G1 and the second group G2 move for zooming from the wide-angle end to the telephoto end. The first group G1, the third group G3 and the aperture stop S are positioned more on the object side in a state of the telephoto end than in a state of the wide-angle end. The spacing sandwiched between the first group G1 and the second group G2 grows wide, the spacing sandwiched between the second group G2 and the third group G3 becomes narrows, and the spacing sandwiched between the third group G3 and the fourth lens group G4 grows wide. The first group G1 comprises one positive lens and one negative lens, the second group G2 comprises one positive lens and two negative lenses, the third group G3 comprises, in order from the object side, a double-convex positive lens convex on both object- and image-side surfaces and a negative meniscus lens convex on the object-side surface and concave on the image-side surface, and the fourth group G4 comprises on positive lens.

43 Claims, 45 Drawing Sheets

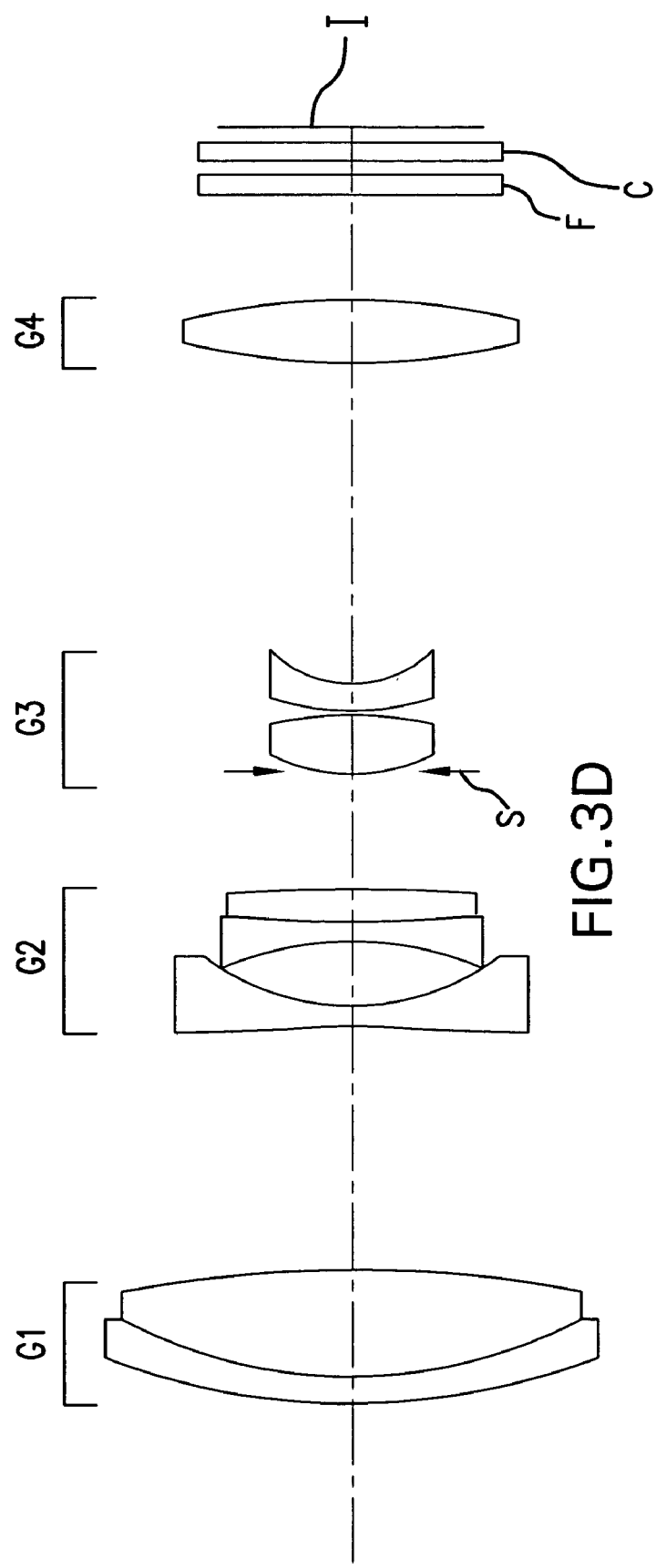

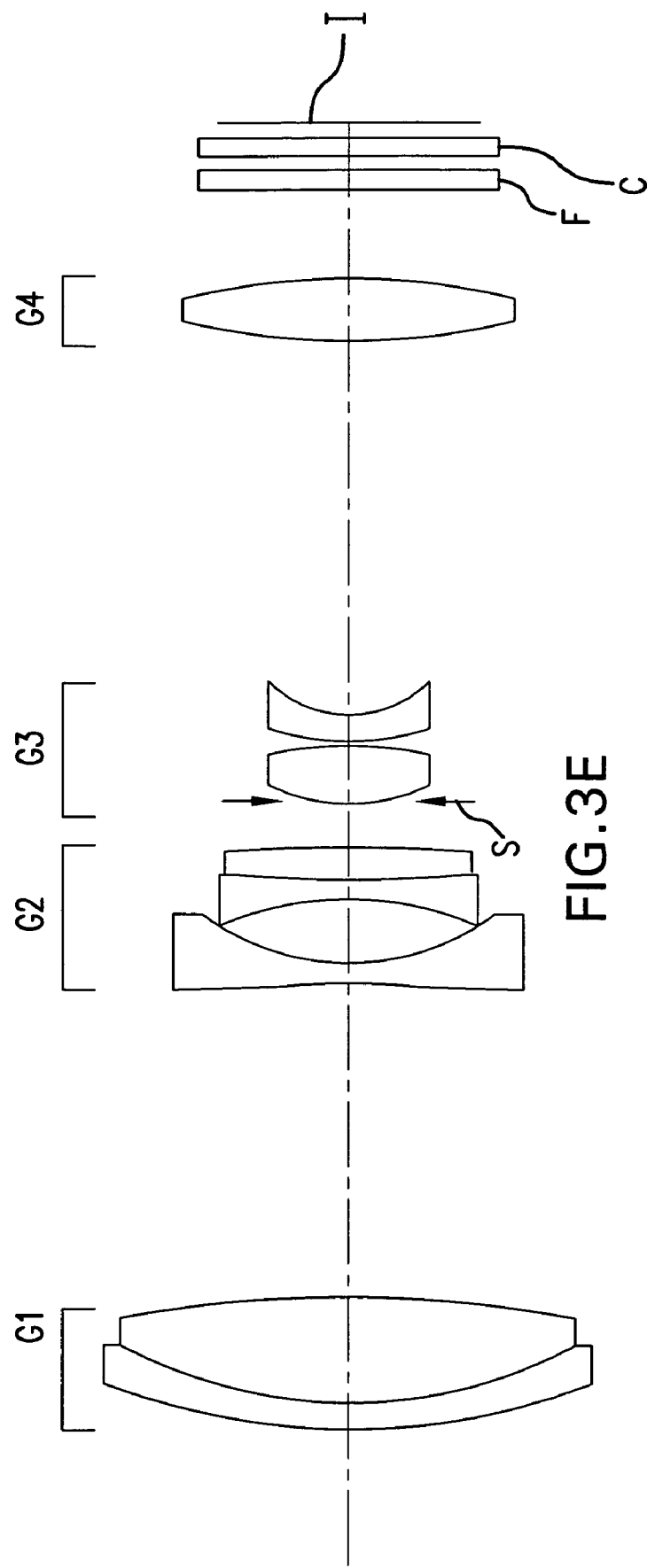

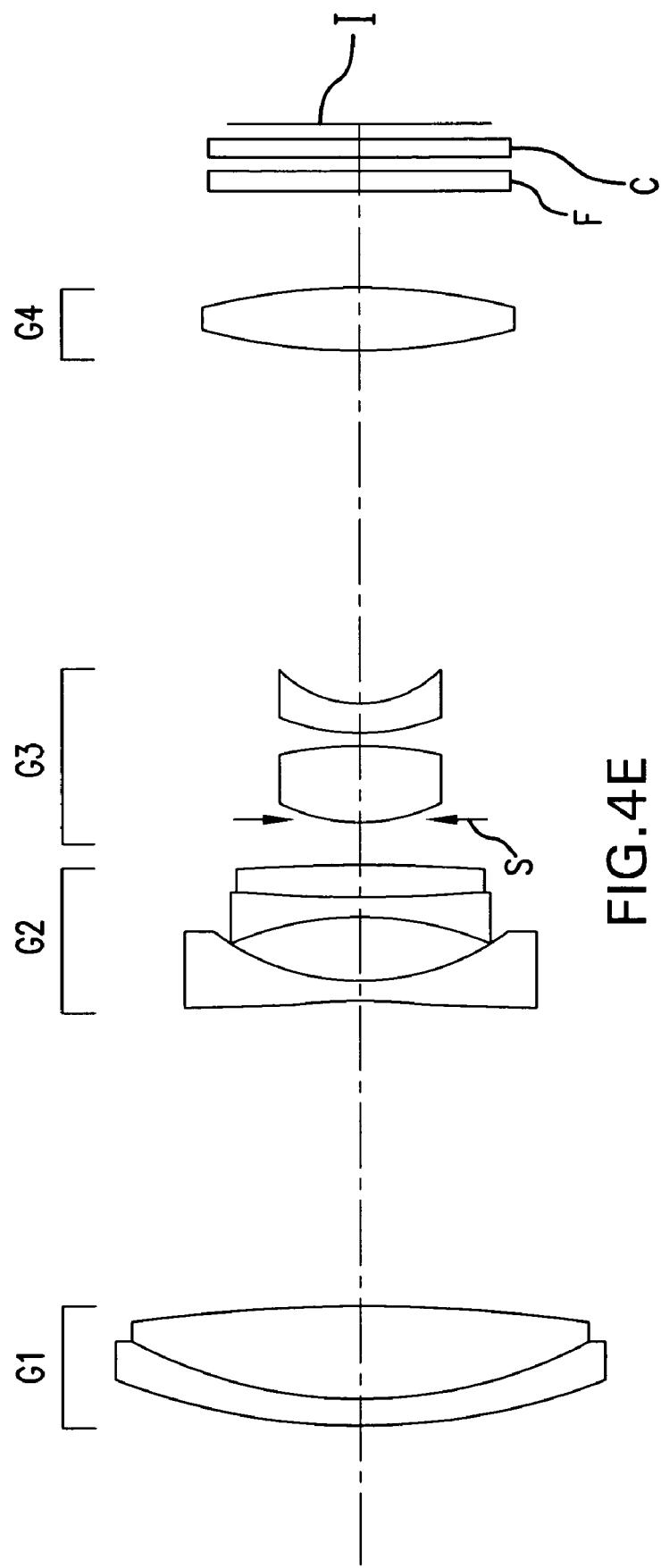

ZOOM LENS AND IMAGING APPARATUS INCORPORATING THE SAME

This application claims benefit of Japanese Application No. 2007-171424 filed in Japan on Jun. 29, 2007, the contents of which are incorporated by this reference.

BACKGROUND OF THE INVENTION

The present invention relates generally to a zoom lens and an imaging apparatus using the same, and more particularly to a zoom lens that is more downsized for use with imaging apparatus inclusive of video cameras and digital cameras.

In recent years, imaging apparatus such as digital cameras designed to take images of subjects using solid-state imaging devices such as CCDs or CMOSs in place of silver-halide film cameras have became mainstream. Further, they have now a wide spectrum of categories from the commercial high-end type to the compact low-end type.

Users of such low-end type digital cameras would enjoy snapping shots over a wide range of scenes at any time in any place. For this reason, preference is now given to small-format digital cameras, especially the ones of the type that can be well put away in the pockets of clothing or baggage, is convenient to carry around, and is slimmed down in their thickness direction.

On the other hand, the compact type digital cameras have had generally a zoom ratio of the order of 3. Now, however, there is a growing demand for digital cameras having a zoom ratio higher than ever before.

For zoom lenses that can have relatively high zoom ratios, there is a zoom lens known in the art, which is of the type that comprises, in order from its object side, a first lens group of positive refracting power, a second lens group of negative refracting power, a third lens group of positive refracting power and a fourth lens group of positive refracting power, wherein the spacing sandwiched between the respective lens groups is changed to change the focal length.

Of such zoom lenses, those having a relatively reduced number of lenses and favorable for size and cost reductions are known from Patent Publications 1 and 2.

For instance, Example 3 of Patent Publication 1 shows a zoom lens made up of a total of 8 lenses: two lenses for the first lens group, two lenses for the second lens group, three lenses for the third lens group, and one lens for the fourth lens group.

For instance, Examples 2 and 3 of Patent Publication 2 show a zoom lens made up of a total of 8 lenses: two lenses for the first lens group, three lenses for the second lens group, two lenses for the third lens group, and one lens for the fourth lens group.

Of camera dimensions, the thickness direction size is primarily determined by a lens barrel; to slim down the camera, it is effective to slim down the lens barrel.

In more recent years, general use has been made of the so-called collapsible mount type where, when the camera is in use, the lens barrel is unfolded from within the cameral body, and when it is not in use, the lens barrel is folded down in the camera body. For this reason, there is a demand for a zoom lens that takes care of the slimming-down of the lens barrel upon received at a lens mount.

So far, zoom lenses used with imaging apparatus such as digital cameras and video cameras have had to meet the requirements for high angles of view, high zoom performance, weight and cost reductions, as is the case with general cameras.

For instance, among zoom lenses suitable for solid-state imaging devices like CCD or CMOS sensors, there is a zoom lens known, which comprises a first lens group having positive refracting power, a second lens group having negative refracting power, a third lens group having positive refracting power and a fourth lens group having positive refracting power, and which is slimmed down in the thickness direction upon received at a lens mount while working for making sure the desired zoom ratio.

The zoom lens shown in Patent Publication 3 is favorable for zooming from the wide-angle end to the telephoto end, because a high-refractive-index glass material is used for a negative lens in the second lens group thereby making sure the second lens group has negative refracting power.

[Patent Publication 1]
JP(A)2001-133687
[Patent Publication 2]
JP (A) 9-184982
[Patent Publication 3]
JP(A)2006-171055

However, these prior zoom lenses have a zoom ratio of at most about 3.

In view of such problems as described above, the invention provides a zoom lens which can easily make sure the desired zoom ratio even with a reduced number of lens components, works for size reductions upon received at a lens mount, and can easily make sure the desired optical performance.

The problem with the glass lens shown in Patent Publication 3 the second problem to be solved by the invention is that lens surface processing costs much, and when the lens surface is processed into an aspheric surface, the fabrication cost soars more.

According to the second aspect of the invention, the aforesaid second problem is solved by the provision of a four- or more-group zoom lens easily capable of making sure the desired zoom ratio, in which the second lens group is easily fabricated at low costs.

Further, the invention provides a zoom lens easily capable of making sure the desired optical performance while keeping fabrication costs low.

Still further, the invention provides an imaging apparatus comprising such a zoom lens.

SUMMARY OF THE INVENTION

The invention provides a zoom lens comprising, in order from an object side thereof, a first lens group of positive refracting power, a second lens group of negative refracting power, a third lens group of positive refracting power and a fourth lens group of positive refracting power, and further comprising an aperture stop located on the object side of said third lens group for the determination of an axial light beam, wherein at least said first lens group and said third lens group move to implement zooming from a wide-angle end to a telephoto end, said first lens group, said third lens group and said aperture stop are positioned more on the object side in a state at said telephoto end than in a state at said wide-angle end, a spacing between said first lens group and said second lens group grows wide, a spacing between said second lens group and said third lens group becomes narrow, a spacing between said third lens group and said fourth lens group grows wide, said first lens group comprises two lenses or one positive lens and one negative lens, said second lens group comprises three lenses or one positive lens and two negative lenses, said third lens group comprises two lenses or one positive lens and one negative lens, said fourth lens group comprises one positive lens, and said third lens group comprises, in order from the object side, a positive lens and a negative lens, wherein said positive lens in said third lens group is a double-convex lens convex on both an object-side surface and an image-side surface, and said negative lens in said third lens group is a meniscus lens convex on an object-side surface and concave on an image-side surface.

Thus, the zoom lens of the + − + + power profile works for making sure the desired zoom ratio because the spacing between the first and the second lens group grows wide, the spacing between the second and the third lens group becomes narrow and the spacing between the third and the fourth lens group grows wide. Especially because the first lens group moves more toward the object side at the telephoto end than at the wide-angle end, it is easy for the second lens group to have a zoom function, and because the third lens group moves more toward the object side at the telephoto end than at the wide-angle end, it is easy for the third lens group to have a zoom function. In this case, if the aperture stop moves more toward the object side at the telephoto end than at the wide-angle end, it is easy for the third lens group to make sure the desired-range of movement. Further, the aperture stop remains close to the third lens group at both the wide-angle end and the telephoto end, working for reducing the diameter and thickness of the third lens group.

In the invention, to reduce chromatic aberrations and spherical aberrations at the first lens group, which are likely to become a problem near the telephoto end as the zoom ratio increases, the first lens group is made up of two lenses: one positive lens and one negative lens. This arrangement works for smaller size and higher zoom ratio because while the first lens group is slimmed down, aberrations occurring at the positive lens can be canceled out by the negative lens.

Keeping the aperture stop close to the third lens group works for reducing the diameter of the third lens group, and the height of light rays incident on the third lens group becoming low is favorable for aberration correction as well.

In the invention, the third lens group is made up of, in order from the object side, a double-convex positive lens and a negative meniscus lens convex on its object-side surface and concave on its image-side surface.

Such arrangement makes it easy for the principal points of the third lens group to be positioned on the object side and to lie close to the second lens group of negative refracting power at the telephoto end, working for making sure the desired zoom ratio. Both convex surfaces of the positive lens and the object-side convex surface of the negative meniscus lens lie back-to-back along the optical axis, so that light beams diverging from the second lens group can converge, working more for diminishing the size of the third lens group in the diametrical direction. And by positioning the concave surface of the negative meniscus lens on the image side, it is possible to cancel out aberrations produced at each convex surface in the third lens group or it is easy to refract off-axis light beams in a direction away from the optical axis to take hold of the height of light rays incident on the fourth lens group, so that the telecentric capability of the zoom lens toward the image side can be improved.

Here, composing the third lens group of two lenses works for slashing its size and cost; however, the application of too much refracting power to that renders it difficult to hold back aberrations. Accordingly, to let the second lens group have a zoom sharing to facilitate holding back aberration then occurring at the second lens group, the second lens group is made up of two negative lenses and one positive lens. This allows the negative refracting power of the second lens group to be shared between two such negative lenses, and aberrations occurring at the negative lens in the second lens group to be canceled out by that positive lens, easily offering a sensible tradeoff between letting the second lens group making sure the zoom sharing and aberration reductions. Further, the negative lens can easily be axially slimmed down: the thickness of the group is less affected than two or more positive lenses are used in the lens group of positive refracting power, working for reducing the size of the zoom lens upon received at a lens mount.

The fourth lens group can have its positive refracting power diminished, because its main purpose is just to adjust the exit pupil; composing the fourth lens group of one positive lens contributes more to size and cost reductions.

Through the correlating requirements, the invention can provide a zoom lens which, even with a reduced number of lens components, facilitates making sure the desired zoom ratio, works for making its size compact upon received at a lens mount, and makes it easy to take hold of optical performance.

For the invention as described above, it is preferable to satisfy at least one, or even two or more, of the following requirements.

Preferably, the inventive zoom lens should satisfy the following condition with respect to the amount of movement of the first lens group.

$$0.3 < \Delta 1G/fw < 3.0 \tag{1}$$

where $\Delta 1G$ is a difference in the position of the first lens group between at the wide-angle end and at the telephoto end, and fw is the focal length of the whole zoom lens system at the wide-angle end.

By abiding by the lower limit of condition (1) to make sure the amount of movement of the first lens group, it is easy to make sure the desired zoom ratio without augmenting the refracting power of the first lens group. This also permits the refracting power of the first lens group to be kept so limited that correction of astigmatism and distortion occurring at the first lens group near the wide-angle end can easily be implemented.

By abiding by the upper limit of condition (1) to limit the amount of movement of the first lens group, the total length of the zoom lens can be slashed and the size of a lens barrel for driving the lens groups can be diminished, working for diminishing the size of the zoom lens upon received at a lens mount.

More preferably, the lower limit of condition (1) should be set at 0.5, especially 1.0.

More preferably, the upper limit of condition (1) should be set at 2.5, especially 2.0.

Preferably, the inventive zoom lens should satisfy the following condition with respect to the amount of movement of the third lens group.

$$0.3 < \Delta 3G/fw < 2.5 \tag{2}$$

where $\Delta 3G$ is a difference in the position of the third lens group between at the wide-angle end and at the telephoto end, and fw is the focal length of the whole zoom lens system at the wide-angle end.

By abiding by the lower limit of condition (2) to make sure the amount of movement of the third lens group, it is easy to make sure the desired zoom ratio without augmenting the refracting power of the third lens group. This also permits the refracting power of the third lens group to be kept so limited that astigmatism and distortion occurring at the third lens group can easily be held back.

By abiding by the upper limit of condition (2) to limit the amount of movement of the third lens group, the total length of the zoom lens can be slashed and the size of the lens barrel for driving the lens groups can be diminished, working for diminishing the size of the zoom lens upon received at the lens mount.

More preferably, the lower limit of condition (2) should be set at 0.5, especially 1.0.

More preferably, the upper limit of condition (2) should be set at 2.0, especially 1.5.

Referring to how to move the first lens group and the fourth lens group, it is preferable that upon zooming from the wide-angle end to the telephoto end, the second lens group and the fourth lens group move.

As the second lens group moves, it facilitates adjustment of the position of the entrance pupil upon zooming, adjustment of the zoom sharing by the second lens group, and adjustment of the amount of aberrations. As the fourth lens group moves, it facilitates adjustment of the position of the exit pupil upon zooming, adjustment of the zoom sharing by the fourth lens group, and adjustment of the amount of aberrations.

Referring to how to move the fourth lens group, it is preferable that the fourth lens group is positioned more on the image side in a state at the telephoto end than in a state at the wide-angle end.

The fourth lens group can also have a zooming action; it eases off the zoom sharing by the second and the third lens group, working for making sure the desired zoom ratio while aberration fluctuations are held back.

Referring to how to move the aperture stop, it is preferable that upon zooming from the wide-angle end to the telephoto end, the aperture stop moves in unison with the third lens group.

There can be a simplified, common lens barrel provided for the movement of the aperture stop and the third lens group. Fluctuations in the height of light rays incident on the third lens group are also held back, working for diminishing the size of the third lens group, and reducing aberration fluctuations as well.

Referring here to the lens arrangement of the first lens group, it is preferable that the first lens group is made up, in order from the object side, a negative lens and a positive lens, and that the negative lens in the first lens group has an image-side surface where the absolute value of paraxial curvature is larger than that of the object-side surface, and the positive lens in the first lens group has an object-side surface where the absolute value of paraxial curvature is larger than that of the image-side surface.

The fact that both the absolute values of curvature of the opposite surfaces of the negative lens and the positive lens in the first lens group are large works for making sure the function of correcting chromatic aberrations. The fact that each of the opposite surfaces is concave on the aperture stop side implies that off-axis aberrations are easily held back even on the surface having a large absolute value of curvature.

With respect to the lens material to form the first lens group, the negative lens and the positive lens in the first lens group should preferably satisfy the following condition.

$$20 < v1p - v1n < 60 \quad (3)$$

where $v1n$ is the Abbe constant of the negative lens in the first lens group, and $v1p$ is the Abbe constant of the positive lens in the first lens group.

By abiding by the lower limit of condition (3) to make sure the Abbe constants of the two lenses, it is easy to hold back the occurrence of chromatic aberrations at the first lens group, especially the occurrence of chromatic aberrations near the telephoto end at an increased zoom ratio.

By abiding the upper limit of condition (3), it is easy to slash the cost of the lens material used, and process the lens material.

More preferably, the lower limit of condition (3) should be set at 23, especially 25.

More preferably, the upper limit of condition (3) should be set at 50, especially 45.

Referring to the lens arrangement of the second lens group, it is preferable that the second lens group is made up of, in order from the object side, a negative lens having a concave image-side surface, a negative lens having a concave object-side surface and a position lens, and that the object-side negative lens in the second lens group has an aspheric surface.

By locating the two negative lenses on the object side and the positive lens on the image side, the principal points of the second lens group can be closer to the object side, working for curtailing the total length of the zoom lens at the wide-angle end, and diminishing the diameters of the first and second lens groups. As the opposite surfaces of the two negative lenses are each configured in concave form, it works for making sure the negative refracting power of the second lens group while keeping off-axis aberrations in balance, and making sure the function of bringing the principal points closer to the object side. Further, as the object-side negative lens has an aspheric surface, it works for correction of off-axis aberrations near the wide-angle end while the second lens group is slimmed down.

With respect to the lens material to form the second lens group, the two negative lenses and the positive lens in the second lens group should preferably satisfy the following condition.

$$20 < (v2n1 + v2n2)/2 - v2p < 60 \quad (4)$$

where $n2n1$ is the Abbe constant of the object-side negative lens in the second lens group, $v2n2$ is the Abbe constant of the image-side negative lens in the second lens group, and $v2p$ is the Abbe constant of the positive lens in the second lens group.

By abiding by the lower limit of condition (4) to make sure a difference in the Abbe constant between the negative lenses and the positive lens, it is easy to hold back the occurrence of chromatic aberrations at the second lens group. Further, it is easy to hold back the occurrence of chromatic aberrations while making sure the negative refracting power of the second lens group.

By abiding by the upper limit of condition (4), it is easy to slash the cost of the lens material used, and process the lens material.

More preferably, the lower limit of condition (4) should be set at 23, especially 25.

More preferably, the upper limit of condition (4) should be set at 50, especially 45.

Referring to the shape of the opposite surfaces in the first and second lens groups, it is preferable that the refracting surface located in, and nearest to the image side of, the first lens group is convex axially on the image side, and the refracting surface located in, and nearest to the object side of, the second lens group is concave axially on the object side.

It is then easy to make sure the first lens group has positive refracting power and the second lens group has negative refracting power, and to diminish the axial thickness of the second lens group as well. It is also easy to bring the first lens group close to the second lens group; it works for curtailing the total length of the zoom lens near the wide-angle end.

Reference to the shape of the lens located in, and nearest to the object side of, the second lens group, that lens should preferably be a double-concave negative lens of axially double-concave shape. And the object-side surface of that double-concave negative lens is preferably an aspheric surface whose negative refracting power diminishes with a distance from an optical axis.

Then, the axial thickness of the second lens group is easily slimmed down, and the negative refracting power of the negative lens can be allocated to both concave surfaces: this works for holding back the occurrence of spherical aberrations, and so on. As the object-side surface of the double-concave negative lens is configured in the form of an aspheric surface having negative refracting power going weak with a distance from an optical axis, it makes it easy to prevent the peripheral portion of the second lens group from jutting out, and it works for correction of off-axis aberrations near the wide-angle end as well.

With respect to the focal length of the positive lens in the third lens group, the positive lens in the third lens group should preferably satisfy the following condition.

$$0.3 < f3p/fw < 2. \quad (5)$$

where f3p is the focal length of the positive lens in the third lens group, and fw is the focal length of the whole zoom lens system at the wide-angle end.

By abiding by the lower limit of condition (5) to make sure the positive lens has moderate refracting power, it is easy to hold back the occurrence of spherical aberrations at the third lens group.

By abiding by the upper limit of condition (5) to make sure the positive lens group has moderate refracting power, it is easy to take hold of the refracting power for the third lens group, thereby limiting the amount of movement of the third lens group.

More preferably, the lower limit of condition (5) should be set at 0.5, especially 0.7.

More preferably, the upper limit of condition (6) should be set at 1.5, especially 1.0.

Referring to the shape of the positive lens in the third lens group, it is preferable that both the object-side and image-side surfaces of the positive lens in the third lens group are aspheric.

As both surfaces of the positive lens where refracting power is apt to grow large are configured as aspheric surfaces, it makes it easy to reduce aberrations at the lens's peripheral portion while taking hold of the refracting power necessary for the third lens group. It is also easy to prevent only one lens surface from becoming an aspheric surface of extreme shape and hold back influences of lens's decentration on aberrations.

With respect to the shape of the positive lens in the third lens group, the positive lens in the third lens group should preferably satisfy the following condition.

$$-1 < (R3pf + R3pr)/(R3pf - R3pr) < -0.05 \quad (6)$$

where R3pf is the paraxial radius of curvature of the object-side surface of the positive lens in the third lens group, and R3pr is the paraxial radius of curvature of the image-side surface of the positive lens in the third lens group.

By abiding by the lower limit of condition (6) to make sure the image-side surface of the positive lens has positive refracting power, it is easy to hold back the occurrence of spherical aberrations. It is also easy to reduce the refracting power of the object-side surface, thereby reducing influences of lens's decentration on aberrations.

By abiding by the upper limit of condition (6) to make sure the image-side surface has moderate positive refracting power, it is easy to take hold of the positive refracting power for the object-side surface, thereby implementing correction of coma and astigmatism.

More preferably, the lower limit of condition (6) should be set at −0.9, especially −0.8.

More preferably, the upper limit of condition (6) should be set at −0.1, especially −0.2.

With respect to the shape of the negative lens in the third lens group, the negative lens in the third lens group should preferably satisfy the following condition.

$$1.05 < (R3nf + R3nr)/(R3nf - R3nr) < 9 \quad (7)$$

where R3nf is the paraxial radius of curvature of the object-side surface of the negative lens in the third lens group, and R3nr is the paraxial radius of curvature of the image-side surface of the negative lens in the third lens group.

By abiding by the lower limit of condition (7) to make sure the object-side surface of the negative lens has positive refracting power, it is possible to make sure the effect that brings the principal points of the third lens group close to the object side and the effect by which the third lens group can have positive refracting power, working for smaller sizes and higher zoom ratios. It is also easy to take hold of positive refracting power for the image-side surface, thereby canceling out aberrations at the third lens group.

By abiding by the upper limit of condition (7) to keep the negative refracting power of the image-side surface of the negative lens from growing too strong, it is easy to hold back coma and astigmatism.

More preferably, the lower limit of condition (7) should be set at 1.2, especially 1.5.

More preferably, the upper limit of condition (7) should be set at 5, especially 3.5.

Referring to the material for the negative lens in the third lens group, it is preferable that the negative lens in the third lens group satisfies the following condition.

$$15 < v3n < 40 \quad (8)$$

where v3n is the Abbe constant of the negative lens in the third lens group.

By abiding by the lower limit of condition (8), it is easy to hold back an increase in the anomalous dispersion of the negative lens material, thereby getting around overcorrection of chromatic aberrations.

Abiding by the upper limit of condition (8) is favorable for correction in the third lens group of chromatic aberrations, because it makes sure the dispersion of the negative lens.

More preferably, the upper limit of condition (8) should be set at 35, especially 30.

Referring to the material for the lenses forming the third lens group, it is preferable that the positive and negative lenses in the third lens group satisfy the following condition.

$$10 < v3p - v3n < 70 \quad (9)$$

where v3p is the Abbe constant of the positive lens in the third lens group, and v3n is the Abbe constant of the negative lens in the third lens group.

By abiding by the lower limit of condition (9) to make sure a difference in the Abbe constant between the two lenses, it is easy to hold back the occurrence of chromatic aberrations at the third lens group, thereby holding back the occurrence of chromatic aberrations all over the zooming range.

By abiding by the upper limit of condition (9), it is easy to slash the cost of the lens material used and make sure ease of processing lens material.

More preferably, the lower limit of condition (9) should be set at 15, especially 20. When priority is given to optical performance, that lower limit may just as well be set at 45, especially 50.

More preferably, the upper limit of condition (9) should be set at 65, 60, 50 or even 45.

Referring to the focal length of the third lens group, it is preferable that the third lens group satisfies the following condition.

$$0.1 < f3/ft < 0.5 \tag{10}$$

where f3 is the focal length of the third lens group, and ft is the focal length of the whole zoom lens system at the telephoto end.

By abiding by the lower limit of condition (10) to let the third lens group have moderate positive refracting power, it is easy to hold back the occurrence of spherical aberrations and coma.

Abiding by the upper limit of condition (10) to make sure the third lens group has positive refracting power works for ensuring smaller size and zoom ratios due to reductions in the amount of movement of the third lens group.

More preferably, the lower limit of condition (10) should be set at 0.2, especially 0.25.

More preferably, the upper limit of condition (10) should be set at 0.4, especially 0.35.

Referring to the lens shape in the fourth lens group, it is preferable that the fourth lens group comprises a double-convex positive lens having an aspheric surface.

By using the aspheric surface with the positive refracting power shared between two lens surfaces, it is easy to make sure optical performance.

Referring to how to implement focusing, it is preferable that the fourth lens group moves toward the object side for focusing from a far object onto a nearby object.

The fourth lens group is lightweight and easy to make sure sufficient space for movement and undergoes little magnification changes in association with focusing operation: it is well fit for a lens group that moves for focusing.

Referring here to the focal length of the fourth lens group, it is preferable that the fourth lens group satisfies the following condition.

$$0.1 < f4/ft < 2.0 \tag{11}$$

where f4 is the focal length of the fourth lens group, and ft is the focal length of the whole zoom lens system at the telephoto end.

By abiding by the lower limit of condition (11) to prevent the refracting power of the fourth lens group from growing excessive, it is easy to hold back the occurrence of distortion. When the fourth lens group is used for focusing, it is also easy to hold back aberration fluctuations.

By abiding by the upper limit of condition (11) to make sure the fourth lens group has moderate refracting power, it is easy to keep the exit pupil far.

Further, as long as the range defined by condition (11) is satisfied, it is easy to make sure the whole lens system has symmetric refracting power: it is easy to hold back astigmatism fluctuations all over the zoom range.

More preferably, the lower limit of condition (11) should be set at 0.2, especially 0.3.

More preferably, the upper limit of condition (11) should be set at 1.0, especially 0.8.

Referring here to the zoom ratio of the whole zoom lens system, it is preferable to satisfy the following condition.

$$3.5 < ft/fw \tag{12}$$

where fw is the focal length of the whole zoom lens system at the wide-angle end, and ft is the focal length of the whole zoom lens system at the telephoto end.

It is preferable to make sure the desired zoom ratio by abiding by the lower limit of condition (12).

More preferably, the lower limit of condition (12) should be set at 3.9, especially 4.5.

More preferably, there should be an upper limit of up to 10.0, especially up to 7.0 to condition (12), because the length of the zoom lens remains reduced with limited aberration fluctuations.

According to the invention, there is preferably a zoom lens provided, which comprises, in order from an object side toward an image side thereof, a first lens group having positive refracting power, a second lens group having negative refracting power, a third lens group having positive refracting power and a fourth lens group having positive refracting power, and wherein upon zooming from a wide-angle end to a telephoto end of said zoom lens, a spacing between said first lens group and said second lens group grows wide, a spacing between said second lens group and said third lens group becomes narrow, a spacing between said third lens group and said fourth lens group changes, and said second lens group comprises a plastic double-concave negative lens that satisfies the following condition and a positive lens located more on the image side than that.

$$1.45 < N_{2n} < 1.70 \tag{A}$$

where $N_{2n}$ is the d-line refractive index of said plastic double-concave negative lens in the second lens group.

In a four- or more-group zoom lens comprising, in order from its object side, a positive lens group, a negative lens group, a positive lens group and a lens group, the second lens group having negative refracting power is going to have a zoom function. For this reason, it is preferable that the second lens group takes hold of moderate negative refracting, and moreover it is capable of implementing good correction of aberrations inclusive of those at the time of decentration.

In the invention, the second lens group is made up of a negative lens and a positive lens located on the image side of that: it is easier to bring the principal points of the second lens group close to the object side and so obtain a zoom function from changes in its distance from the first lens group. By locating a lens having refracting power of a different sign in the second lens group, it is also easier to cancel out aberrations such as chromatic aberrations, working for correction of various aberrations.

And according to the invention, at least one negative lens in the second lens group is configured as the plastic double-concave negative lens that satisfies condition (A). Plastics are lighter in weight, and easier in terms of surface shape processing, than glasses: they work more for weight and cost reductions. And configuring the plastic lens in double-concave form permits the negative refracting power to be shared between a plurality of lens surfaces, working for reducing aberrations such as spherical aberrations.

Condition (A) defines the preferable refractive index of the plastic double-concave negative lens. Abiding by the lower limit of condition (A) to take hold of moderate refractive index works for making sure the plastic lens has negative refracting power, facilitating the zoom function. Keeping the refractive index below the upper limit of condition (A) facilitates holding back aberration fluctuations due to the refractive index profile in the plastic lens that occur as temperature and humidity change.

More preferably, the lower limit of condition (A) should be set at 1.50, and the upper limit of condition (A) should be set at 1.65, especially 1.60.

The aforesaid plastic double-concave negative lens is preferably located in, and nearest to the object side of, the aforesaid second lens group.

This arrangement is favorable for the function of bringing the principal points of the second lens group close to the object side and making sure the desired angle of view at the telephoto end. The lens located in, and nearest to the object side of, the second lens group is most likely to increase in size: if a plastic lens is used as that lens, then it works more for size reductions. The double-concave shape of that plastic lens also makes it easy to slim down the second lens group axially. This in turn works for size reductions of the zoom lens upon received and put away in a camera body.

Preferably, the aforesaid plastic double-concave negative lens is of such a shape as to satisfy the following condition.

$$0.1 < SF_{2n} < 0.9 \quad (B)$$

Here $SF_{2n}=(R_{2f}+R_{2r})/(R_{2f}-R_{2r})$ where $R_{2f}$ is the paraxial radius of curvature of the object-side surface of the aforesaid plastic double-concave negative lens, and $R_{2r}$ is the paraxial radius of curvature of the image-side surface of the aforesaid plastic double-concave negative lens.

Condition (B) is to determine the preferable shape of the aforesaid plastic double-concave negative lens. Abiding by the lower limit of condition (B) makes it easy to decrease the angle of incidence of off-axis light beams on the double-concave negative lens near the wide-angle end, working for correction of aberrations on the wide-angle side. Abiding by the upper limit of condition (B) permits the negative refracting power to be shared between both lens surfaces of the plastic lens, working for correction of spherical aberrations near the telephoto end.

More preferably, the lower limit of condition (B) should be set at 0.2, and the upper limit of condition (B) should be set at 0.8, especially 0.7.

Preferably, the object-side surface of the plastic double-concave negative lens in the aforesaid second lens group is an aspheric surface configured in such a way as to have negative refracting power decreasing with a distance from the optical axis.

This arrangement is favorable for reductions of off-axis aberrations near the wide-angle end, and reductions of spherical aberrations near the telephoto end. It is also favorable for decreases in the diametrical size of the second lens group, and size reductions due to a decrease in the edge thickness difference of the double-concave negative lens. Furthermore, if the object-side surface of that double-concave negative lens is configured in such a way as to have positive refracting power around, then it works more for correction of aberrations and size reductions.

Preferably, the image-side surface of the plastic double-concave negative lens in the aforesaid-second lens group is an aspheric surface.

Configuring both surfaces of the plastic lens in aspheric form permits the degree of freedom in the surface shape for correction of aberrations and size reductions to grow much higher, working more for high performance and size reductions.

Preferably, the aforesaid plastic double-concave negative lens satisfies the following condition.

$$0.10 < D_{2n}/D_{2G} < 0.18 \quad (C)$$

where $D_{2n}$ is the axial thickness of the aforesaid plastic double-concave negative lens, and $D_{2G}$ is the axial thickness of the aforesaid second lens group.

Condition (C) is to determine the preferable axial thickness of the plastic double-concave negative lens. A plastic lens is lower in strength than a glass lens; however, abiding by the lower limit of condition (C) would work for taking hold of the strength of the plastic lens. Abiding by the upper limit is favorable for reductions of the thickness and diametrical size of that plastic lens. If the second lens group decreases in size, then it would also permit the effective diameter of the first lens group to become small at the wide-angle end, working for the size reduction of the whole zoom lens near the wide-angle end.

More preferably, the lower limit of condition (C) should be set at 0.12, especially 0.13, and the upper limit of condition (C) should be set at 0.16, especially 0.15.

Preferably, the aforesaid second lens group comprises a negative lens located more on the image side than the aforesaid plastic double-concave negative lens.

The location of a plurality of negative lenses in the second lens group permits the refracting power of each of the negative lenses in the second lens group to become low, facilitating elimination of influences due to negative lenses' decentration.

Preferably, the aforesaid second lens group comprises three lenses: in order from the object side to the image side, the aforesaid plastic double-concave negative lens, the aforesaid negative lens and the aforesaid positive lens.

Composing the second lens group of three lenses contributes to cost reductions, and the location of two negative lenses on the object side facilitates correction of various aberrations near the wide-angle end and size reductions.

Preferably, the aforesaid second lens group satisfies the following condition.

$$-0.18 < SF_{G2n} < 0.18 \quad (D)$$

Here $SF_{G2n}=(R_{2r}+R_{3f})/(R_{2r}-R_{3f})$ where $R_{2r}$ is the paraxial radius of curvature of the image-side surface of the aforesaid plastic double-concave negative lens, and $R_{3f}$ is the paraxial radius of curvature of the object-side surface of the aforesaid negative lens located more on the image side than the aforesaid double-concave negative lens.

Condition (D) is to determine the preferable shape of a double-convex air lens sandwiched between the two negative lenses in the second lens group.

Abiding by the lower and upper limits of condition (D) keeps the negative refracting powers of the object- and image-side surfaces of the air lens in balance, facilitating holding back axial aberrations and off-axis aberrations.

More preferably, the lower limit of condition (D) should be set at −0.14, especially −0.11, and the upper limit of condition (D) should be set at 0.14, especially 0.11.

Preferably, the aforesaid lens located on the image side of the aforesaid plastic double-concave negative lens is a glass lens that satisfies the following condition.

$$0.09 < N_{3n} - N_{2n} < 0.6 \quad (E)$$

where $N_{3n}$ is the d-line refractive index of the negative lens on the image side of the aforesaid plastic double-concave negative lens in the second lens group.

Plastic lenses are susceptible of performance changes from temperature and humidity changes. Accordingly, if plastic lenses are Used for both negative lenses in the second lens group, it may work for cost reductions and so on; however, there are a lot of influences from temperature and humidity changes. For this reason, if a glass lens is used for the negative lens located more on the object side than the plastic double-concave negative lens, it is then easy to lessen the influences from temperature and humidity changes. It is then preferable to satisfy condition (E) so that the glass lens can have a moderate refractive index.

Abiding by the lower limit of condition (E) makes it easy to take hold of the negative refracting power of the glass lens, thereby decreasing changes in the refracting power of the whole second lens group due to temperature and humidity changes. Abiding by the upper limit of condition (E) facilitates holding back the occurrence of chromatic aberrations at the second lens group.

More preferably, the lower limit of condition (E) should be set at 0.16, especially 0.3, and the upper limit of condition (E) should be set at 0.5, especially 0.4.

The aforesaid second lens group may comprise a negative lens located nearest to the object side, and for the aforesaid plastic double-concave negative lens, there may be a double-concave negative lens located more on the image side than the aforesaid negative lens located nearest to the object side.

This arrangement is favorable for the function of bringing the principal points of the second lens group close to the object side, and taking hold of the angle of view at the wide-angle end as well. It also enables the negative refracting power of the second lens group to be shared between a plurality of negative lenses, working for correction of spherical aberrations and various off-axis aberrations. The location of lenses on both sides of the plastic lens makes that plastic lens less likely to change due to environments, rendering it easy to eliminate influences from temperature and humidity changes.

It is here preferable that the aforesaid plastic double-concave negative lens is in such form as to satisfy the following condition.

$$-0.5 < SF_{2n} < 0.9 \quad (B')$$

Here $SF_{2n} = (R_{2f} + R_{2r})/(R_{2f} - R_{2r})$ where $R_{2f}$ is the paraxial radius of curvature of the object-side surface of the aforesaid plastic double-concave negative lens, and $R_{2r}$ is the paraxial radius of curvature of the image-side surface of the aforesaid plastic double-concave negative lens.

Condition (B') is to determine the preferable shape of the aforesaid plastic double-concave negative lens. Abiding by the lower limit of condition (B') makes it easy to decrease the angle of incidence of off-axis light beams incident on the double-concave negative lens near the wide-angle end, working for correction of aberrations on the wide-angle side. Abiding by the upper limit of condition (B') permits the negative refracting power to be shared between the lens surfaces on both sides of the plastic lens, working for correction of spherical aberrations near the telephoto end.

More preferably, the lower limit of condition (B') should be set at −0.3, especially 0.1, and the upper limit of condition (B') should be set at 0.7, especially 0.5.

Preferably, the plastic double-concave negative lens in the aforesaid second lens group is an aspheric lens.

This arrangement works for elimination of off-axis aberrations near the wide-angle end, and of spherical aberrations near the telephoto end.

Preferably, the plastic double-concave negative lens in the aforesaid second lens group is an aspheric lens having aspheric surfaces on both its sides.

The application of aspheric surfaces to both sides of the plastic lens enables the degree of freedom in the surface shape for correction of aberrations and size reductions to be much more improved, working more for high performance and size reductions.

Preferably, the aforesaid plastic double-concave negative lens satisfies the following condition.

$$0.10 < D_{2n}/D_{2G} < 0.18 \quad (C')$$

where $D_{2n}$ is the axial thickness of the aforesaid plastic double-concave negative lens, and $D_{2G}$ is the axial thickness of the aforesaid second lens group.

Condition (C') is to determine the preferable axial thickness of the plastic double-concave negative lens sandwiched between the left and right lenses in the second lens group. A plastic lens is lower in strength than a glass lens; however, abiding by the lower limit of condition (C') would work for taking hold of the strength of the plastic lens. Abiding by the upper limit is favorable for reductions of the thickness and diametrical size of that plastic lens.

More preferably, the lower limit of condition (C') should be set at 0.08, especially 0.10, and the upper limit of condition (C') should be set at 0.15, especially 0.13.

Preferably, the aforesaid second lens group comprises three lenses: in order from the object side to the image side, the aforesaid negative lens located nearest to the object side, the aforesaid plastic double-concave negative lens and the aforesaid positive lens.

Composing the second lens group of three lenses contributes to cost reductions, and the location of two negative lenses on the object side facilitates correction of various aberrations near the wide-angle end and size reductions.

Preferably, the aforesaid negative lens located in, and nearest to the object side of, the aforesaid second lens group is a glass lens, and the aforesaid second lens group satisfies the following condition.

$$-0.97 < SF_{G2n'} < -0.050 \quad (F)$$

Here $SF_{G2n'} = (R_{1r} + R_{2f})/(R_{1r} - R_{2f})$ where $R_{1r}$ is the paraxial radius of curvature of the image-side surface of the aforesaid negative lens located more on the object side than the aforesaid double-concave negative lens, and $R_{2f}$ is the paraxial radius of curvature of the object-side surface of the aforesaid plastic double-concave negative lens.

Condition (F) is to determine the preferable shape of a double-convex air lens sandwiched between the two negative lenses in the second lens group.

The glass lens is used for the negative lens located in, and nearest to the object side of, the second lens group, and the negative refracting power is borne by that glass lens, thereby facilitating a lessening of the influences of temperature and humidity changes on optical performance. Abiding by the lower and upper limits of condition (F) keeps the negative refracting powers of the object- and image-side surfaces of the air lens in well balance, facilitating correction of various aberrations while the influences of temperature and humidity changes are reduced.

More preferably, the lower limit of condition (F) should be set at −0.90, especially −0.85, and the upper limit of condition (F) should be set at −0.30, especially −0.60.

Preferably, a glass lens concave on the image side is used as the aforesaid negative lens located on the object side of the aforesaid plastic double-concave negative lens with the satisfaction of the following condition.

$$0.09 < N_{1n} - N_{2n} < 0.6 \quad (E)$$

where $N_{1n}$ is the d-line refractive index of the negative lens on the object side of the aforesaid plastic double-concave negative lens in the second lens group.

Plastic lenses are susceptible of performance changes from temperature and humidity changes. Therefore, if plastic lenses are used for both negative lenses in the second lens group, it may work for cost reductions and so on; however, there are a lot of influences from temperature and humidity changes. For this reason, if a glass lens is used for the negative lens located more on the object side than the plastic double-concave negative lens, it is then easy to lessen the influences from temperature and humidity changes. It is then preferable to satisfy condition (G) so that the glass lens can have a moderate refractive index.

Abiding by the lower limit of condition (G) makes it easy to take hold of the negative refracting power of the glass lens, thereby decreasing changes in the refracting power of the whole second lens group due to temperature and humidity changes. Abiding by the upper limit of condition (G) facilitates holding back the occurrence of chromatic aberrations at the second lens group.

More preferably, the lower limit of condition (G) should be set at 0.16, especially 0.3, and the upper limit of condition (G) should be set at 0.5, especially 0.4.

The inventive zoom lens may be compatible with imaging apparatus. That is, there is an imaging apparatus provided, which comprises a zoom lens and an imaging device located on the image side of the zoom lens and adapted to convert an image taken through the zoom lens into electrical signals, wherein the zoom lens is any one of the aforesaid ones.

It is here noted that when the zoom lens has a focusing function, the figures used in the aforesaid respective conditions are all supposed to have been found upon focusing on the farthest object point.

In terms of making sure size reductions, zoom ratio, optical performance, cost reductions, etc., it is preferable that, with the aforesaid basic arrangements, a plurality of the aforesaid requirements and conditions are satisfied at the same time. A plurality of the basic arrangements may be satisfied at the same time. Some of the basic arrangements may be incorporated in other basic arrangements.

As can be appreciated from the foregoing, the invention can provide a zoom lens that, through some tweaks, makes sure the desired zoom ratio even with a reduced number of lens components, works for size reductions upon received at a lens mount, and makes sure the desired performance, and an imaging apparatus incorporating the same.

According to the second aspect of the invention, there can be a zoom lens provided, which comprises four or more lens groups that make it easy to have the desired zoom ratio, and renders it easy to slash the fabrication cost of the second lens group. There can also be a zoom lens provided, which makes it easy to take hold of the desired optical performance at low fabrication costs. Further, there can be an imaging apparatus provided, which comprises such a zoom lens.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Figure 1A:
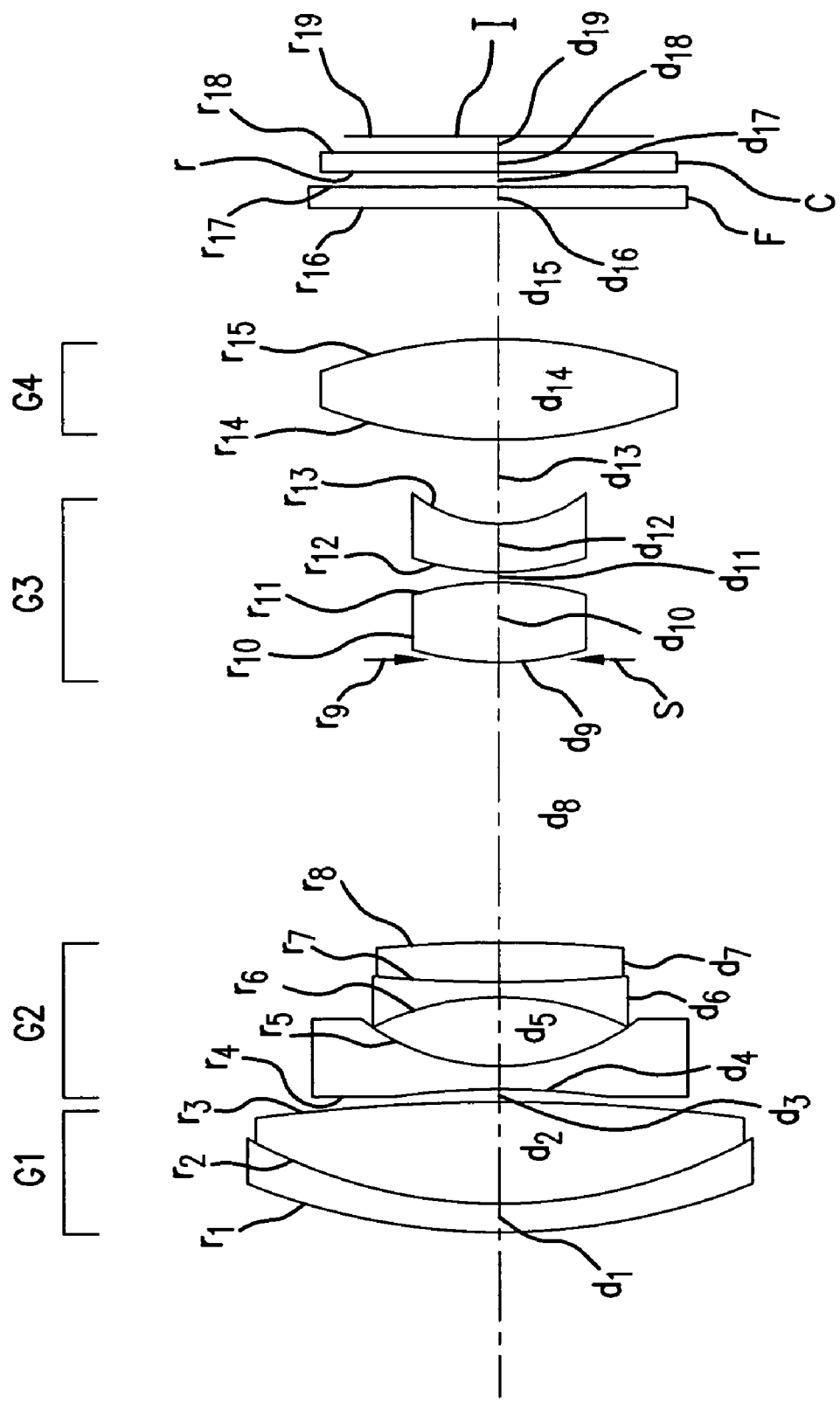
FIG. 1 is illustrative in lens arrangement section of Example 1 of the inventive zoom lens at the wide-angle end (a), in an intermediate state (b) and at the telephoto end (c) upon focusing on an object point at infinity.
Figure 1B:
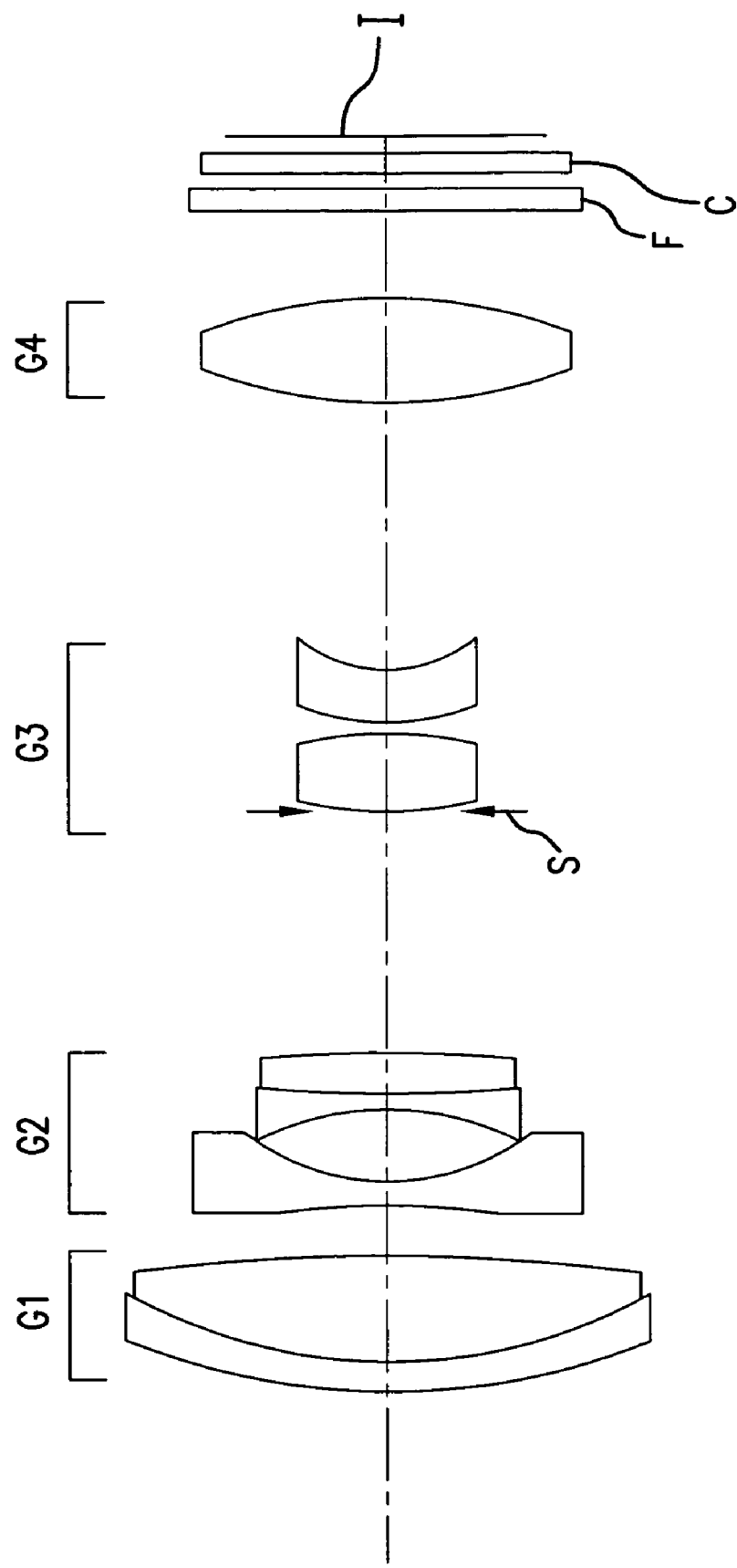
Figure 1C:
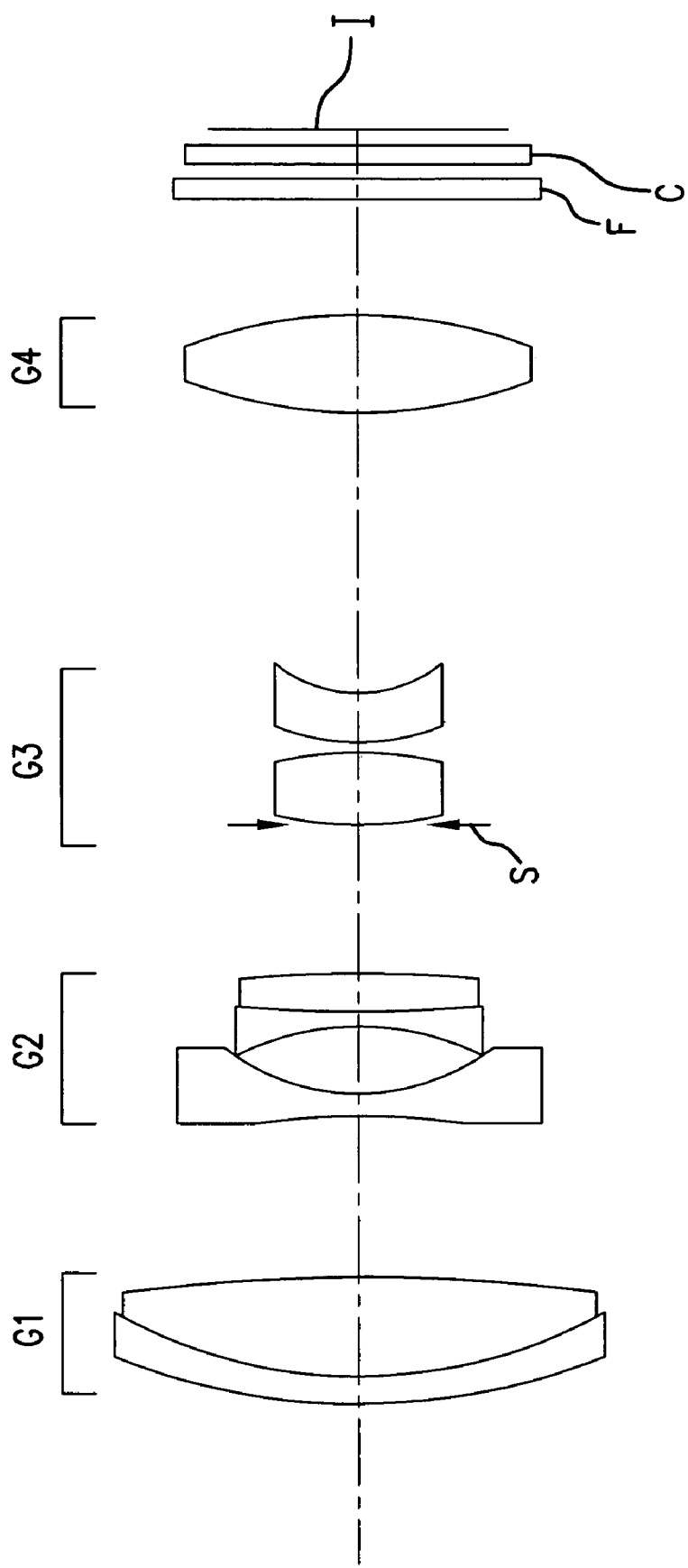
Figure 1D:
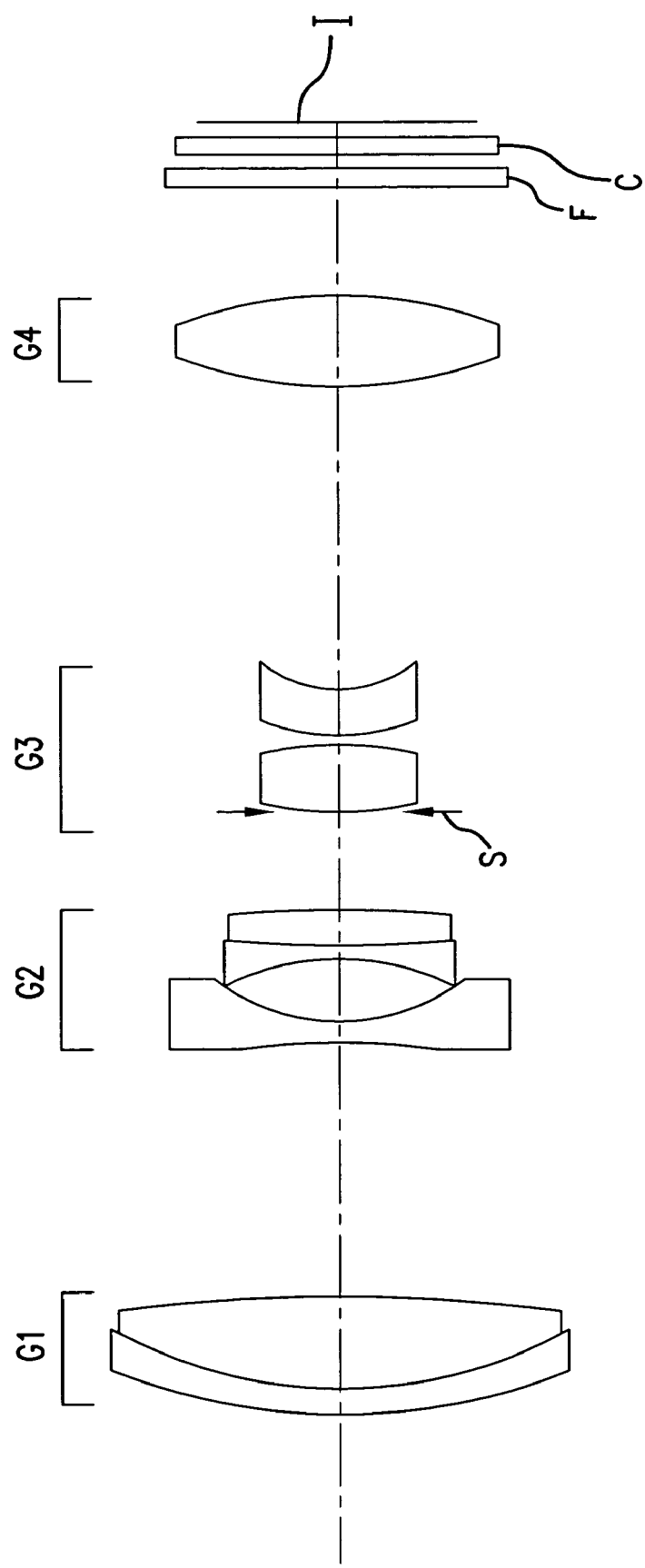
Figure 1E:
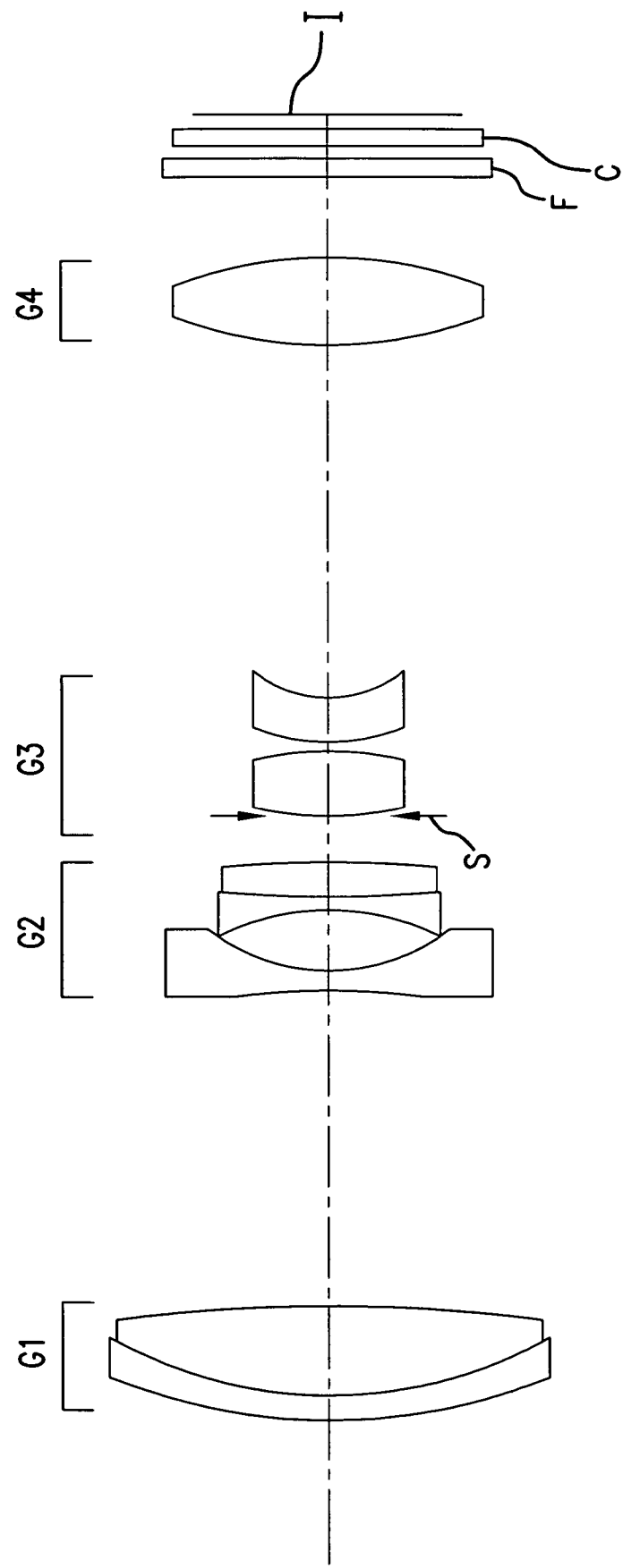
Figure 2A:
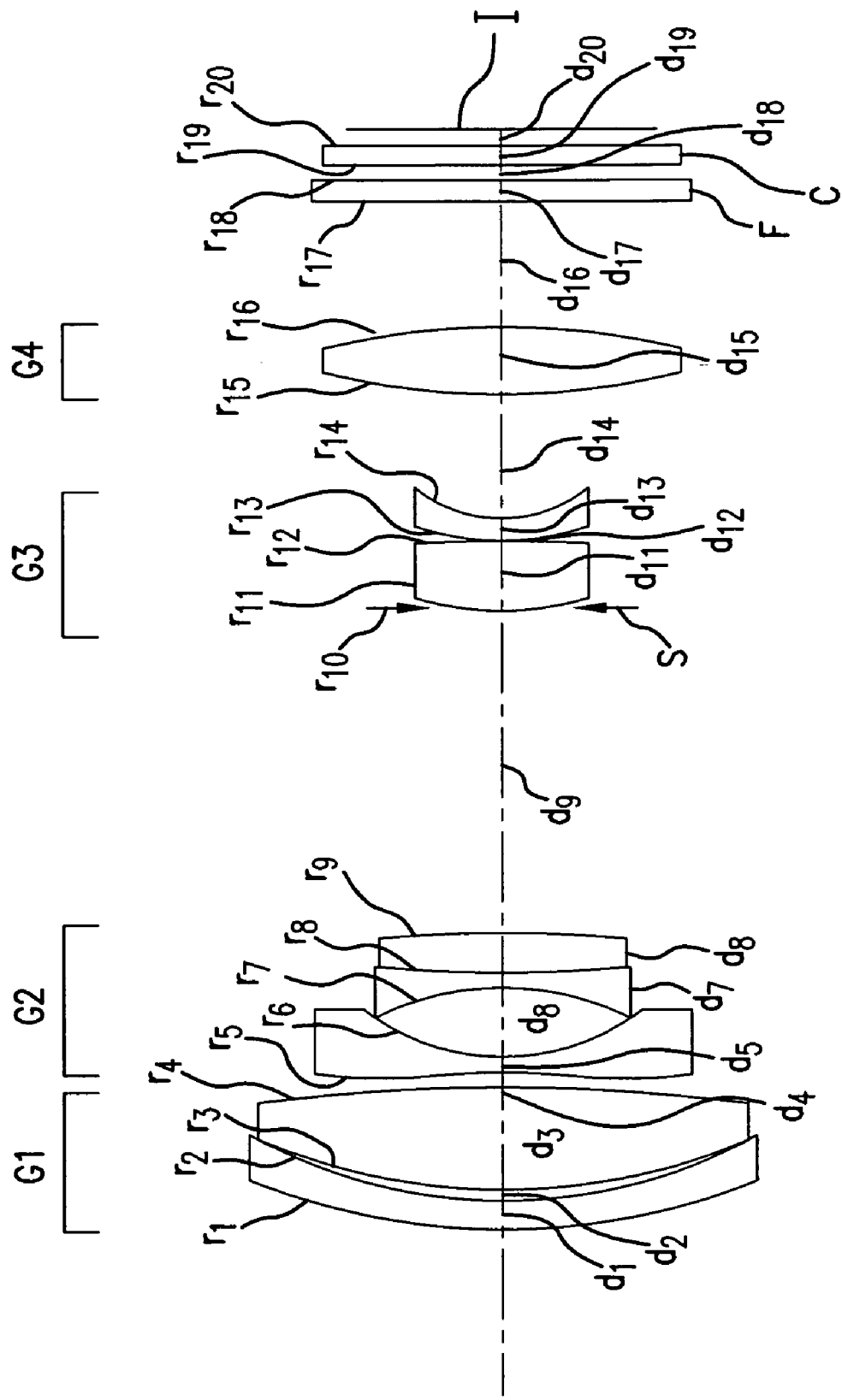
FIG. 2 is illustrative, as in FIG. 1, of Example 2 of the inventive zoom lens.
Figure 2B:
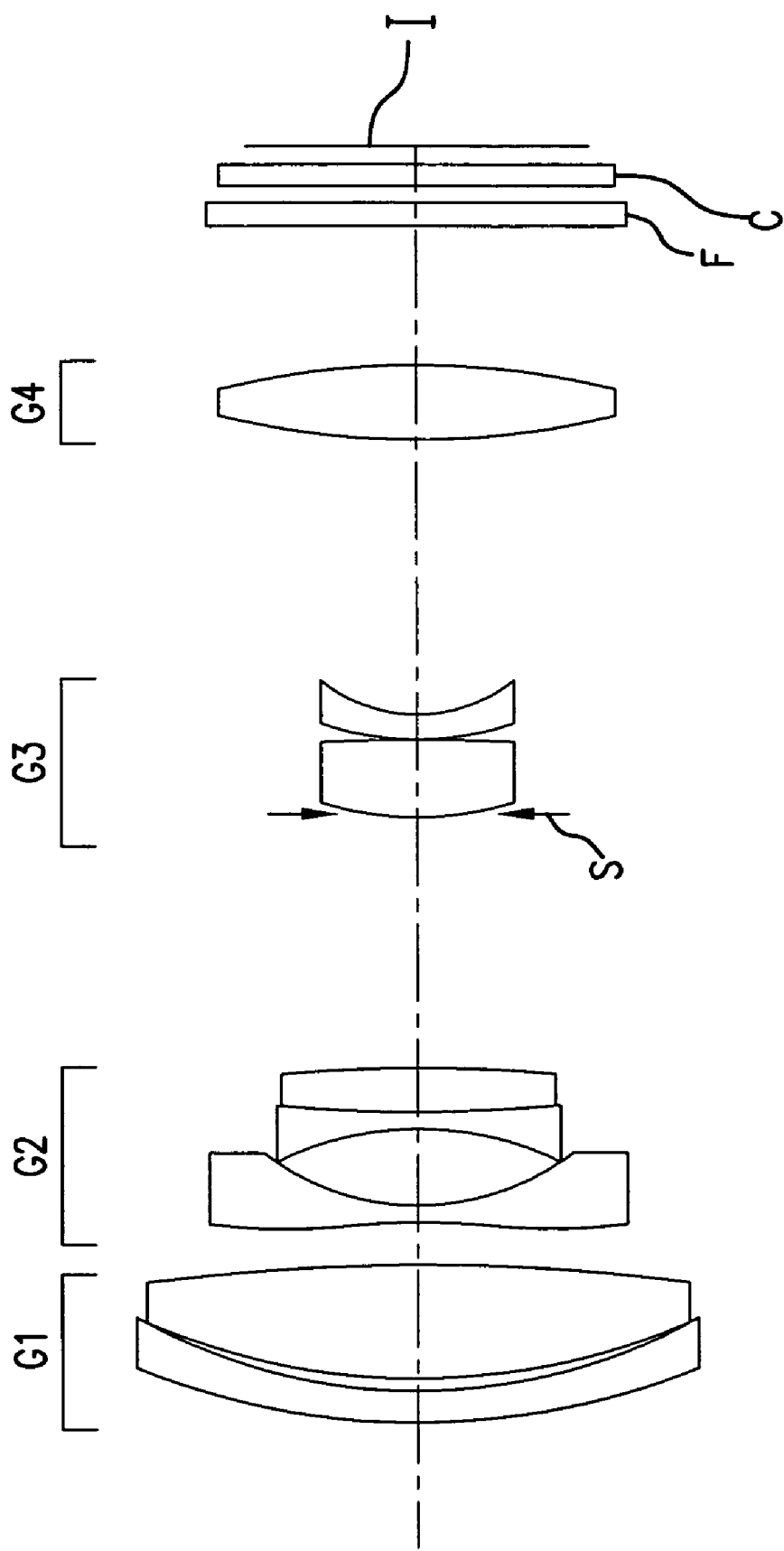
Figure 2C:
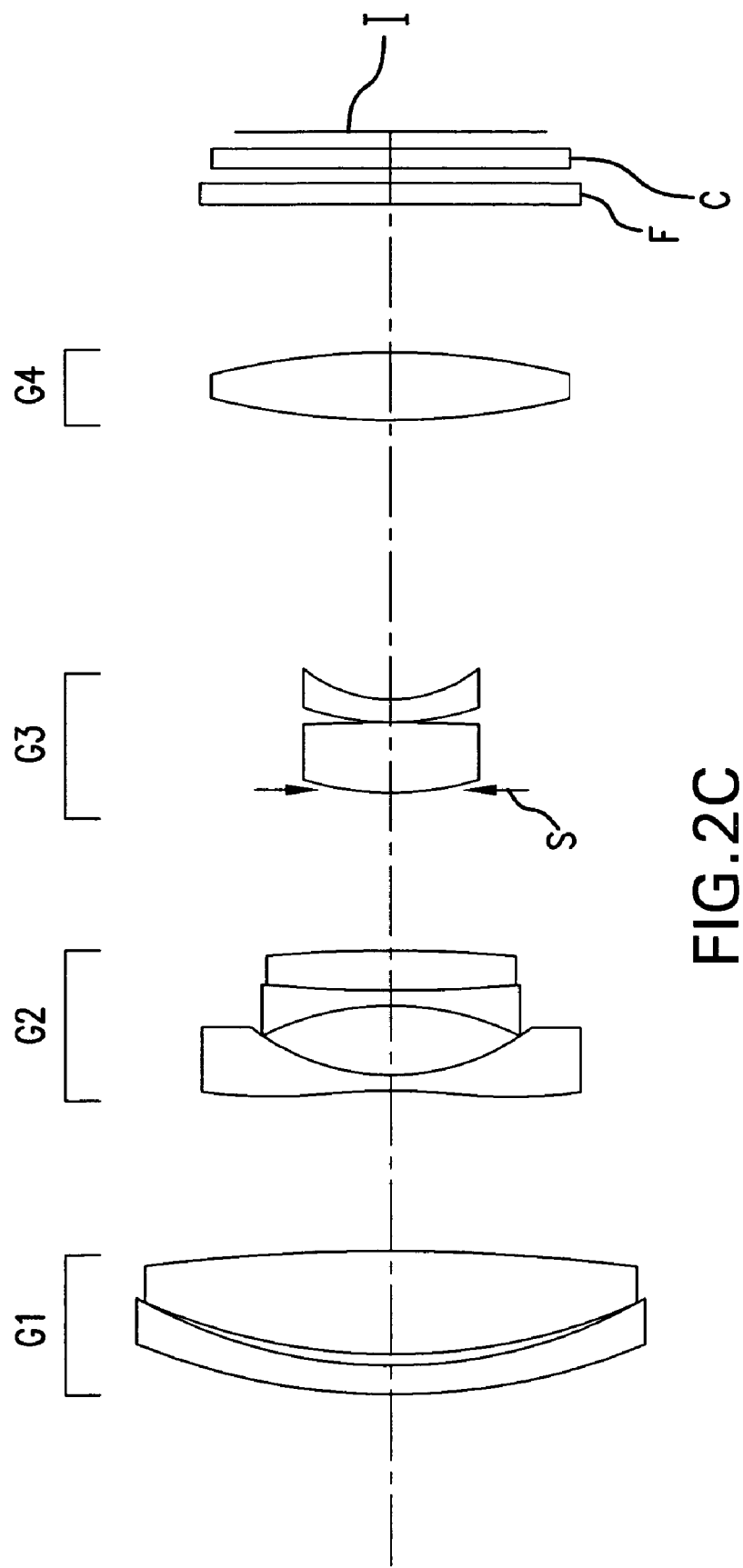
Figure 2D:
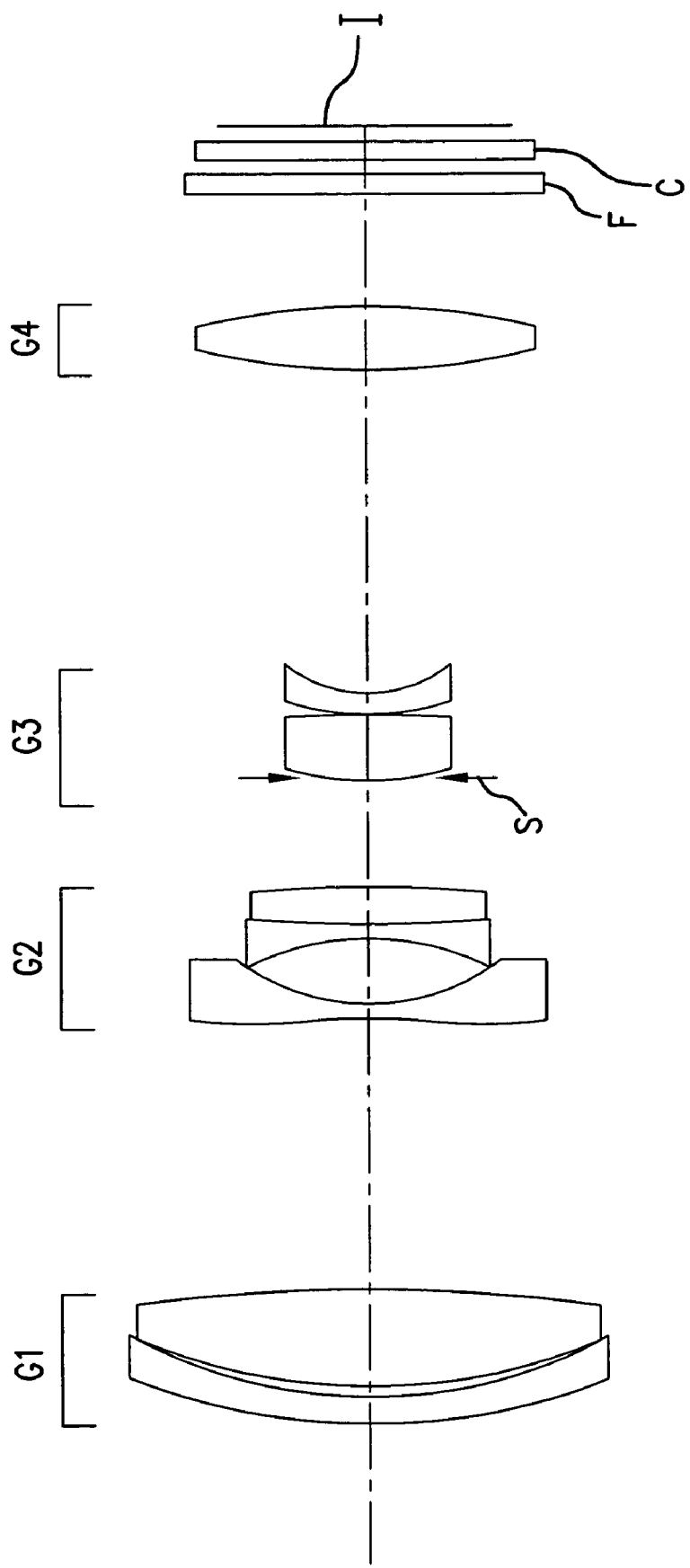
Figure 2E:
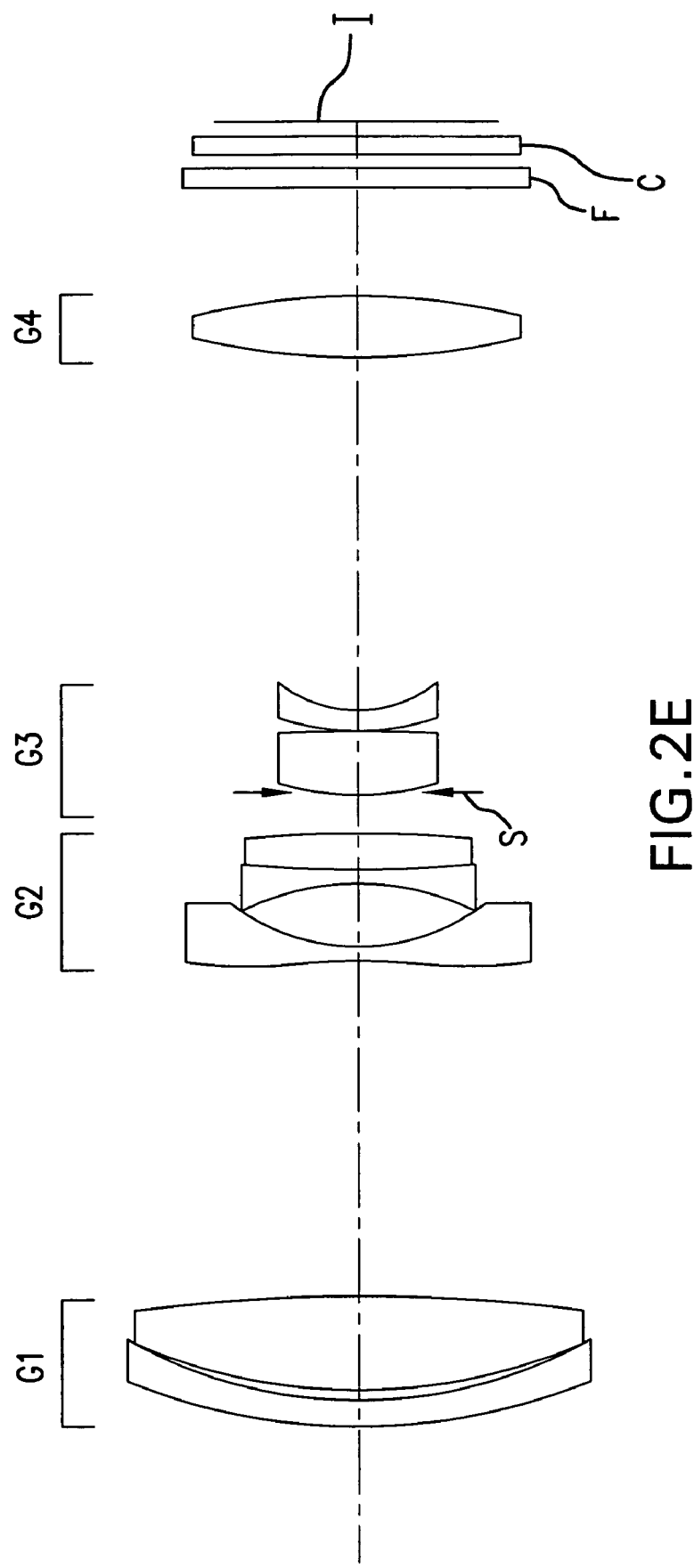

In the following examples that underlies the invention, there are less costly zoom lens optical systems provided, which, through such tweaks as described above, meet simultaneously the requirements for a downsized arrangement and a wider-angle/higher zoom ratio arrangement for cameras that satisfy users' demands for making the taking area involved wider than ever before without detrimental to the ability of cameras to be carried around, enable the quality of taken images to be well maintained, and lend themselves to electronic imaging devices such as CCDs or CMOSs.

The following examples are each directed to a zoom lens of the type wherein lenses are let out at the startup of an imaging apparatus as well as an imaging apparatus incorporating the same. More exactly, Examples 1 to 5 are each directed to a zoom lens having a zoom ratio of about 4.8, a half angle of view ω of at least 30° at the wide-angle end and high optical performance, and improved in terms of compactness. Throughout Examples 1 to 5, the effective imaging area is of constant rectangular shape in all zooming states. In the respective examples, the values for the specific conditions have been found at the time of focusing on an object point at infinity. Total length is the axial distance from the entrance surface to the exit surface of the lens arrangement plus a back focus as calculated on an air basis.

Examples 1 to 5 are each directed to a four-group zoom lens of + − + + construction. An aperture stop is located just before the third lens group, and moves in unison with the third lens group.

Upon zooming from the wide-angle end to the telephoto end, the first lens group moves toward the object side.

In Example 1, and 5, the second lens group first moves toward the object side, then moves while changing direction three times, and is positioned more on the object side at the telephoto end than at the wide-angle end. In Example 2, and 4, the second lens group first moves toward the object side, then moves while changing direction, and is positioned more on the image side at the telephoto end than at the wide-angle end. In Example 3, the second lens group first moves toward the object side, then moves while changing direction three times, and is positioned more on the image side at the telephoto end than at the wide-angle end.

The third lens group moves toward the object side.

In Example 1, and 3, the fourth lens group first moves toward the image side, then moves while changing direction twice, and is positioned more on the image side at the telephoto end than at the wide-angle end. In Example 2, 4, and 5, the fourth lens group first moves toward the image side, then moves while changing direction three times, and is positioned more on the image side at the telephoto end than at the wide-angle end.

Focusing is implemented by the movement of the fourth lens group, and the fourth lens group is moved toward the object side by focusing operation from a far object point to a nearby object point.

Examples 1 to 5 of the inventive zoom lens are now explained. FIGS. 1 to 5 are illustrative in lens arrangement section of Example 1, 2, 3, 4 and 5 at the wide-angle end (a), at a point of change on the wide-angle side (b), in an intermediate state (c), at a point of change on the telephoto side (d) and at the telephoto end (e) upon focusing on an object point at infinity. Throughout the drawings, the first lens group is indicated by G1; the second lens group is indicated by G2; the aperture stop is indicated by S; the third lens group is indicated by G3; the fourth lens group is indicated by G4; an optical low-pass filter is indicated by F; a cover glass for a CCD that is an electronic imaging device is indicated by C, and the image plane of the CCD is indicated by I. Note here that for a near infrared sharp cut coating, for instance, the coating may be applied directly to the optical low-pass filter F, or there may be another infrared cut absorption filter located.

The zoom lens of Example 1 is made up of, in order from the object side, the first lens group of positive refracting power, the second lens group G2 of negative refracting power, the aperture stop S, the third lens group G3 of positive refracting power and the fourth lens group G4 of positive refracting power, as shown in FIG. 1.

Upon zooming from the wide-angle end to the telephoto end, the respective lens groups move as described just below. Here, the point of change on the wide-angle side is defined as a point at which the direction of movement of the first lens group G2 or the fourth lens group G4 changes between the wide-angle end and the intermediate state, and the point of change on the telephoto side is defined as a point at which the direction of movement of the second lens group G2 or the fourth lens group G4 changes between the intermediate state and the telephoto end. The same will apply hereinafter.

The first lens group G1 moves toward the object side from the wide-angle end to the telephoto end.

From the wide-angle end to the point of change on the wide-angle side, the second lens group G2 moves toward the object side while the spacing with the first lens group G1 grows wide and the spacing with the third lens group G3 becomes narrow, and from the point of change on the wide-angle side to the intermediate state, the second lens group G2 moves toward the image side while the spacing with the first lens group G1 grows wide and the spacing with the third lens group G3 becomes narrow. In the intermediate state, the second lens group G2 is positioned more on the object side than at the wide-angle end. From the intermediate state to the point of change on the telephoto side, the second lens group G2 moves toward the object side while the spacing with the first lens group G1 grows wide and the spacing with the third lens group G3 becomes narrow, and from the point of change on the telephoto side to the telephoto end, it moves toward the image side while the spacing with the first lens group G1 grows wide and the spacing with the third lens group G3 becomes narrow. At the point of change on the telephoto side, the second lens group G2 is positioned a little more on the object side than at the point of change on the wide-angle side, and at the telephoto end, it is positioned more on the object side than at the wide-angle end and a little more on the image side than in the intermediate state.

From the wide-angle end to the telephoto end, the aperture stop S and the third lens group G3 move in unison toward the object side.

From the wide-angle end to the point of change on the wide-angle side, the fourth lens group G4 moves toward the image side while the spacing with the third lens group G3 grows wide, and from the point of change on the wide-angle side to the intermediate state, it moves toward the object side while the spacing with the third lens group G3 grows wide. In the intermediate state, the fourth lens group G4 is positioned a little more on the image side than at, the wide-angle end. From the intermediate state to the point of change on the telephoto side, the fourth lens group G4 moves toward the image side while the spacing with the third lens group G3 grows wide, and from the point of change on the telephoto side to the telephoto end, it moves toward the image side while the spacing with the third lens group G3 grows wide. At the point of change on the telephoto side, the fourth lens group G4 is positioned a little more on the object side than at the point of change on the wide-angle side and a little more on the image side than in the intermediate state, and at the telephoto end, it is positioned a little more on the image side than at the point of change on the telephoto side and a little more on the object side than at the point of change on the wide-angle side.

In order from the object side, the first lens group G1 is made up of a cemented lens of a negative meniscus lens convex on its object side and a double-convex positive lens; the second lens group G2 is made up of a double-concave negative lens and a cemented lens of a double-concave negative lens and a double-convex positive lens; the third lens group G3 is made up of a double-convex positive lens and a negative meniscus lens convex on its object side; and the fourth lens group G4 is made up of one double-convex positive lens.

Six aspheric surfaces are used: one for the surface—located nearest to the image side—of the cemented lens forming the first lens group G1, two for both surfaces of the double-concave negative lens in the second lens group. G2, two for both surfaces of the double-convex positive lens in the third lens group G3, and one for the object-side surface of the double-convex positive lens forming the fourth lens group G4.

The zoom lens of Example 2 is made up of, in order from the object side, the first lens group of positive refracting power, the second lens group G2 of negative refracting power, the aperture stop S, the third lens group G3 of positive refracting power and the fourth lens group G4 of positive refracting power, as shown in FIG. 2.

Upon zooming from the wide-angle end to the telephoto end, the respective lens groups move as described just below.

The first lens group G1 moves toward the object side from the wide-angle end to the telephoto end.

From the wide-angle end to the point of change on the wide-angle side, the second lens group G2 moves toward the object side while the spacing with the first lens group G1 grows wide and the spacing with the third lens group G3 becomes narrow, and from the point of change on the wide-angle side to the intermediate state, it moves toward the image side while the spacing with the first lens group G1 grows wide and the spacing with the third lens group G3 becomes narrow. In the intermediate state, the second lens group G2 is positioned a little more on the object side than at the wide-angle end. From the intermediate state to the point of change on the telephoto side, the second lens group G2 moves toward the image side while the spacing with the first lens group G1 grows wide and the spacing with the third lens group G3 becomes narrow, and from the point of change on the telephoto side to the telephoto end, the second lens group G2 moves toward the image side while the spacing with the first lens group G1 grows wide and the spacing with the third lens group G3 becomes narrow. At the point of change on the telephoto side, the second lens group G2 is positioned a little more on the object side than at the wide-angle end, and at the telephoto end, it is positioned a little more on the image side than at the wide-angle end.

From the wide-angle end to the telephoto end, the aperture stop S and the third lens group G3 move in unison toward the object side.

From the wide-angle end to the point of change on the wide-angle side, the fourth lens group G4 moves toward the image side while the spacing with the third lens group G3 grows wide, and from the point of change on the wide-angle side to the intermediate state, it moves toward the object side while the spacing with the third lens group G3 grows wide. In the intermediate state, the fourth lens group G4 is positioned a little more on the object side than at the wide-angle end. From the intermediate state to the point of change on the telephoto side, the fourth lens group G4 moves toward the image side while the spacing with the third lens group G3 grows wide, and from the point of change on the telephoto side to the telephoto end, it moves toward the object side while the spacing with the third lens group G3 grows wide. At the point of change on the telephoto side, the fourth lens group G4 is positioned a little more on the image side than at the point of change on the wide-angle side; at the point of change on the telephoto side, it is positioned a little more on the image side than in the intermediate state; and at the telephoto end, it is positioned a little more on the image side than at the point of change on the telephoto-side and a little more on the object side than at the point of change on the wide-angle side.

In order from the object side, the first lens group G1 is made up of a negative meniscus lens convex on its object side and a double-convex positive lens; the second lens group G2 is made up of a double-concave negative lens and a cemented lens of a double-concave negative lens and a double-convex positive lens; the third lens group G3 is made up of a double-convex positive lens and a negative meniscus lens convex on its object side; and the fourth lens group G4 is made up of one double-convex positive lens.

Five aspheric surfaces are used: two for both surfaces of the double-concave negative lens in the second lens group G2, two for both surfaces of the double-convex positive lens in the third lens group G3, and one for the object-side surface of the double-convex positive lens forming the fourth lens group G4.

Figure 3A:
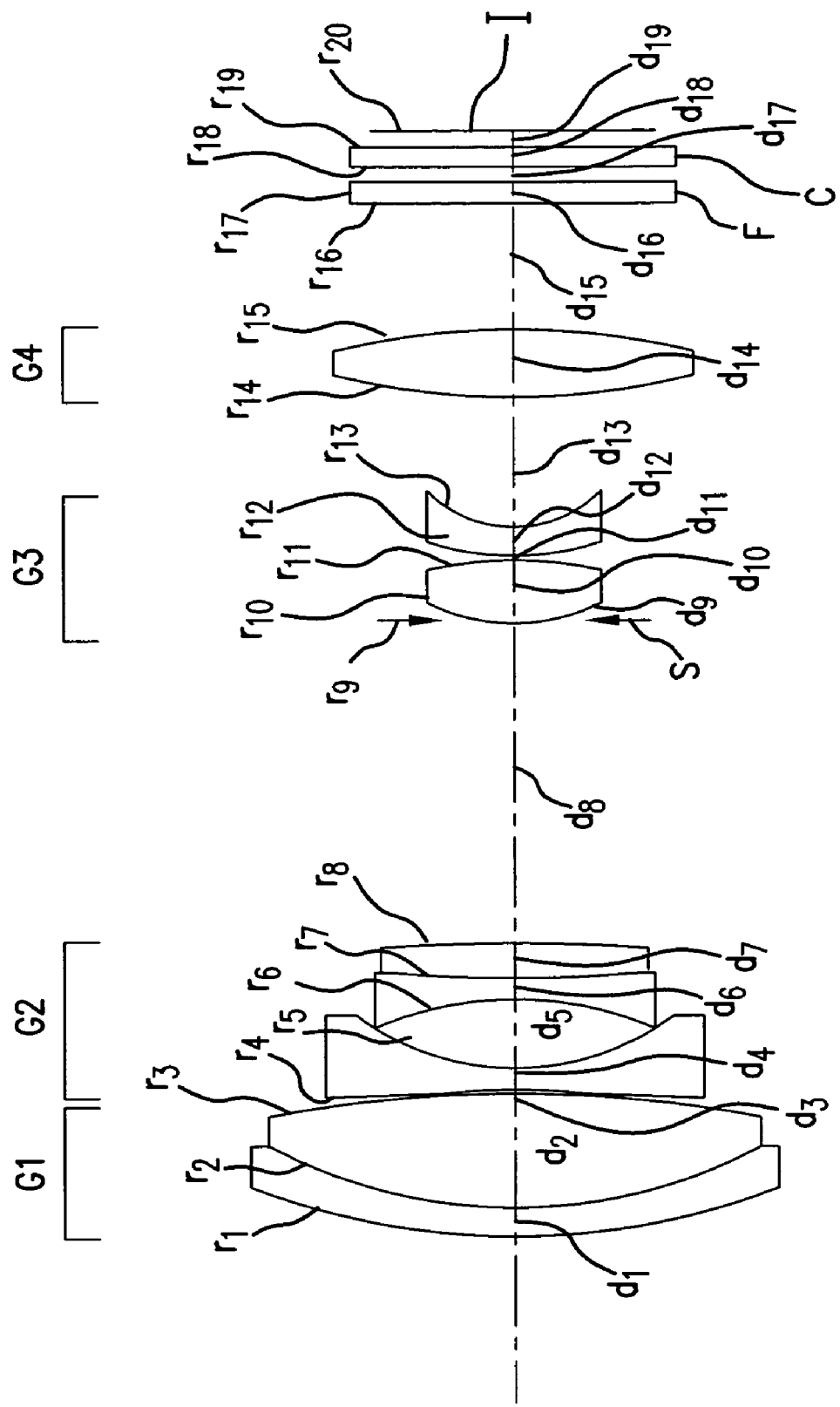
FIG. 3 is illustrative, as in FIG. 1, of Example 3 of the inventive zoom lens.
Figure 3B:
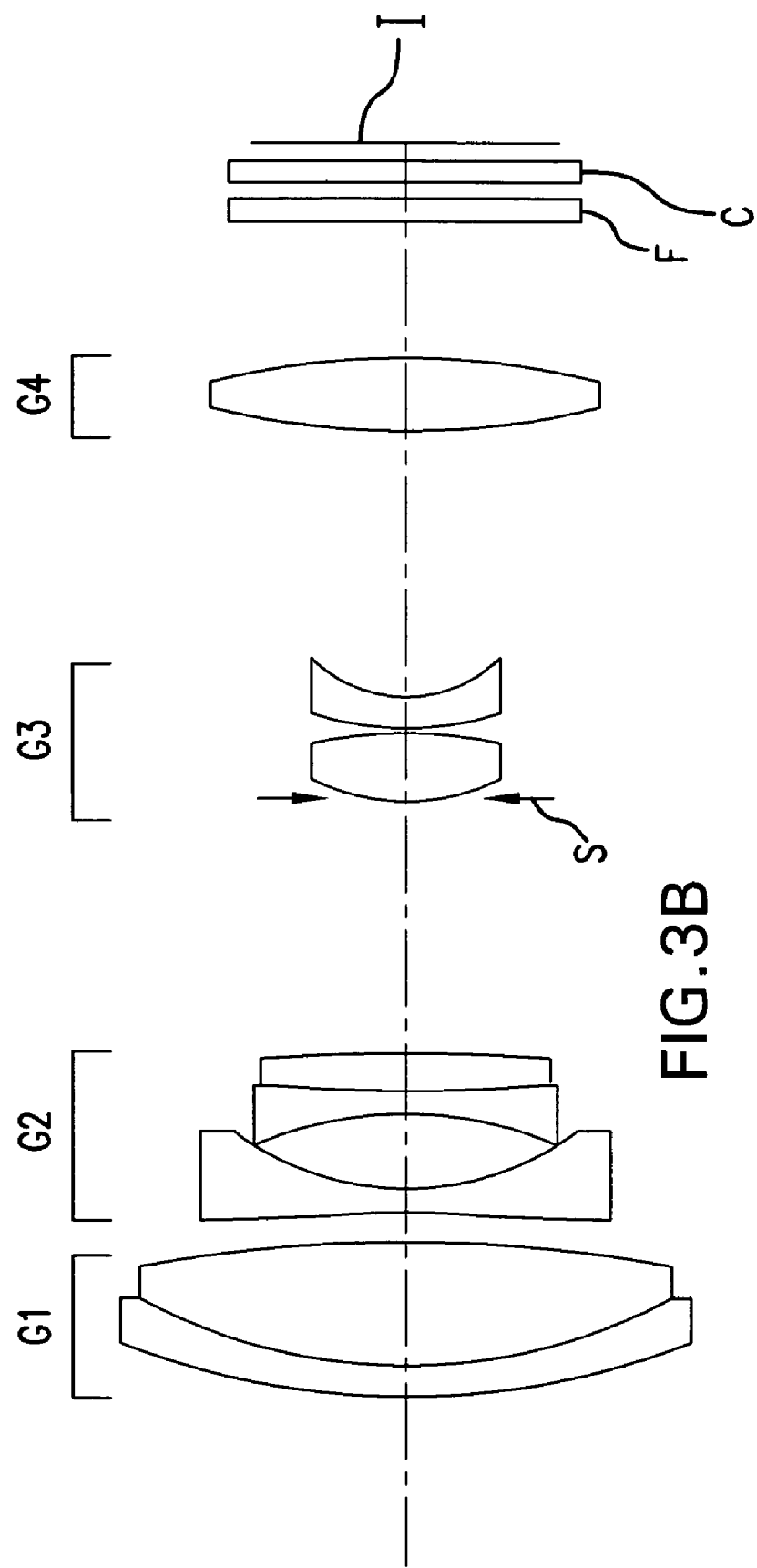
Figure 3C:
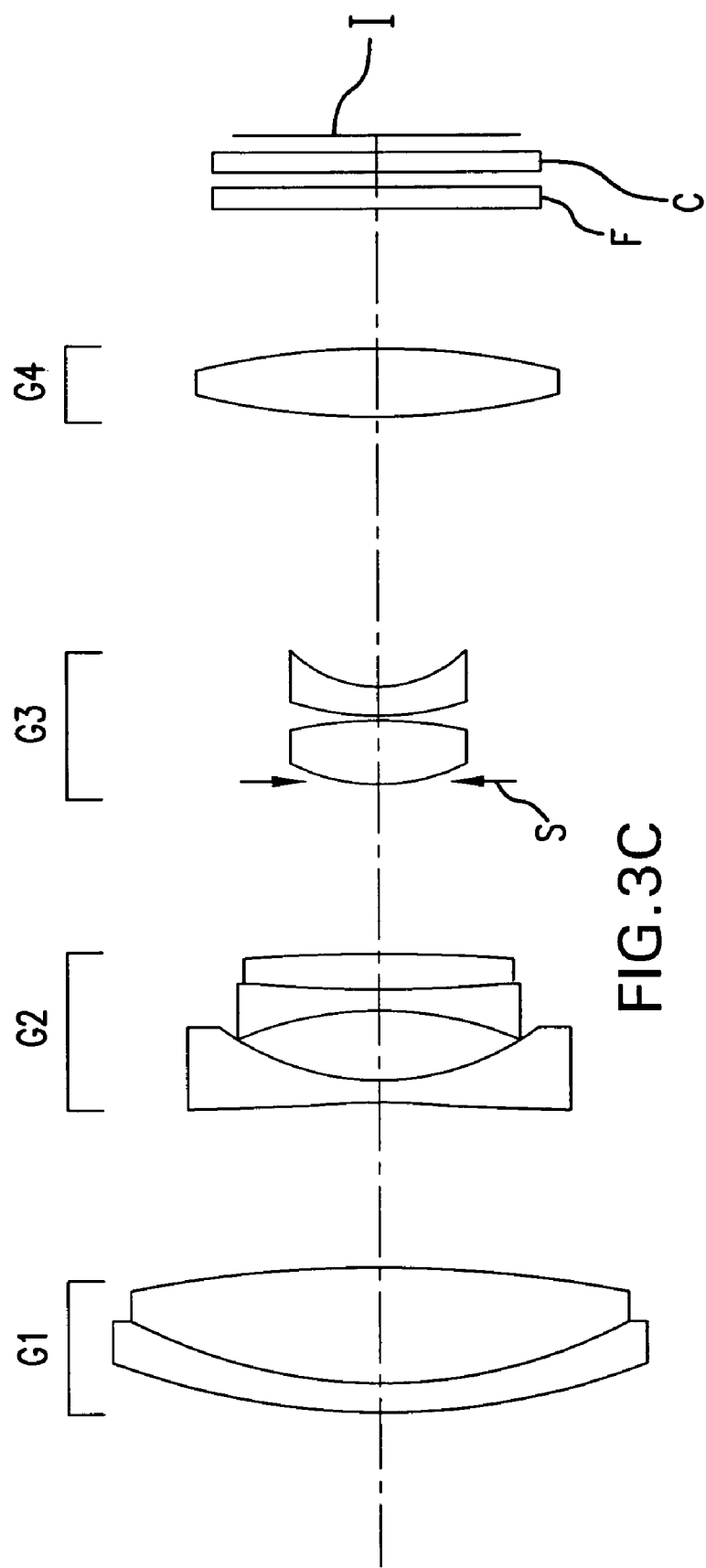
Figure 4A:
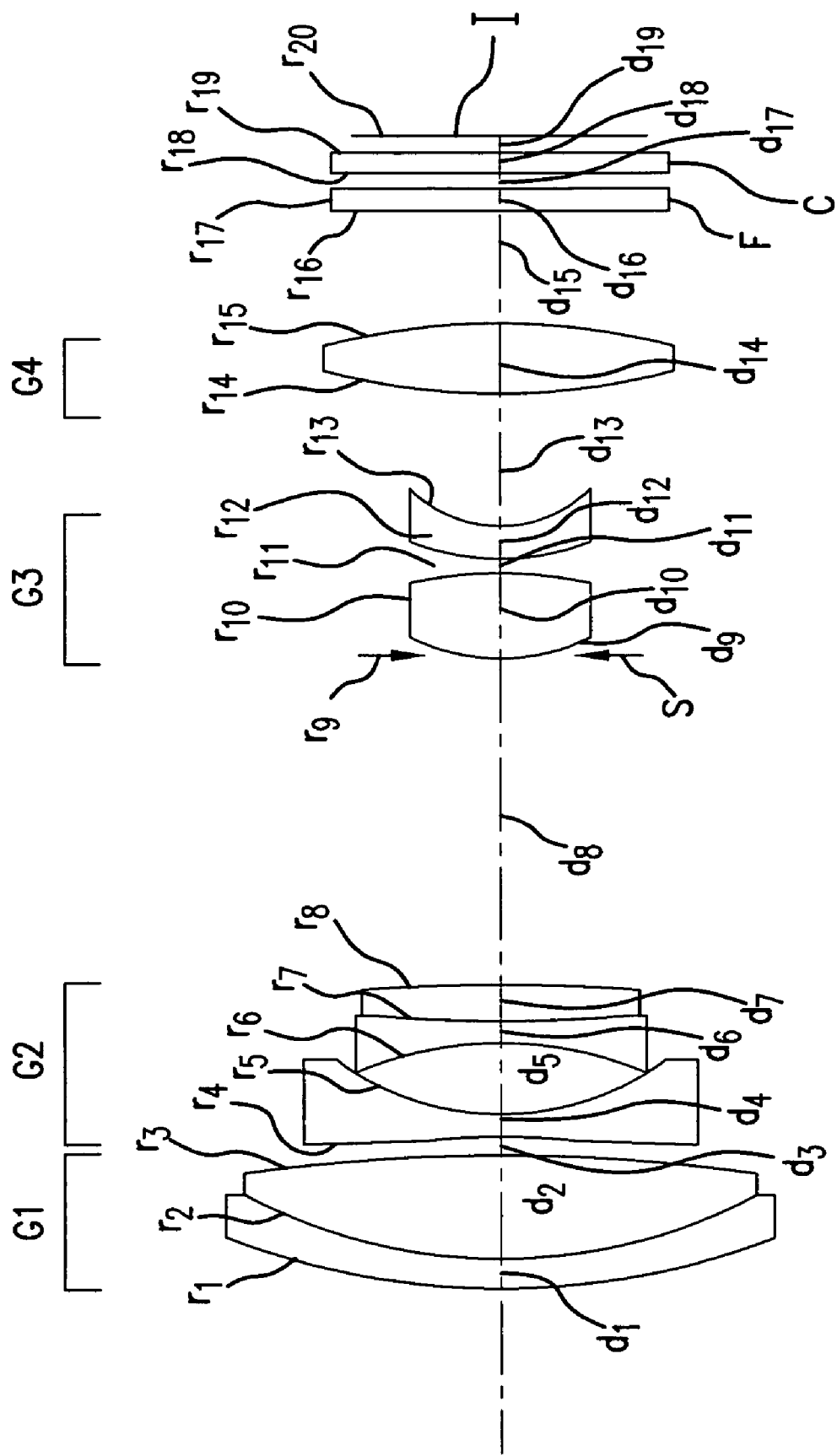
FIG. 4 is illustrative, as in FIG. 1, of Example 4 of the inventive zoom lens.
Figure 4B:
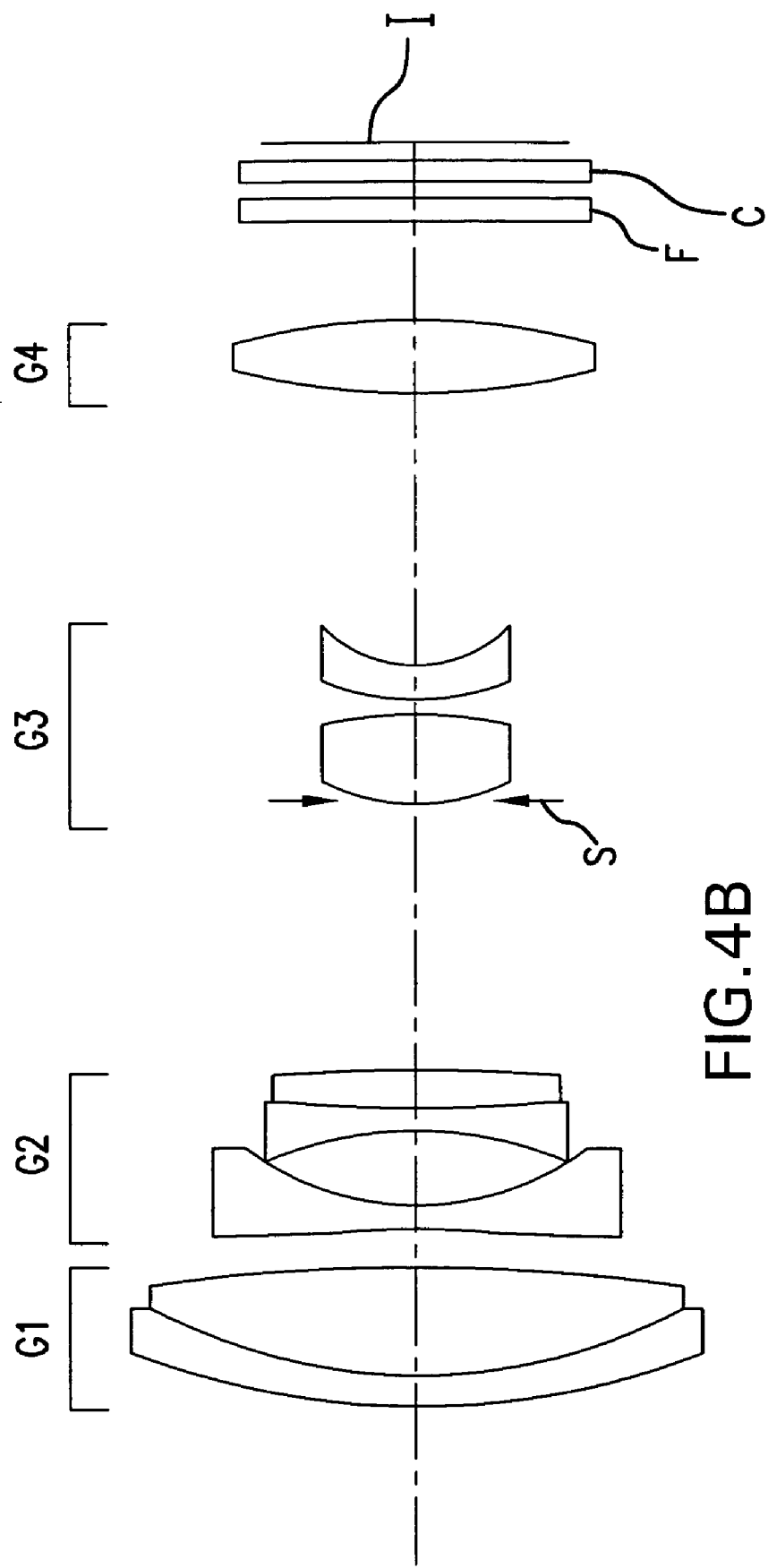
Figure 4C:
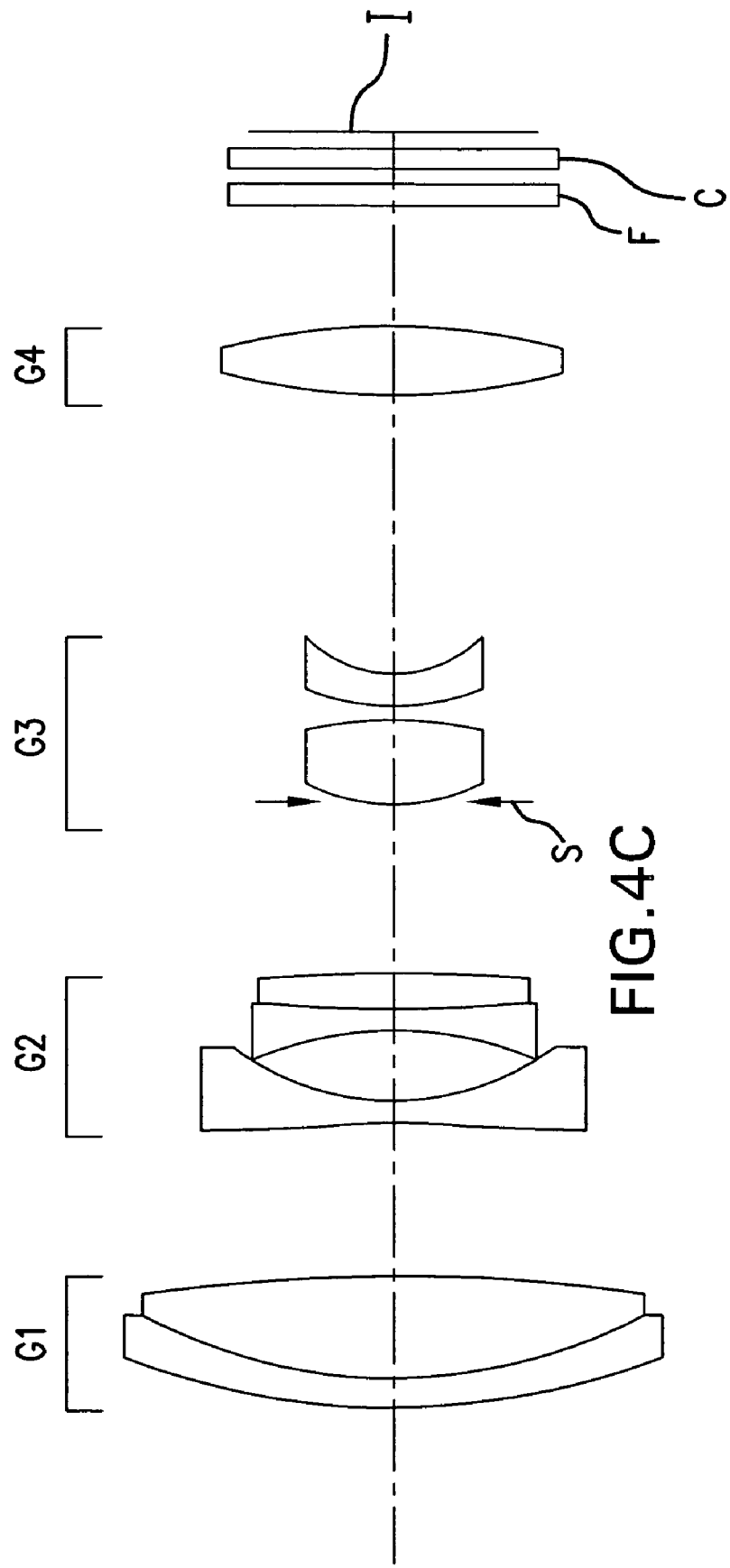
Figure 4D:
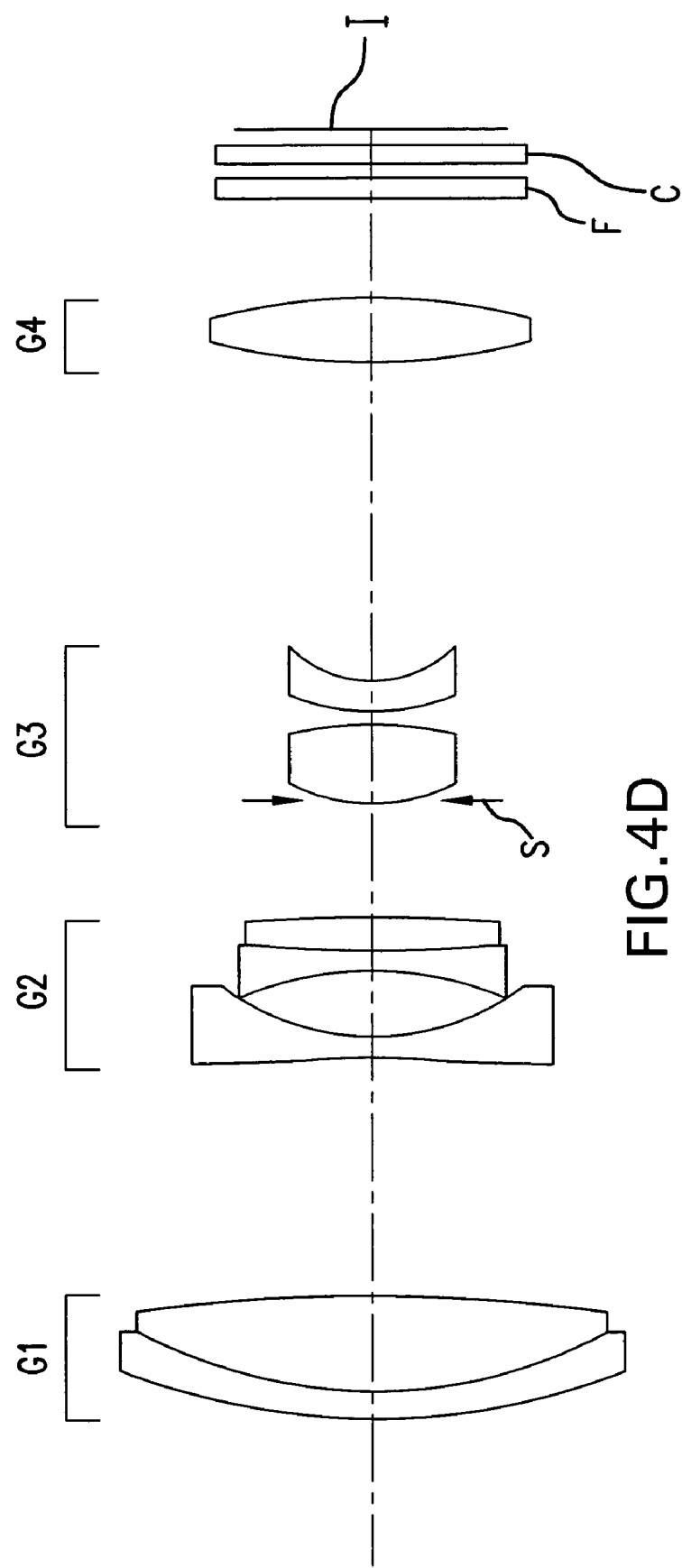
Figure 5A:
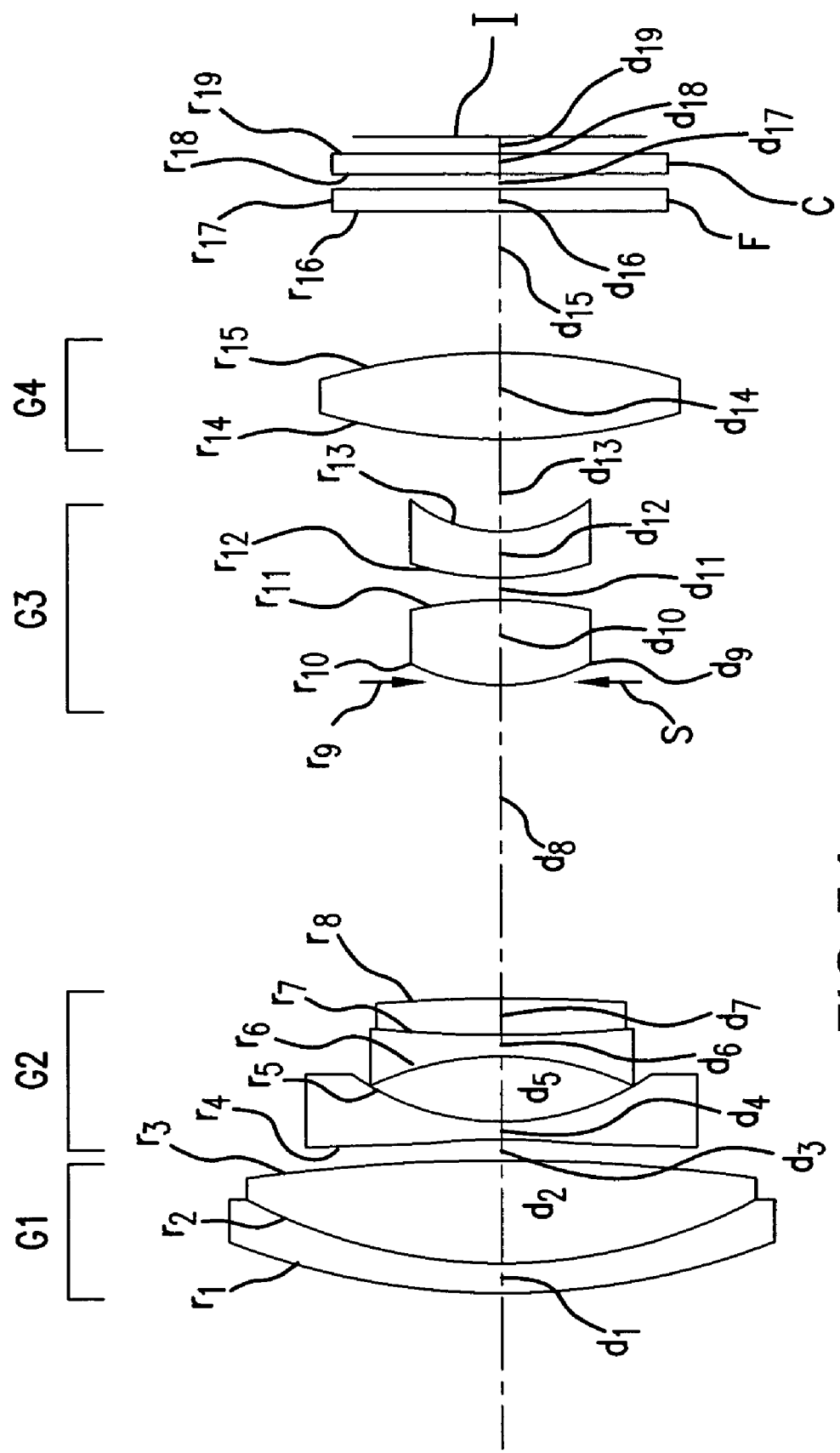
FIG. 5 is illustrative, as in FIG. 1, of Example 5 of the inventive zoom lens.
Figure 5B:
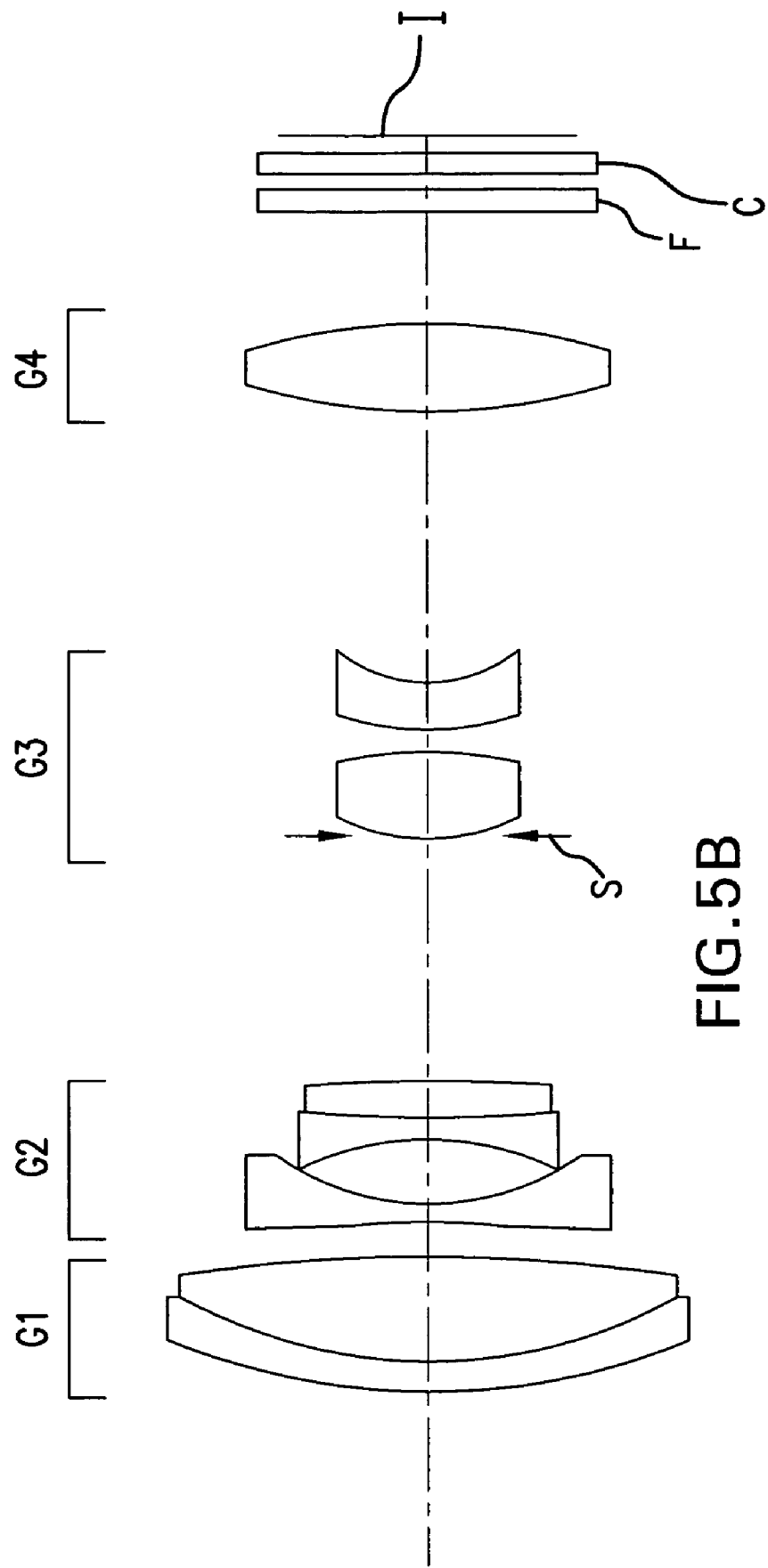
Figure 5C:
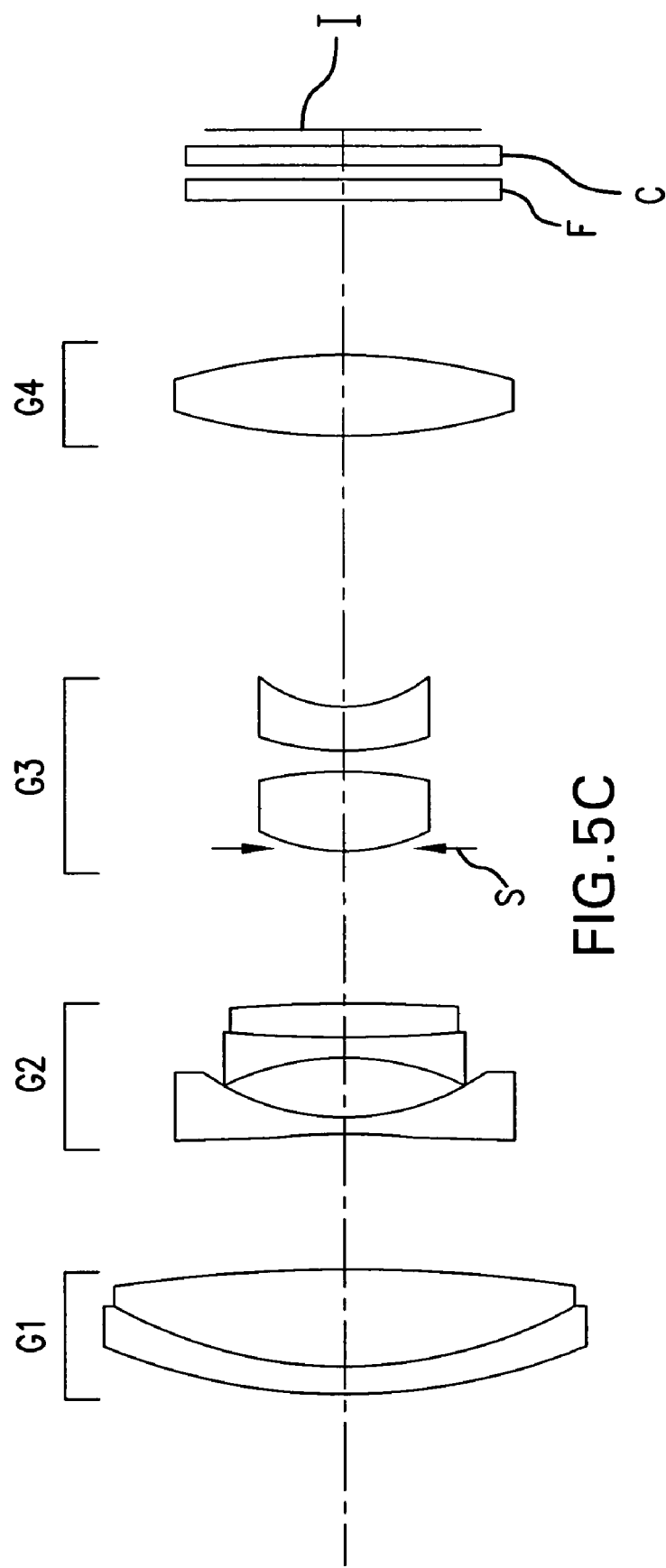
Figure 5D:
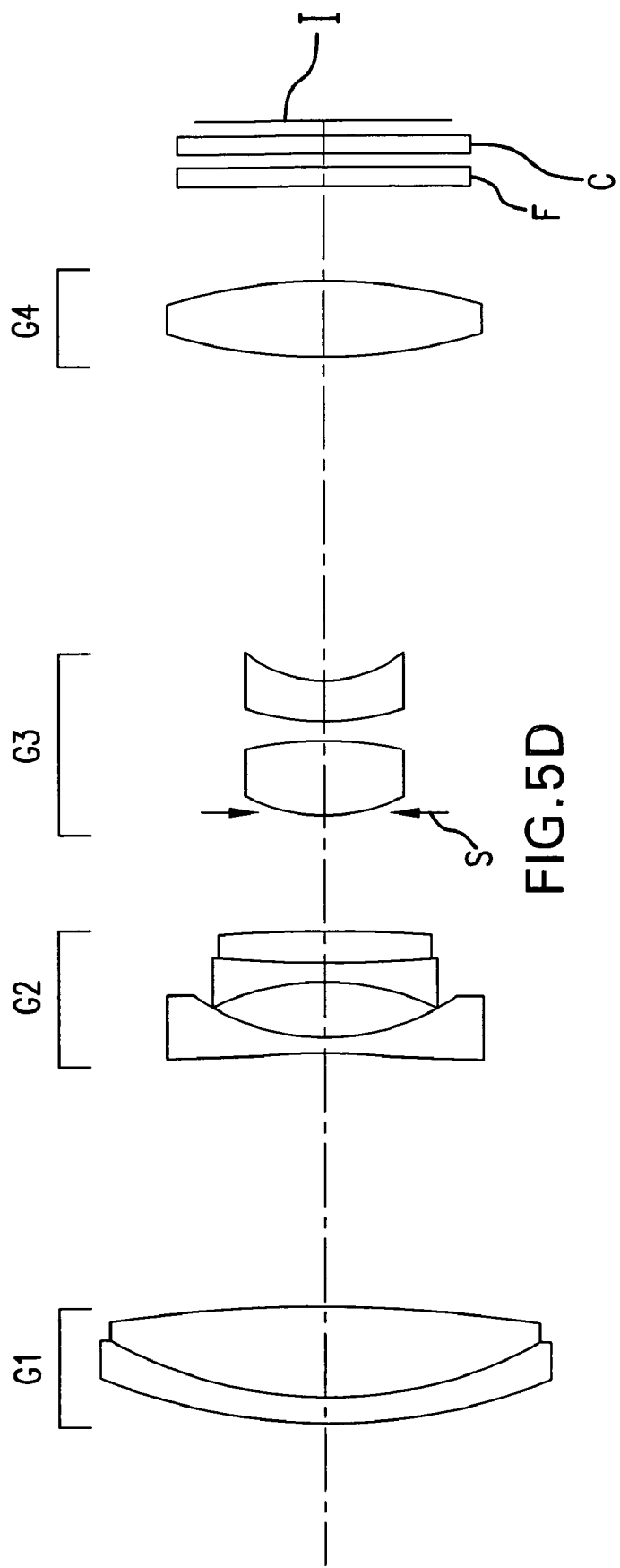
Figure 5E:
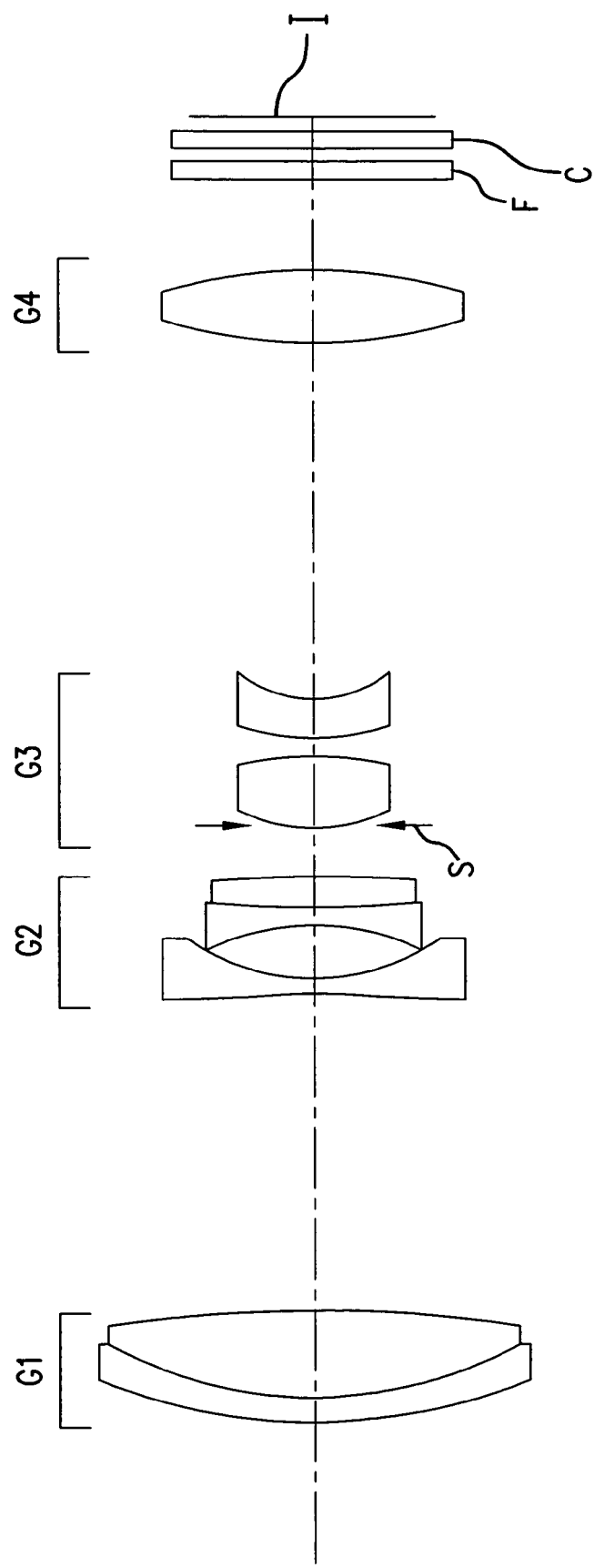
Figure 6A:
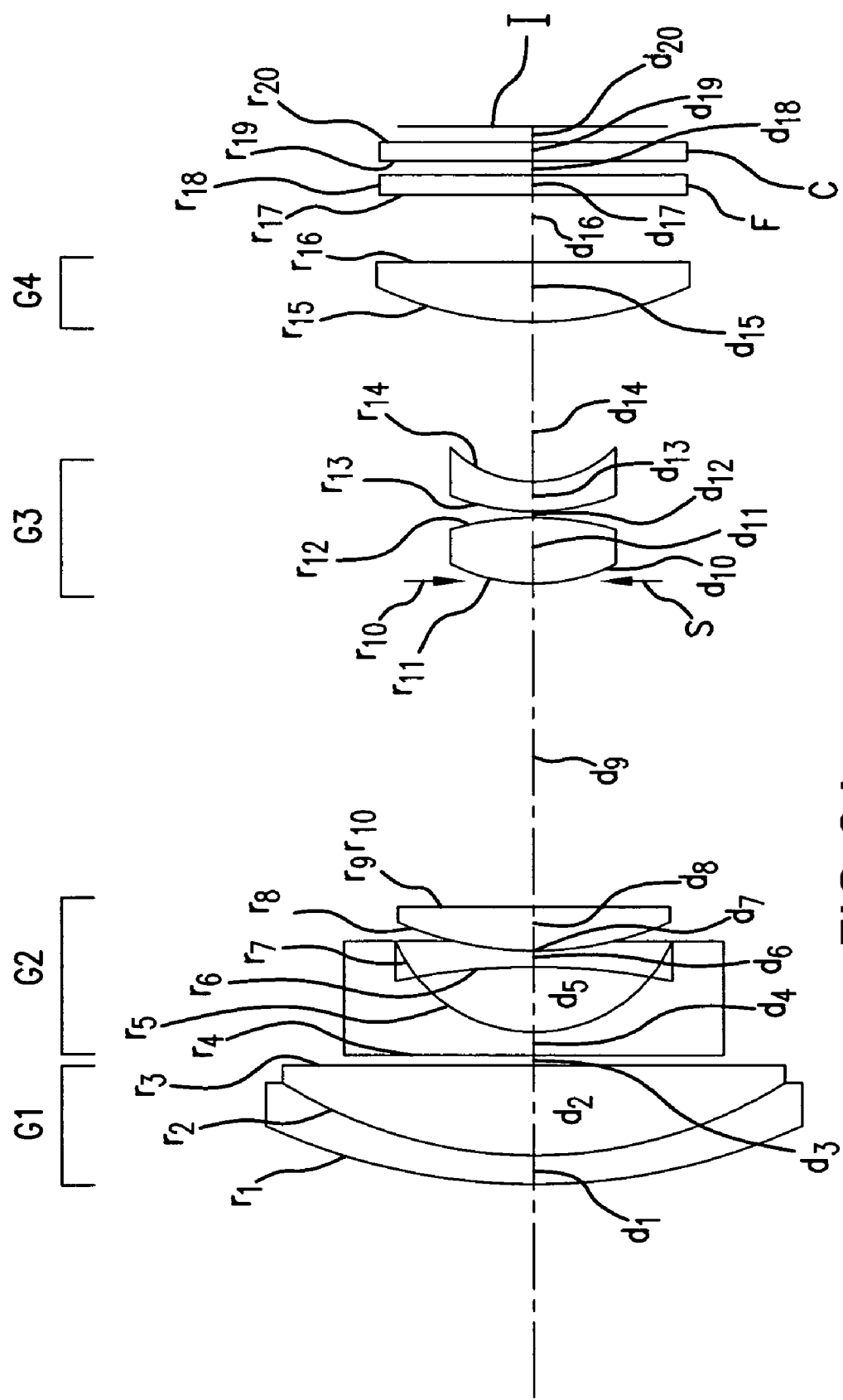
FIG. 6 is illustrative, as in FIG. 1, of Example 6 of the inventive zoom lens.
Figure 6B:
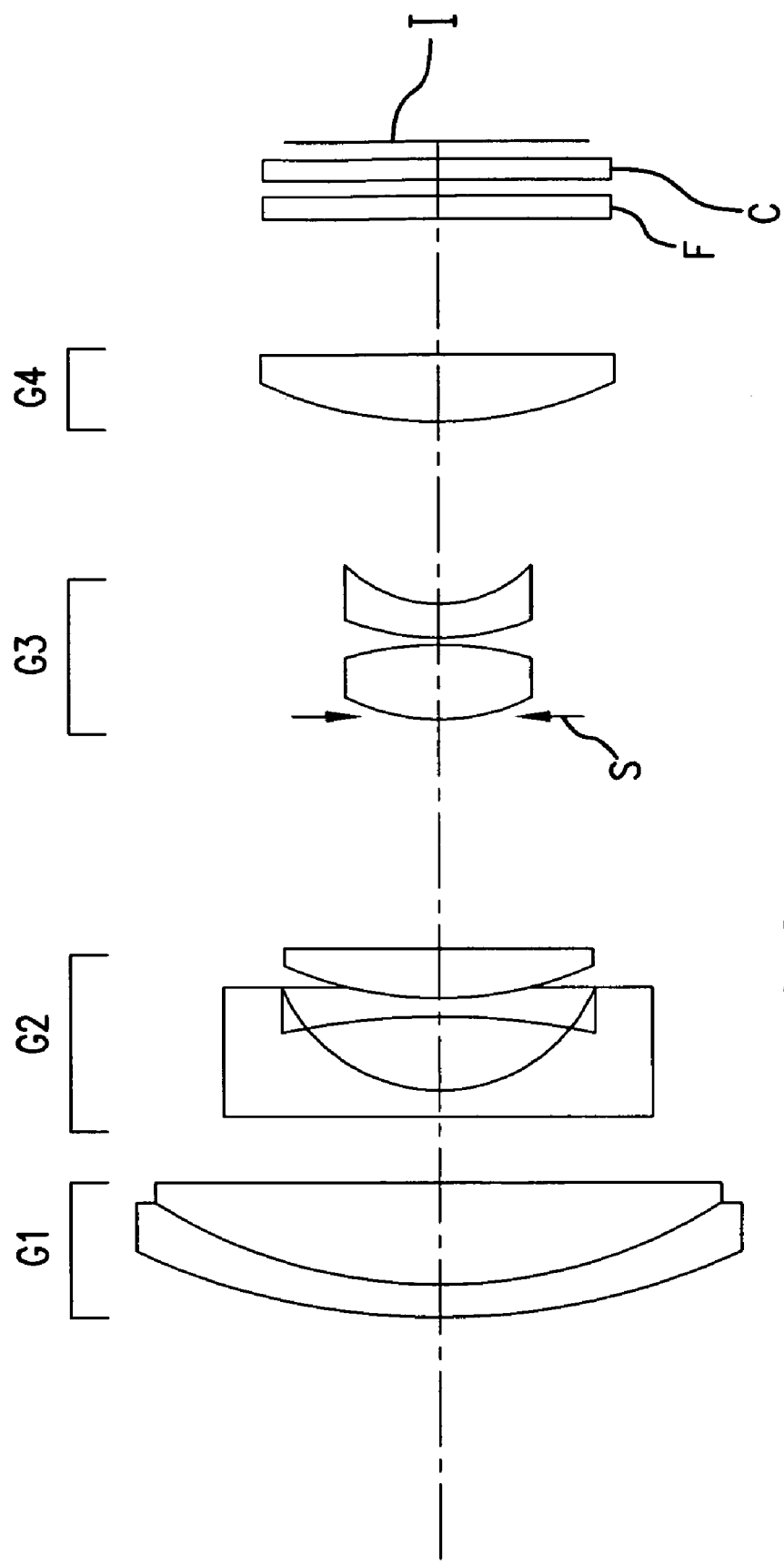
Figure 6C:
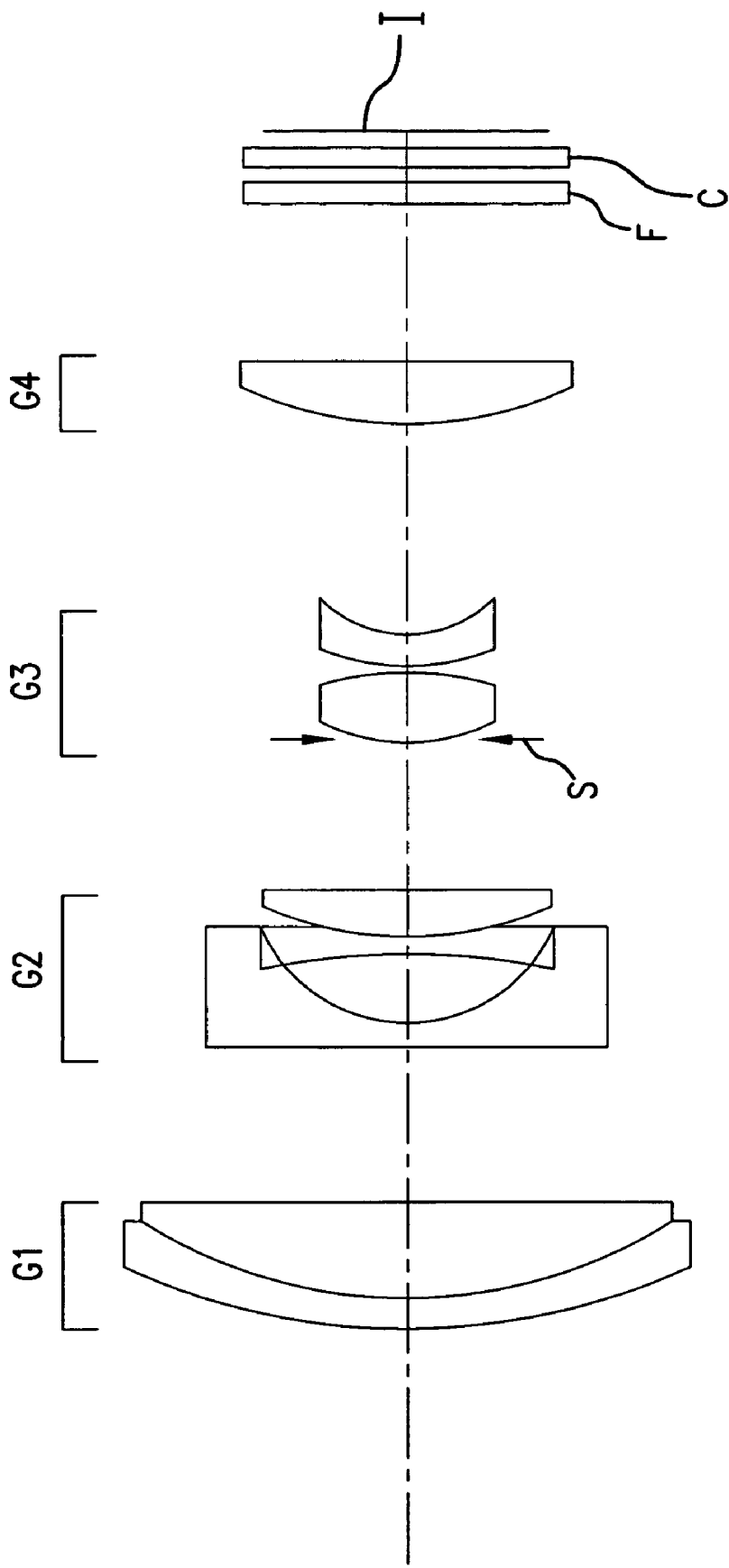
Figure 6D:
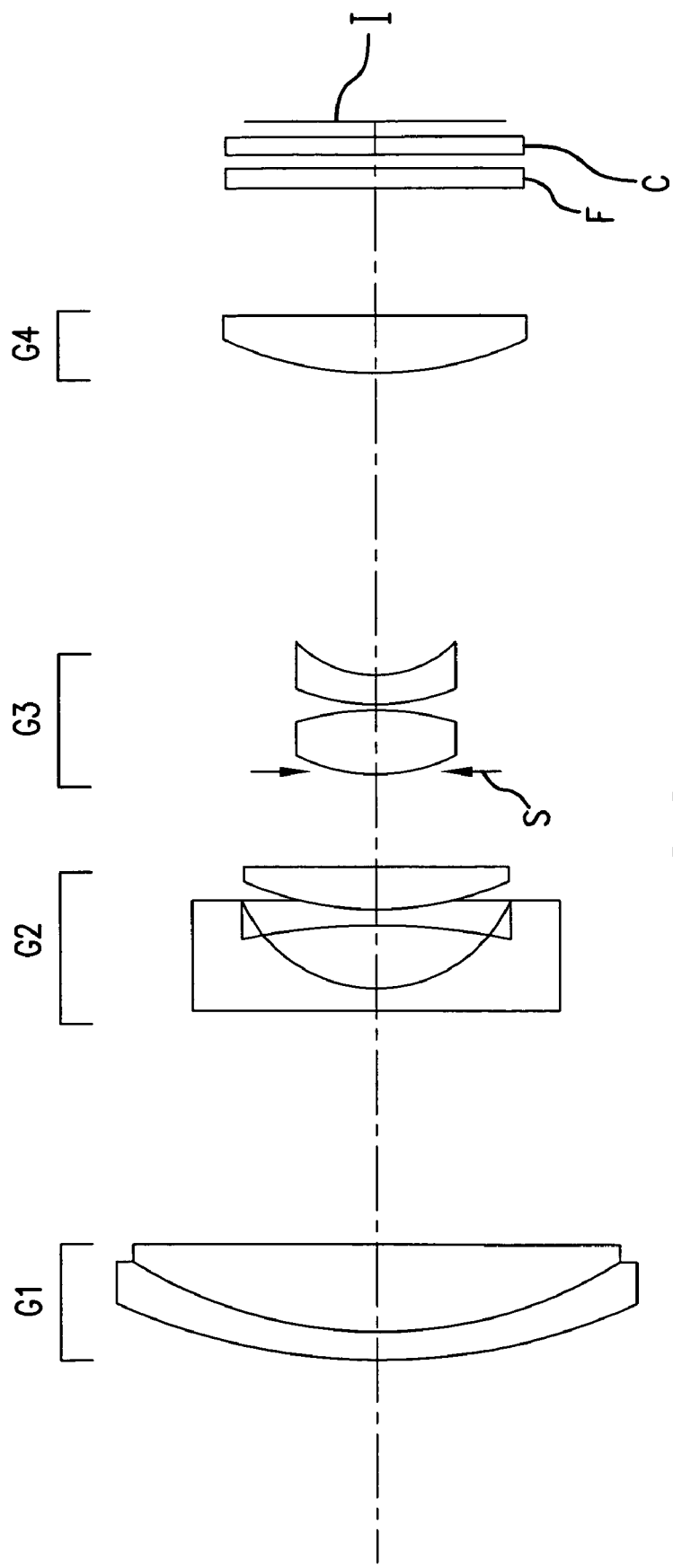
Figure 6E:
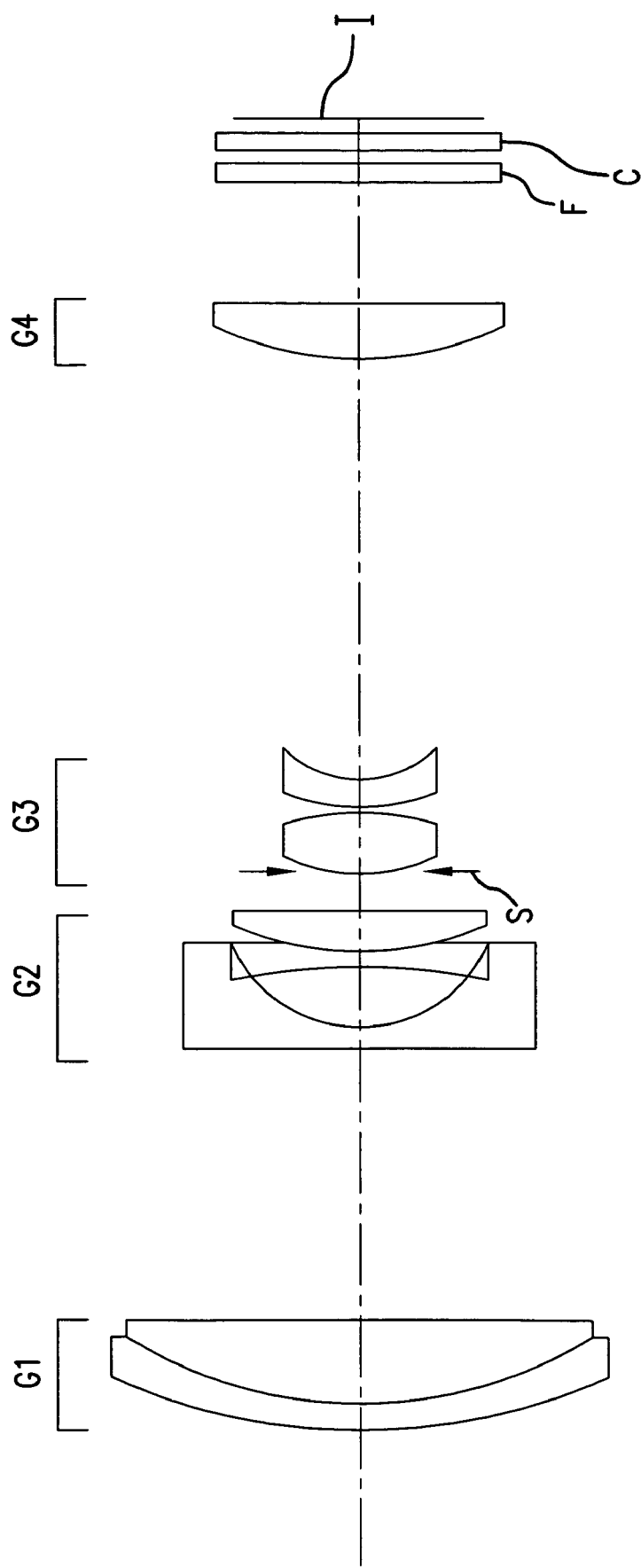
Figure 7A:
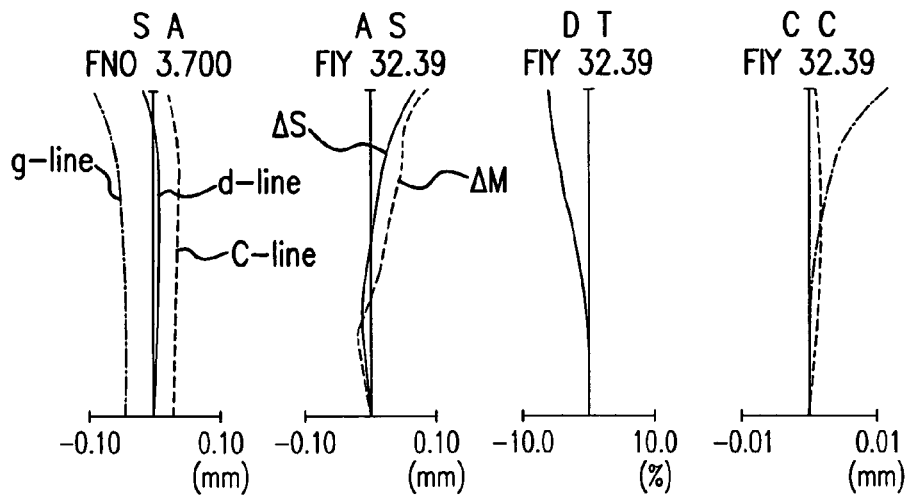
FIG. 7 is one aberration diagram for Example 1 upon focusing on an object point at infinity.
Figure 7B:
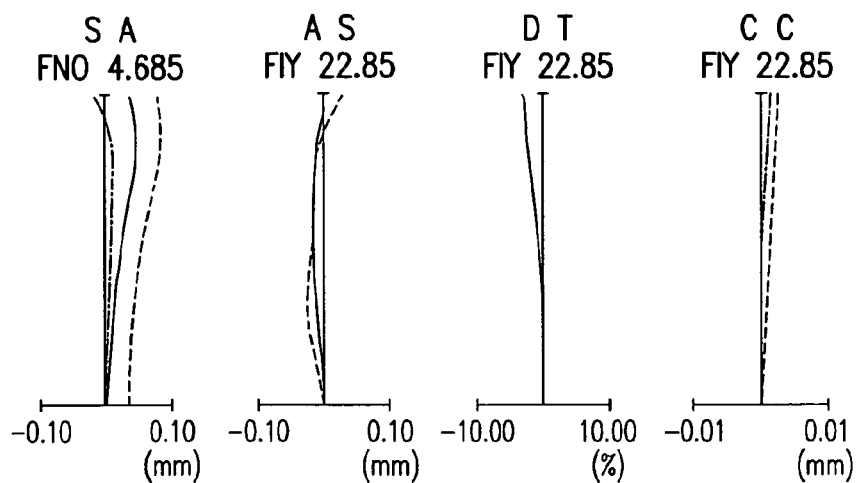
Figure 7C:
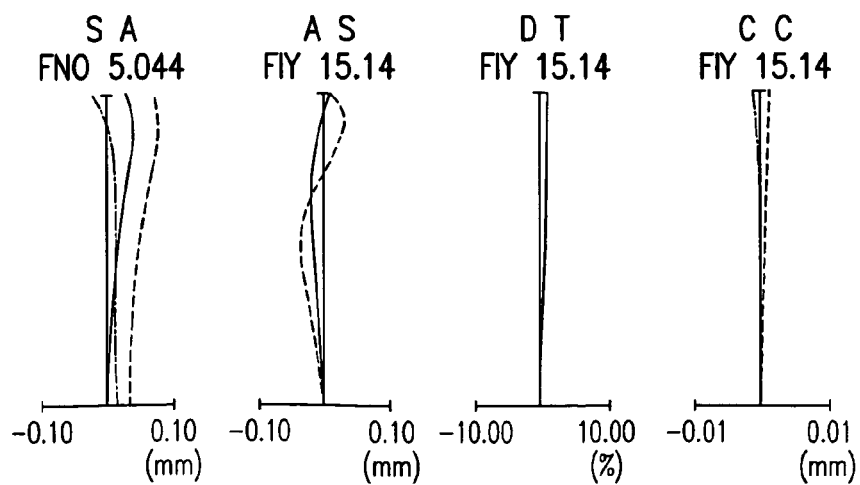
Figure 8A:
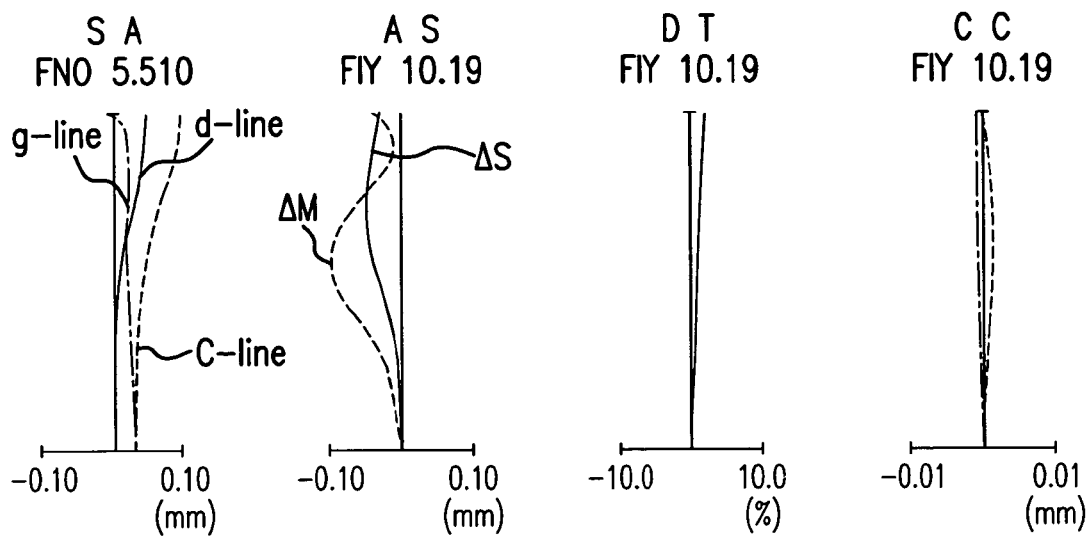
FIG. 8 is another aberration diagram for Example 1 upon focusing on an object point at infinity.
Figure 8B:
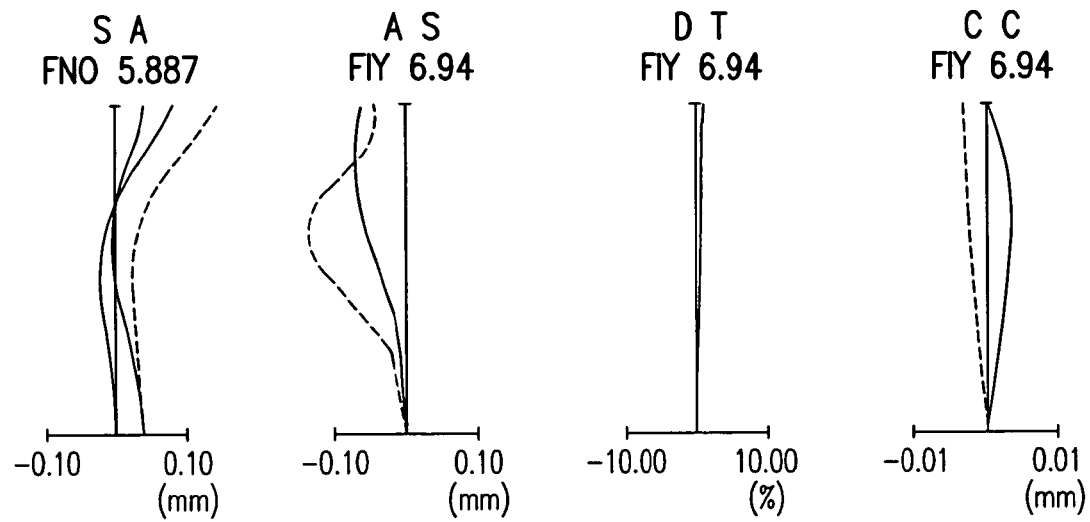
Figure 9A:
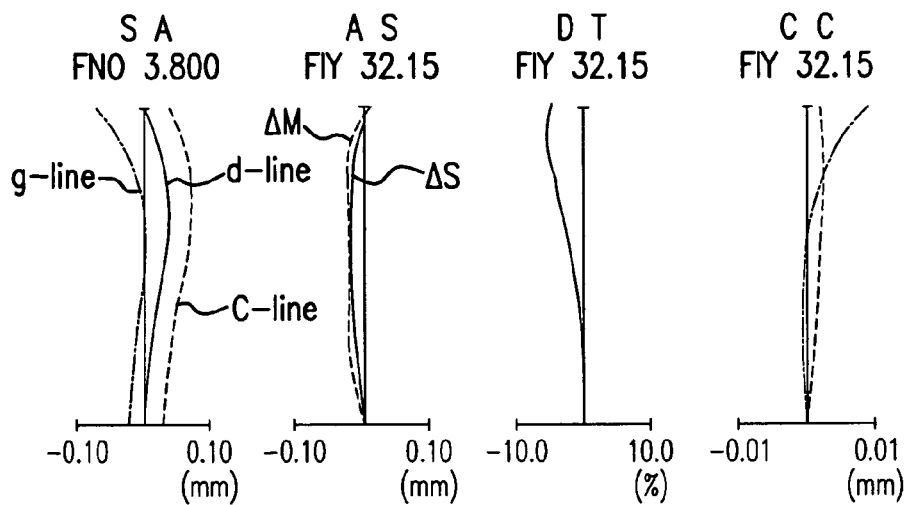
FIG. 9 is one aberration diagram for Example 2 upon focusing on an object point at infinity.
Figure 9B:
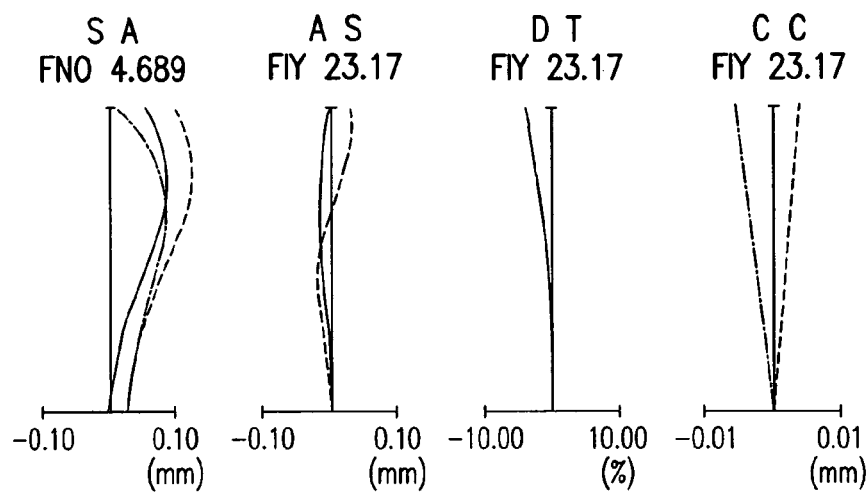
Figure 9C:
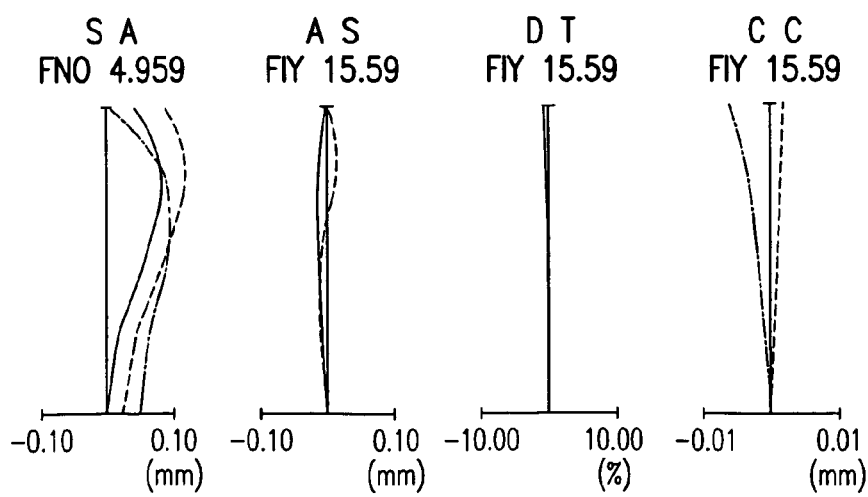
Figure 10A:
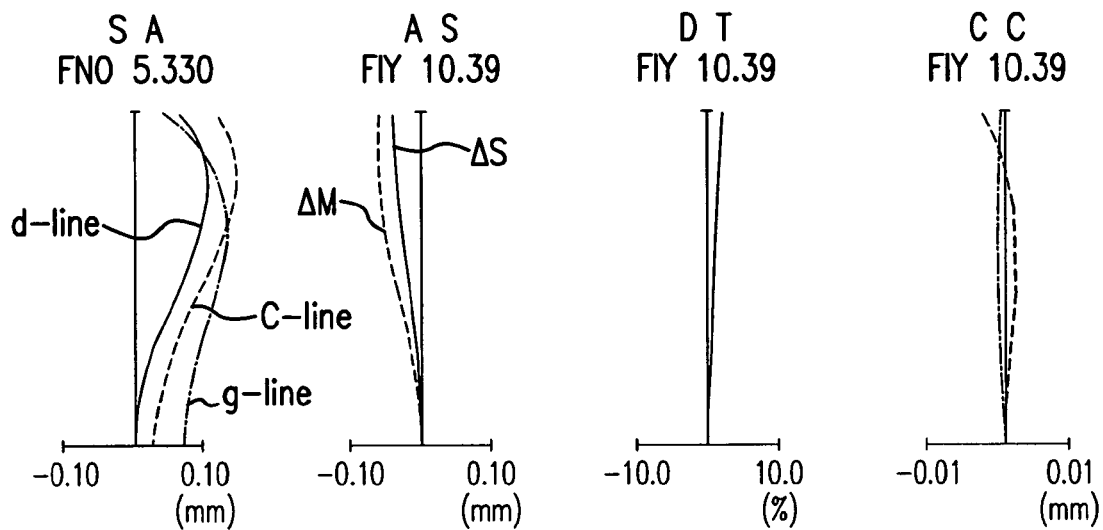
FIG. 10 is another aberration diagram for Example 2 upon focusing on an object point at infinity.
Figure 10B:
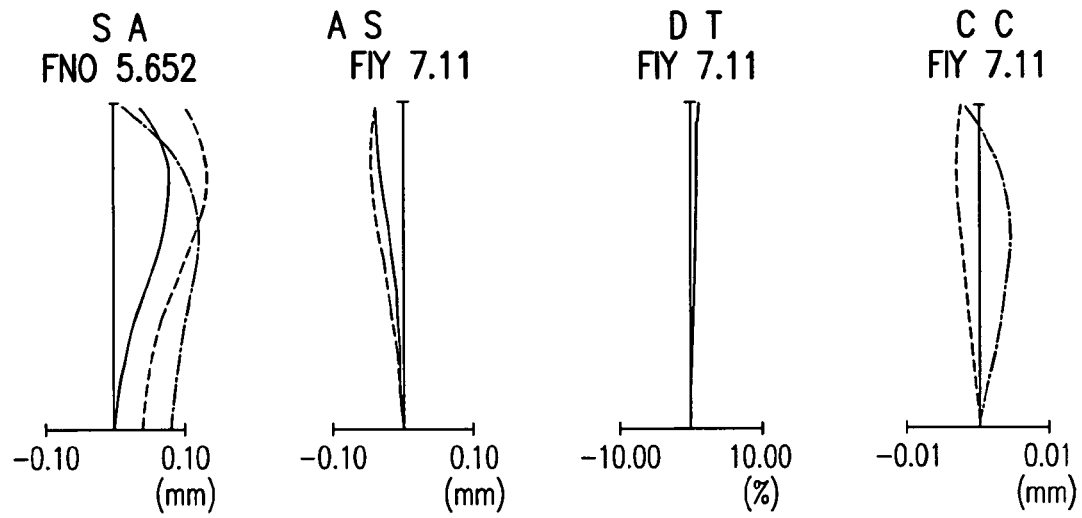
Figure 11A:
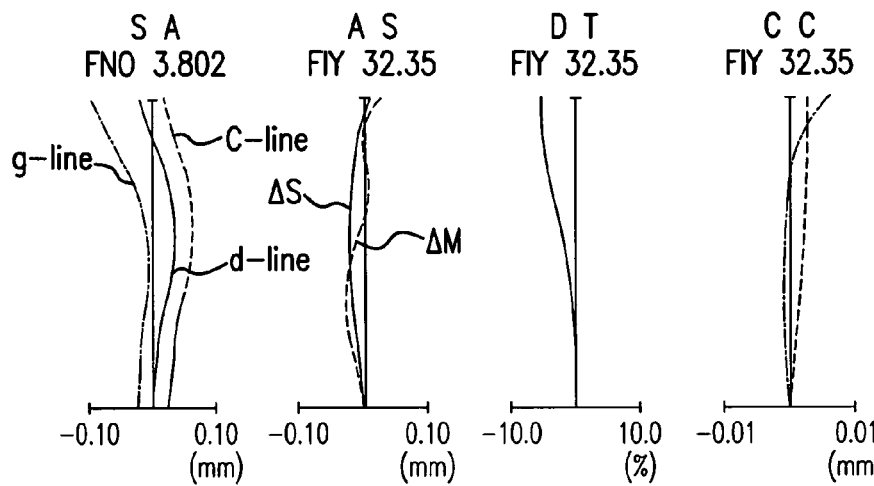
FIG. 11 is one aberration diagram for Example 3 upon focusing on an object point at infinity.
Figure 11B:
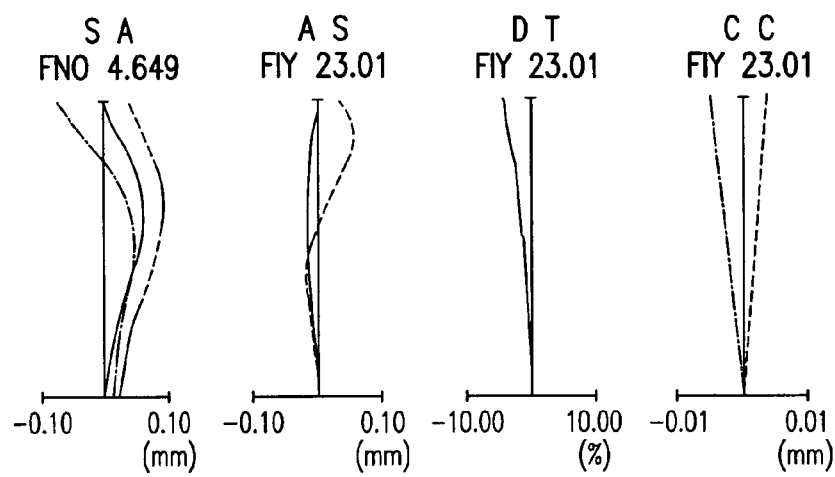
Figure 11C:
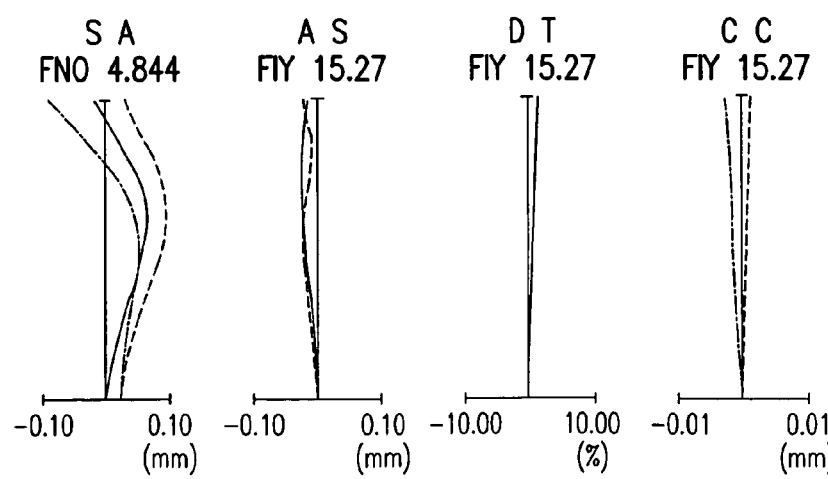
Figure 12A:
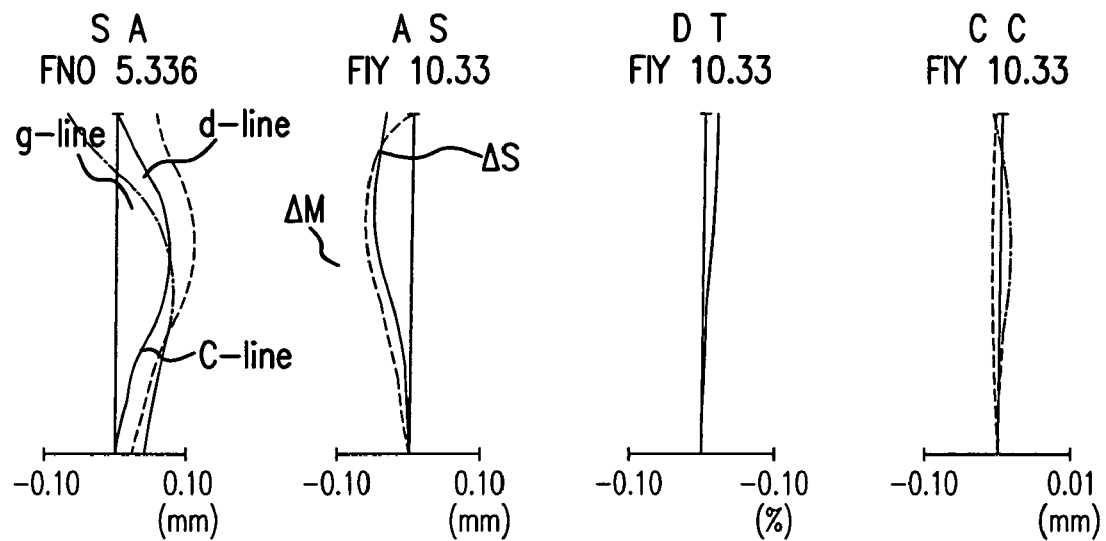
FIG. 12 is another aberration diagram for Example 3 upon focusing on an object point at infinity.
Figure 12B:
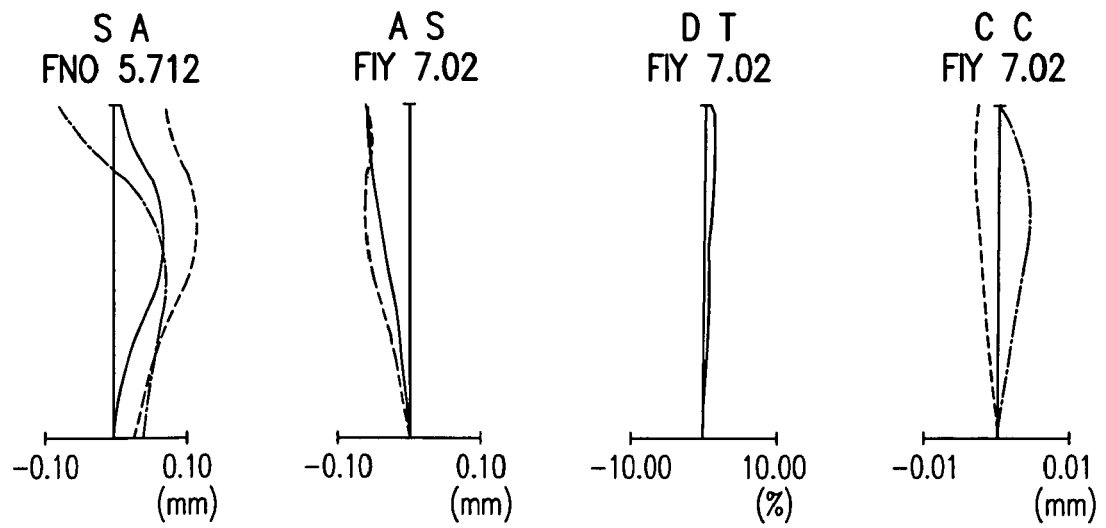
Figure 13A:
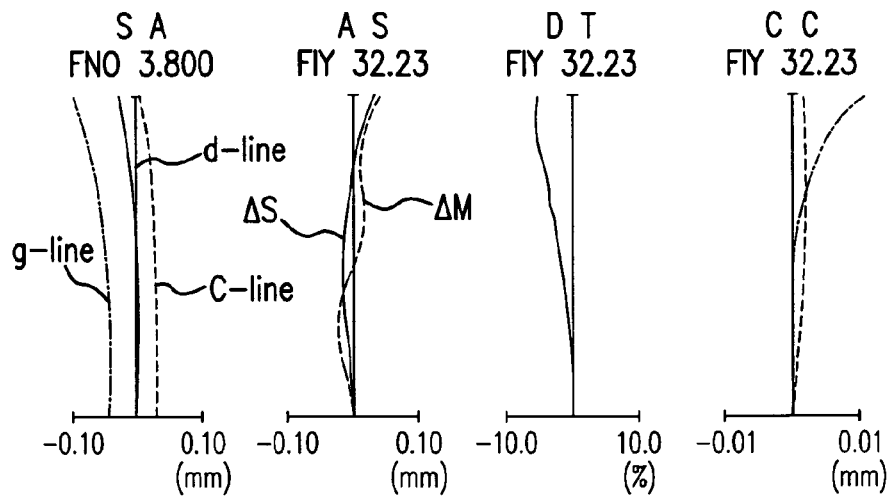
FIG. 13 is one aberration diagram for Example 4 upon focusing on an object point at infinity.
Figure 13B:
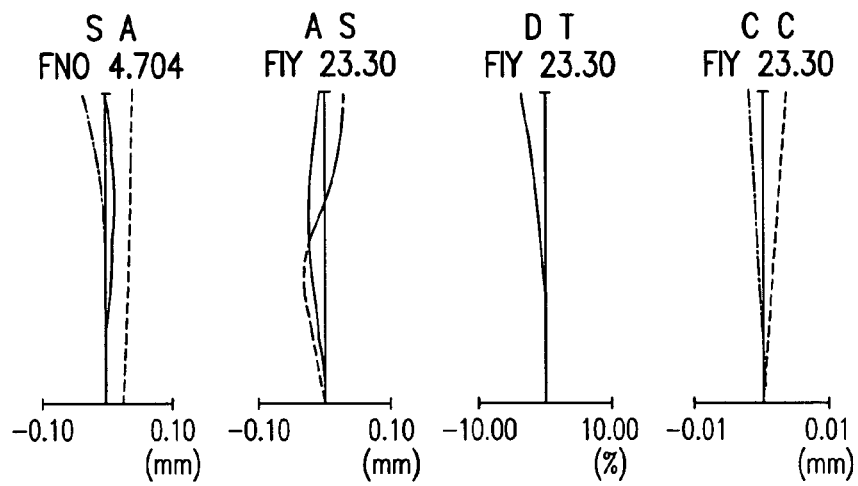
Figure 13C:
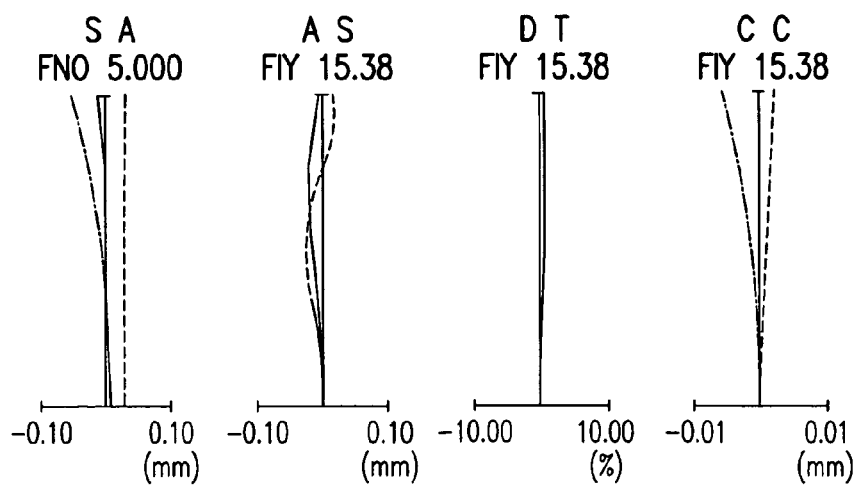
Figure 14A:
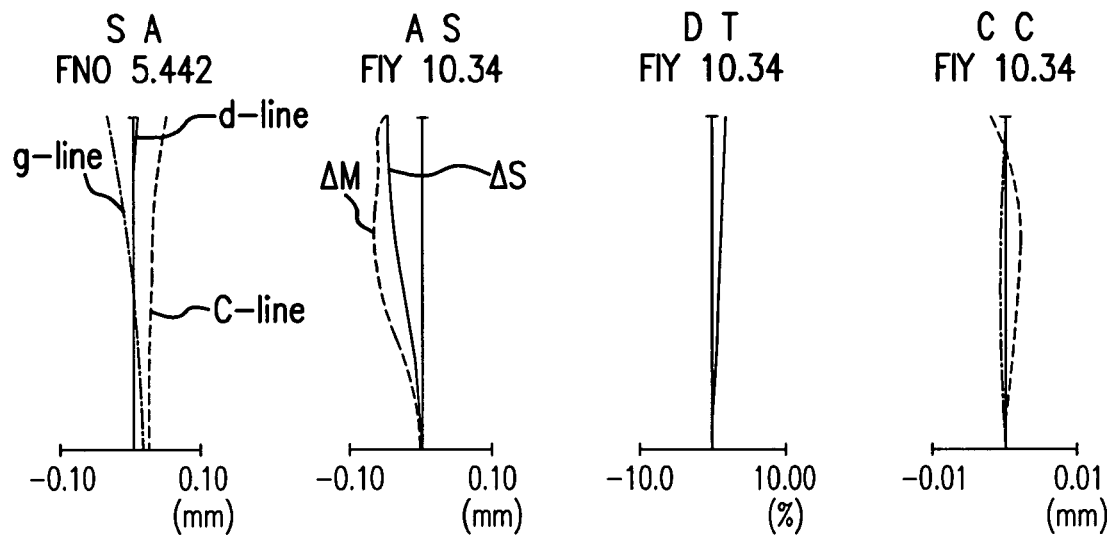
FIG. 14 is another aberration diagram for Example 4 upon focusing on an object point at infinity.
Figure 14B:
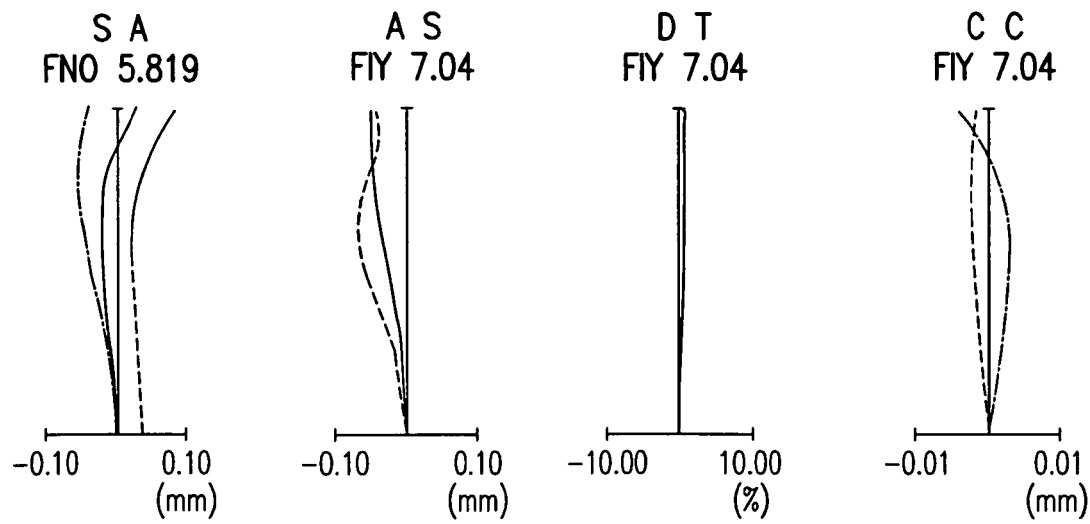
Figure 15A:
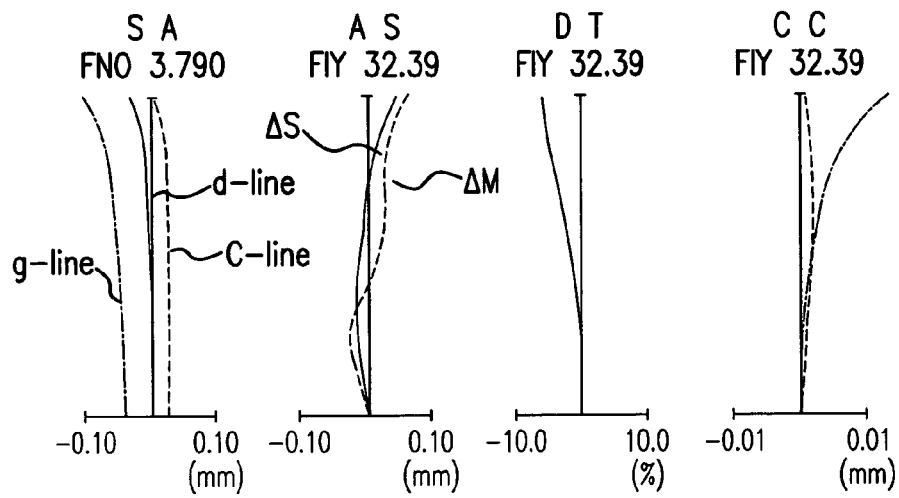
FIG. 15 is one aberration diagram for Example 5 upon focusing on an object point at infinity.
Figure 15B:
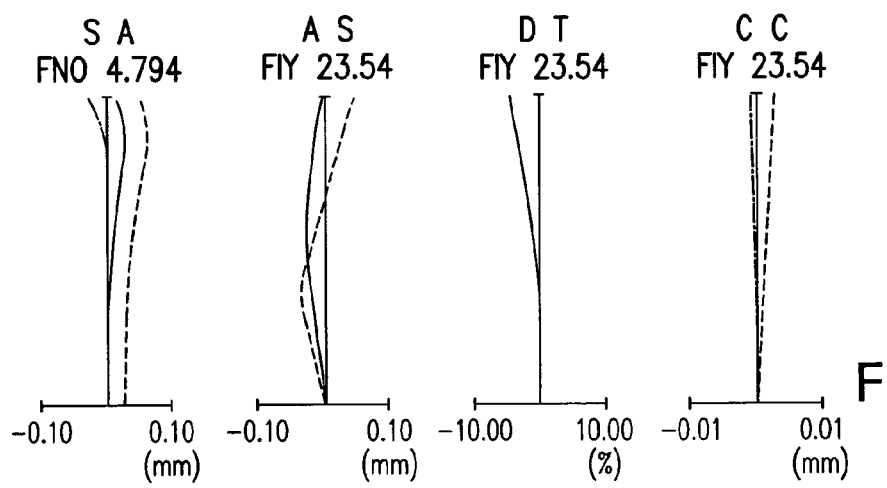
Figure 15C:
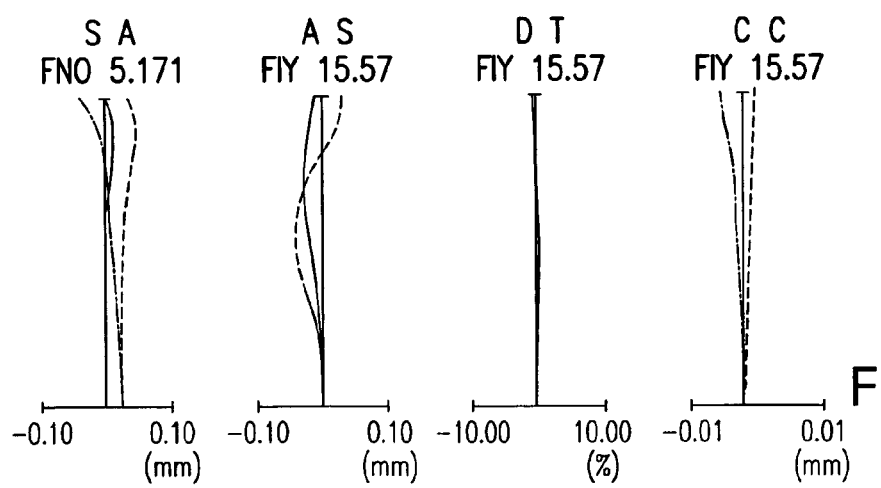
Figure 16A:
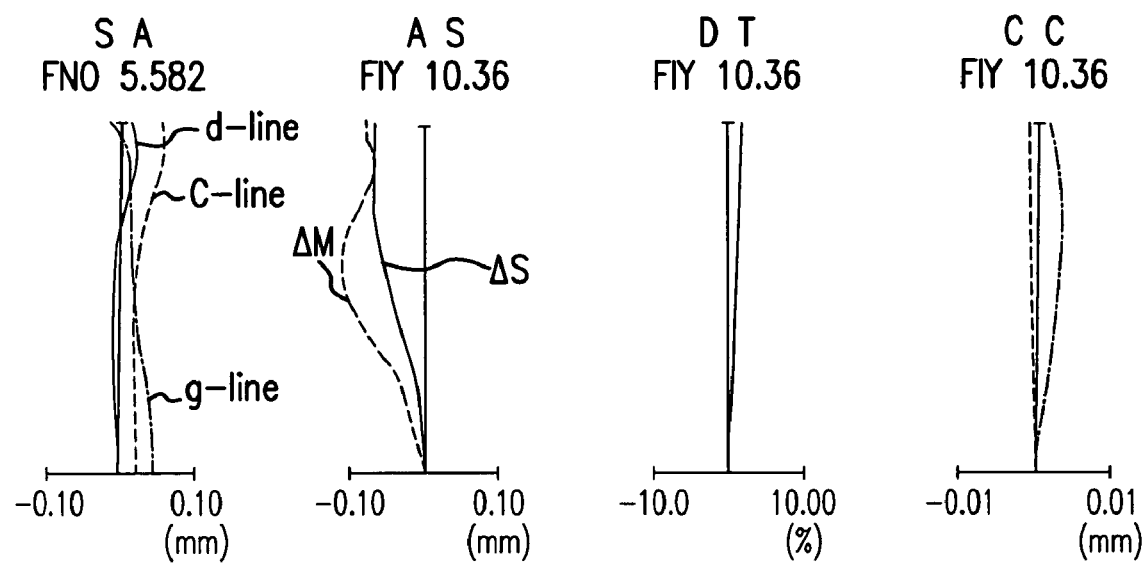
FIG. 16 is another aberration diagram for Example 5 upon focusing on an object point at infinity.
Figure 16B:
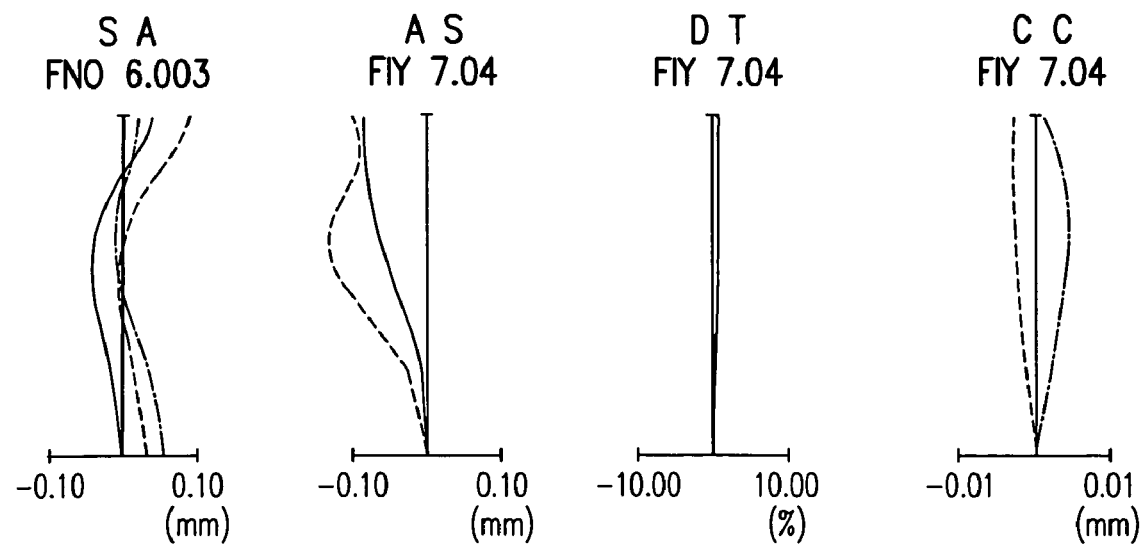
Figure 17A:
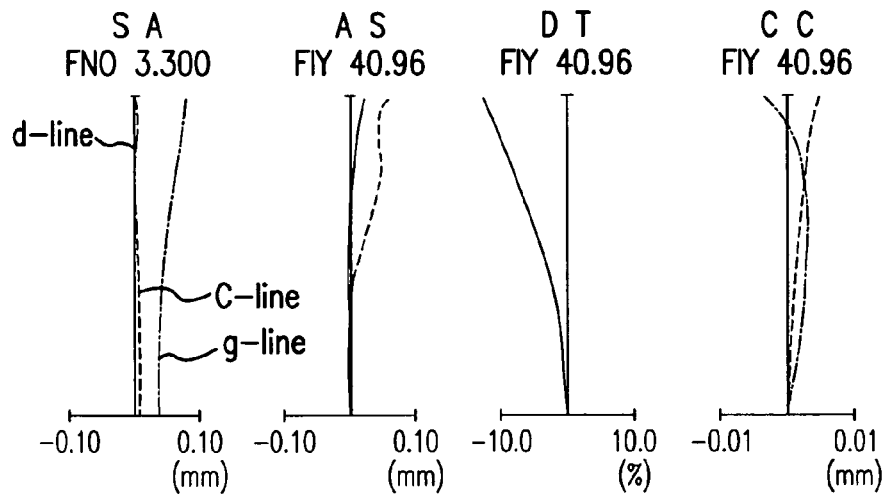
FIG. 17 is one aberration diagram for Example 6 upon focusing on an object point at infinity.
Figure 17B:
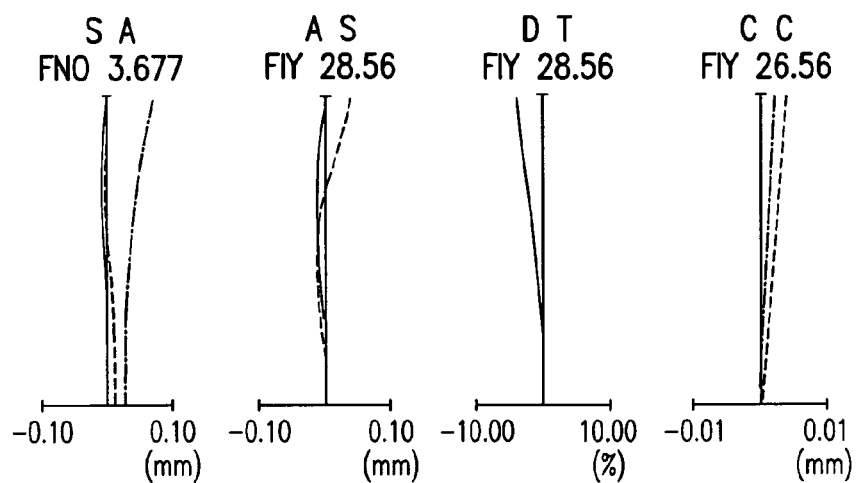
Figure 17C:
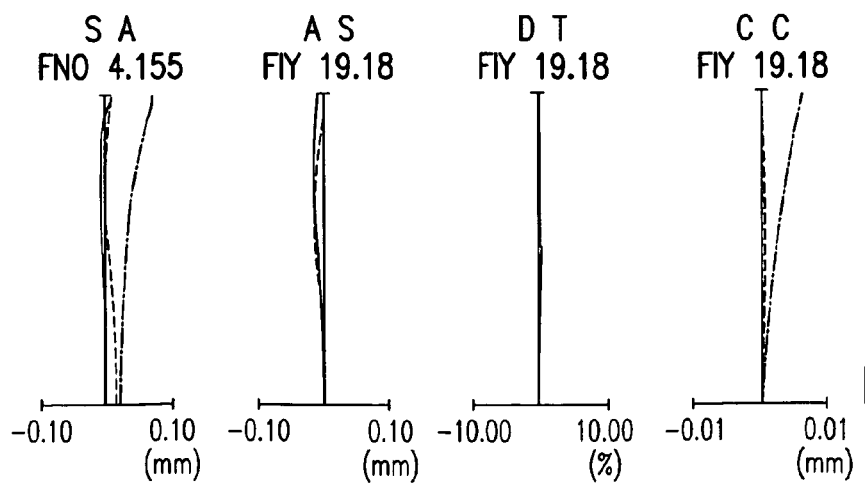
Figure 18A:
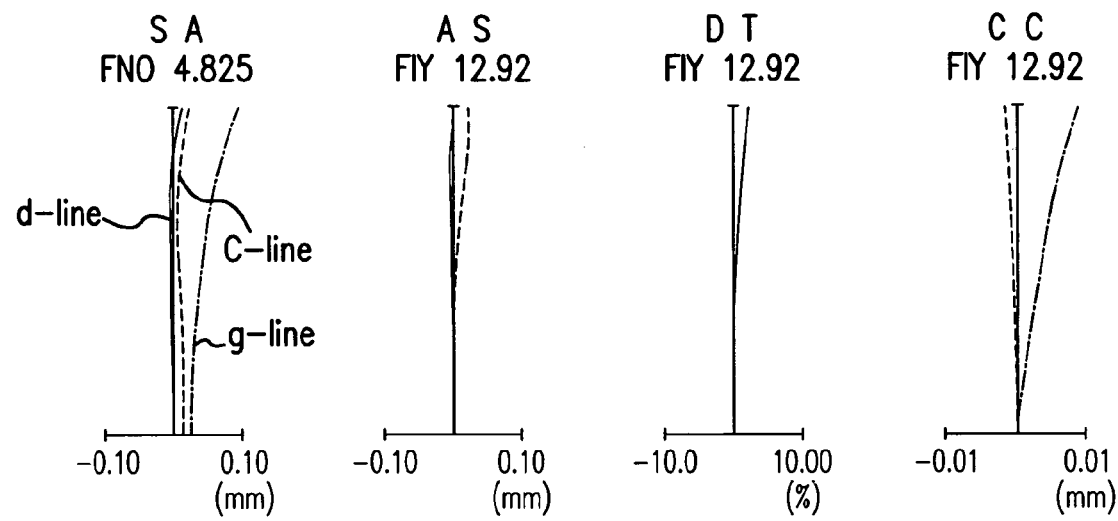
FIG. 18 is another aberration diagram for Example 6 upon focusing on an object point at infinity.
Figure 18B:
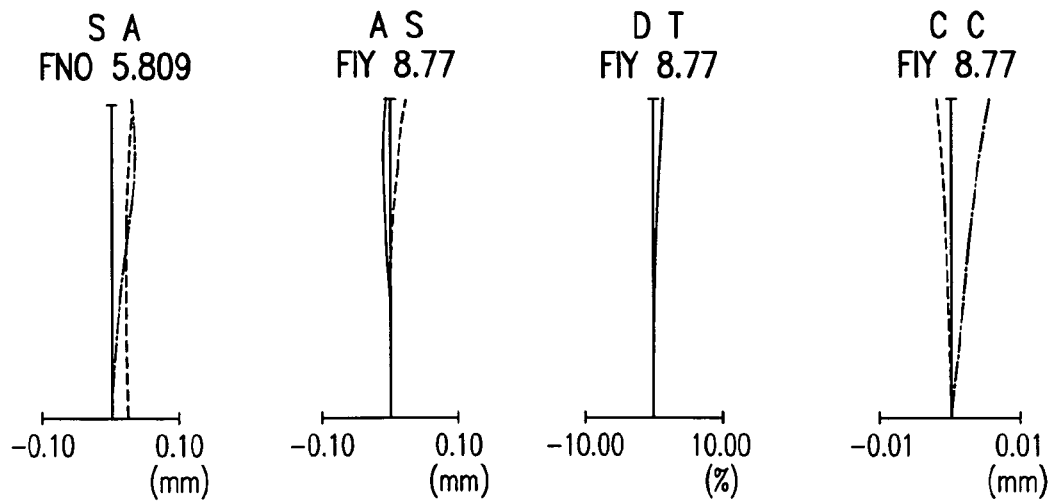

The zoom lens of Example 3 is made up of, in order from the object side, the first lens group of positive refracting power, the second lens group G2 of negative refracting power, the aperture stop S, the third lens group G3 of positive refracting power and the fourth lens group G4 of positive refracting power, as shown in FIG. 3.

Upon zooming from the wide-angle end to the telephoto end, the respective lens groups move as described just below.

The first lens group G1 moves toward the object side from the wide-angle end to the telephoto end.

From the wide-angle end to the point of change on the wide-angle side, the second lens group G2 moves toward the object side while the spacing with the first lens group G1 grows wide and the spacing with the third lens group G3 becomes narrow, and from the point of change on the wide-angle side to the intermediate state, it moves toward the image side while the spacing with the first lens group G1 grows wide and the spacing with the third lens group G3 becomes narrow. In the intermediate state, the second lens group G2 is positioned a little more on the image side than at the wide-angle end. From the intermediate state to the point of change on the telephoto side, the second lens group G2 moves toward the object side while the spacing with the first lens group G1 grows wide and the spacing with the third lens group G3 becomes narrow, and from the point of change on the telephoto side to the telephoto end, it moves toward the image side while the spacing with the first lens group G1 grows wide and the spacing with the third lens group G3 becomes narrow. At the point of change on the telephoto side, the second lens group G2 is positioned a little more on the object side than at the wide-angle end, and at the telephoto end, it is positioned a little more on the image side than at the wide-angle end.

From the wide-angle end to the telephoto end, the aperture stop S and the third lens group G3 move in unison toward the object side.

From the wide-angle end to the point of change on the wide-angle side, the fourth lens group G4 moves toward the image side while the spacing with the third lens group G3 grows wide, and from the point of change on the wide-angle side to the intermediate state, it moves toward the object side while the spacing with the third lens group G3 grows wide. In the intermediate state, the fourth lens group G4 is positioned a little more on the object side than at the wide-angle end.

From the intermediate state to the point of change on the telephoto side, the fourth lens group G4 moves toward the image side while the spacing with the third lens group G3 grows wide, and from the point of change on the telephoto side to the telephoto end, it moves toward the image side while the spacing with the third lens group G3 grows wide. At the point of change on the telephoto side, the fourth lens group G4 is positioned a little more on the image side than at the point of change on the wide-angle side, and at the telephoto end, it is positioned a little more on the image side than at the point of change on the telephoto side.

In order from the object side, the first lens group G1 is made up of a cemented lens of a negative meniscus lens convex on its object side and a double-convex positive lens; the second lens group G2 is made up of a double-concave negative lens and a cemented lens of a double-concave negative lens and a double-convex positive lens; the third lens group G3 is made up of a double-convex positive lens and a negative meniscus lens convex on its object side; and the fourth lens group G4 is made up of one double-convex positive lens.

Seven aspheric surfaces are used: one for the surface—located nearest to the image side—of the cemented lens forming the first lens group G1, two for both surfaces of the double-concave negative lens in the second lens group G2, two for both surfaces of the double-convex positive lens in the third lens group G3, and one for the object-side surface of the double-convex positive lens forming the fourth lens group G4.

The zoom lens of Example 4 is made up of, in order from the object side, the first lens group of positive refracting power, the second lens group G2 of negative refracting power, the aperture stop S, the third lens group G3 of positive refracting power and the fourth lens group G4 of positive refracting power, as shown in FIG. 4.

Upon zooming from the wide-angle end to the telephoto end, the respective lens groups move as described just below. The first lens group G1 moves toward the object side from the wide-angle end to the telephoto end.

From the wide-angle end to the point of change on the wide-angle side, the second lens group G2 moves toward the object side while the spacing with the first lens group G1 grows wide and the spacing with the third lens group G3 becomes narrow, and from the point of change on the wide-angle side to the intermediate state, it moves toward the image side while the spacing with the first lens group G1 grows wide and the spacing with the third lens group G3 becomes narrow. In the intermediate state, the second lens group G2 is positioned a little more on the image side than at the wide-angle end. From the intermediate state to the point of change on the telephoto side, the second lens group G2 moves toward the image side while the spacing with the first lens group G1 grows wide and the spacing with the third lens group G3 becomes narrow, and from the point of change on the telephoto side to the telephoto end, it moves toward the image side while the spacing with the first lens group G1 grows wide and the spacing with the third lens group G3 becomes narrow. At the point of change on the telephoto side, the second lens group G2 is positioned a little more on the image side than in the intermediate state, and at the telephoto end, it is positioned a little more on the image side than at the point of change on the telephoto side.

From the wide-angle end to the telephoto end, the aperture stop S and the third lens group G3 move in unison toward the object side.

From the wide-angle end to the point of change on the wide-angle side, the fourth lens group G4 moves toward the image side while the spacing with the third lens group G3 grows wide, and from the point of change on the wide-angle side to the intermediate state, it moves toward the object side while the spacing with the third lens group G3 grows wide. In the intermediate state, the fourth lens group G4 is positioned a little more on the object side than at the wide-angle end. From the intermediate state to the point of change on the telephoto side, the fourth lens group G4 moves toward the object side while the spacing with the third lens group G3 grows wide, and from the point of change on the telephoto side to the telephoto end, it moves toward the object side while the spacing with the third lens group G3 grows wide. At the point of change on the telephoto side, the fourth lens group G4 is positioned a little more on the object side than at the point of change on the wide-angle side, and a little more on the image side than at the wide-angle end, and at the telephoto end, it is positioned a little more on the image side than at the wide-angle end and a little more on the image object side than at the point of change on the telephoto side.

In order from the object side, the first lens group G1 is made up of a cemented lens of a negative meniscus lens convex on its object side and a double-convex positive lens; the second lens group G2 is made up of a double-concave negative lens and a cemented lens of a double-concave negative lens and a double-convex positive lens; the third lens group G3 is made up of a double-convex positive lens and a negative meniscus lens convex on its object side; and the fourth lens group G4 is made up of one double-convex positive lens.

Six aspheric surfaces are used: one for the surface—located nearest to the image side—of the cemented lens forming the first lens group G1, two for both surfaces of the double-concave negative lens in the second lens group G2, two for both surfaces of the double-convex positive lens in the third lens group G3, and one for the object-side surface of the double-convex positive lens forming the fourth lens group G4.

The zoom lens of Example 5 is made up of, in order from the object side, the first lens group of positive refracting power, the second lens group G2 of negative refracting power, the aperture stop S, the third lens group G3 of positive refracting power and the fourth lens group G4 of positive refracting power, as shown in FIG. 5.

Upon zooming from the wide-angle end to the telephoto end, the respective lens groups move as described just below. The first lens group G1 moves toward the object side from the wide-angle end to the telephoto end.

From the wide-angle end to the point of change on the wide-angle side, the second lens group G2 moves toward the object side while the spacing with the first lens group G1 grows wide and the spacing with the third lens group G3 becomes narrow, and from the point of change on the wide-angle side to the intermediate state, it moves toward the image side while the spacing with the first lens group G1 grows wide and the spacing with the third lens group G3 becomes narrow. In the intermediate state, the second lens group G2 is positioned more on the object side than at the wide-angle end. From the intermediate state to the point of change on the telephoto side, the second lens group G2 moves toward the object side while the spacing with the first lens group G1 grows wide and the spacing with the third lens group G3 becomes narrow, and from the point of change on the telephoto side to the telephoto end, it moves toward the image side while the spacing with the first lens group G1 grows wide and the spacing with the third lens group G3 becomes narrow. At the point of change on the telephoto side, the second lens group G2 is positioned a little more on the image side than at the point of change on the wide-angle side and a little more on the object side than in the intermediate state, and at the telephoto end, it is positioned more on the object side than at the wide-angle end and a little more of the image side than in the intermediate state From the wide-angle end to the telephoto end, the aperture stop S and the third lens group G3 move in unison toward the object side.

From the wide-angle end to the point of change on the wide-angle side, the fourth lens group G4 moves toward the image side while the spacing with the third lens group G3 grows wide, and from the point of change on the wide-angle side to the intermediate state, it moves toward the object side while the spacing with the third lens group G3 grows wide. In the intermediate state, the fourth lens group G4 is positioned a little more on the object side than at the wide-angle end. From the intermediate state to the point of change on the telephoto side, the fourth lens group G4 moves toward the image side while the spacing with the third lens group G3 grows wide, and from the point of change on the telephoto side to the telephoto end, it moves toward the object side while the spacing with the third lens group G3 grows wide. At the point of change on the telephoto side, the fourth lens group G4 is positioned a little more on the object side than at the point of change on the wide-angle side and more on the image side than at the wide-angle end, and at the telephoto end, it is positioned more on the image side than at the wide-angle end and a little more on the object side than at the change of point on the telephoto side.

In order from the object side, the first lens group G1 is made up of a cemented lens of a negative meniscus lens convex on its object side and a double-convex positive lens; the second lens group G2 is made up of a double-concave negative lens and a cemented lens of a double-concave negative lens and a double-convex positive lens; the third lens group G3 is made up of a double-convex positive lens and a negative meniscus lens convex on its object side; and the fourth lens group G4 is made up of one double-convex positive lens.

Six aspheric surfaces are used: one for the surface—located nearest to the image side—of the cemented lens forming the first lens group G1, two for both surfaces of the double-concave negative lens in the second lens group G2, two for both surfaces of the double-convex positive lens in the third lens group G3, and one for the object-side surface of the double-convex positive lens forming the fourth lens group G4.

The zoom lens of Example 6 is made up of, in order from the object side, the first lens group of positive refracting power, the second lens group G2 of negative refracting power, the aperture stop S, the third lens group G3 of positive refracting power and the fourth lens group G4 of positive refracting power, as shown in FIG. 6.

Upon zooming from the wide-angle end to the telephoto end, the respective lens-groups move as described just below.

The first lens group G1 moves toward the object side from the wide-angle end to the telephoto end.

From the wide-angle end to the intermediate state, the second lens group G2 moves toward the image side while the spacing with the first lens group G1 grows wide and the spacing with the third lens group G3 becomes narrow, and from the intermediate state to the telephoto end, it moves toward the object side while the spacing with the first lens group G1 grows wide and the spacing with the third lens group G3 becomes narrow. At the point of change on the telephoto side, the second lens group G2 is positioned a little more on the image side than at the wide-angle end and more on the object side than the point of change on the wide-angle side, and at the telephoto end, it is positioned more on the object side than at the wide-angle end.

From the wide-angle end to the telephoto end, the aperture stop S and the third lens group G3 move in unison toward the object side.

From the wide-angle end to the point of change on the wide-angle side, the fourth lens group G4 moves toward the image side while the spacing with the third lens group G3 grows wide, and from intermediate state to the point of change on the telephoto side, it moves toward the image side while the spacing with the third lens group G3 grows wide. At the point of change on the telephoto side, the fourth lens group G4 is positioned a little more on the object side than at the point of change on the wide-angle side, and at the telephoto end, it is positioned a little more on the image side than in the intermediate state and a little more on the object side than at the point of change on the telephoto side.

In order from the object side, the first lens group G1 is made up of a cemented lens of a negative meniscus lens convex on its object side and a negative meniscus lens convex on its object side; the second lens group G2 is made up of a negative meniscus lens convex on its object side, a double-concave negative lens and a positive meniscus lens convex on its object side; the third lens group G3 is made up of a double-convex positive lens and a negative meniscus lens convex on its object side; and the fourth lens group G4 is made up of one positive meniscus lens convex on its object side.

Five aspheric surfaces are used: two for both surfaces of the double-concave negative lens in the second lens group G2, two for both surfaces of the double-convex positive lens in the third lens group G3, and one for the image-side surface of the negative meniscus lens in the third lens group G3.

In Example 1, 2, 3, 4, and 5, the negative lens located in, and nearest to the object side of, the second lens group G2 is a glass lens, and the negative lens just on its image side is a glass lens. In Example 6, the negative lens located in, and nearest to the object side of, the second lens group G2 is a plastic lens, and the negative lens just on its image side is a plastic lens.

Suppose here that x is an optical axis with the direction of travel of light being positive and y is a direction orthogonal to the optical axis. Then, the aspheric surface shape involved is given by $$x=(y^2/r)/[1+\{1-(K+1)(y/r)^2\}^{1/2}]+A_4 y^4+A_6 y^6+A_8 y^8+A_{10} y^{10}$$

where r is a paraxial radius of curvature, K is a conic coefficient, and $A_4$, $A_6$, $A_8$ and $A_{10}$ are the fourth-, sixth-, eighth- and tenth-order aspheric coefficients.

Numerical Example 1

Unit mm

Surface data

| Surface No. | r | d | nd | vd |
|---|---|---|---|---|
| 1 | 19.348 | 0.80 | 1.84666 | 23.78 |
| 2 | 13.468 | 3.07 | 1.58233 | 59.30 |
| 3 (Aspheric surface) | −46.885 | Variable | | |
| 4 (Aspheric surface) | −14.693 | 0.70 | 1.52542 | 55.78 |
| 5 (Aspheric surface) | 8.596 | 2.36 | | |
| 6 | −7.064 | 0.41 | 1.61772 | 49.81 |
| 7 | 32.985 | 1.21 | 1.92286 | 18.90 |
| 8 | −32.985 | Variable | | |
| 9 (Stop) | ∞ | −0.10 | | |
| 10 (Aspheric surface) | 5.318 | 2.41 | 1.58233 | 59.30 |
| 11 (Aspheric surface) | −9.464 | 0.34 | | |
| 12 | 6.861 | 1.48 | 1.92286 | 18.90 |
| 13 | 3.451 | Variable | | |
| 14 (Aspheric surface) | 19.426 | 2.47 | 1.52542 | 55.78 |
| 15 | −16.727 | Variable | | |
| 16 | ∞ | 0.50 | 1.51633 | 64.14 |
| 17 | ∞ | 0.50 | | |
| 18 | ∞ | 0.50 | 1.51633 | 64.14 |
| 19 | ∞ | 0.59 | | |
| Image plane | ∞ | | | |

-continued

Unit mm

Aspheric Surface data

3rd surface $K = -8.273, A4 = 1.02528E-05, A6 = 2.23537E-07,$
$A8 = -6.92546E-09, A10 = 6.31578E-11$ 4th surface $K = -71.439, A4 = 3.06012E-04, A6 = 2.11113E-05,$
$A8 = -1.01947E-06, A10 = 1.38358E-08$ 5th surface $K = 0.975, A4 = 2.34067E-03, A6 = -1.70768E-04,$
$A8 = 1.65358E-05, A10 = -5.19352E-07$ 10th surface $K = -4.225, A4 = 1.73712E-03, A6 = -2.15108E-04,$
$A8 = 7.54343E-07, A10 = 6.66853E-09$ 11th surface $K = 5.493, A4 = 7.36536E-04, A6 = -8.38739E-05,$
$A8 = 5.33716E-07, A10 = 5.34934E-10$ 14th surface $K = -80.176, A4 = 1.25061E-03, A6 = -5.40302E-05,$
$A8 = 1.77633E-06, A10 = -2.69508E-08$ Various data
Zoom ratio 4.84

|  | Wide-angle | Point of change on the wide-angle side | Intermediate |
|---|---|---|---|
| Focal length | 6.46 | 9.42 | 14.09 |
| F-NUMBER | 3.70 | 4.69 | 5.04 |
| Angle of view | 64.78 | 45.70 | 30.28 |
| Image height | 3.84 | 3.84 | 3.84 |
| Total lens length | 32.71 | 36.00 | 39.38 |
| BF | 5.87 | 4.58 | 5.67 |
| d3 | 0.41 | 1.50 | 5.13 |
| d8 | 8.59 | 6.91 | 4.68 |
| d13 | 2.95 | 8.12 | 9.00 |
| d15 | 4.14 | 2.81 | 3.91 |

|  | Point of change on the telephoto side | Telephoto |
|---|---|---|
| Focal length | 21.02 | 31.25 |
| F-NUMBER | 5.51 | 5.89 |
| Angle of view | 20.38 | 13.88 |
| Image height | 3.84 | 3.84 |
| Total lens length | 43.05 | 45.28 |
| BF | 5.27 | 5.08 |
| d3 | 8.49 | 11.16 |
| d8 | 3.25 | 1.40 |
| d13 | 11.15 | 12.74 |
| d15 | 3.51 | 3.33 |

Data on zoom lens groups

| Group | Starting surface | Focal length |
|---|---|---|
| 1 | 1 | 27.70 |
| 2 | 4 | -6.45 |
| 3 | 10 | 8.94 |
| 4 | 14 | 17.52 |

Numerical Example 2

Unit mm

Surface data

| Surface No. | r | d | nd | vd |
|---|---|---|---|---|
| 1 | 20.246 | 0.70 | 1.84666 | 23.78 |
| 2 | 13.427 | 0.30 |  |  |
| 3 | 14.788 | 3.31 | 1.74100 | 52.64 |
| 4 | -132.762 | Variable |  |  |
| 5 (Aspheric surface) | -29.056 | 0.70 | 1.52542 | 55.78 |
| 6 (Aspheric surface) | 8.310 | 2.29 |  |  |
| 7 | -9.171 | 0.55 | 1.88300 | 40.76 |
| 8 | 47.831 | 1.35 | 1.92286 | 18.90 |
| 9 | -22.979 | Variable |  |  |
| 10 (Stop) | ∞ | 0.00 |  |  |
| 11 (Aspheric surface) | 4.028 | 2.40 | 1.73077 | 40.51 |
| 12 (Aspheric surface) | -25.220 | 0.10 |  |  |
| 13 | 6.662 | 0.54 | 1.92286 | 18.90 |
| 14 | 2.948 | Variable |  |  |
| 15 (Aspheric surface) | 28.700 | 2.00 | 1.67790 | 55.34 |
| 16 | -17.606 | Variable |  |  |
| 17 | ∞ | 0.50 | 1.51633 | 64.14 |
| 18 | ∞ | 0.50 |  |  |
| 19 | ∞ | 0.50 | 1.51633 | 64.14 |
| 20 | ∞ | 0.59 |  |  |
| Image plane | ∞ |  |  |  |

Aspheric Surface data

5th surface $K = -123.822, A4 = 3.35608E-04, A6 = 6.26970E-07,$
$A8 = 9.32877E-09, A10 = 2.68311E-11$ 6th surface $K = 2.188, A4 = 1.74251E-04, A6 = -1.51404E-05,$
$A8 = 4.03487E-08, A10 = -4.07113E-11$ 11th surface $K = -1.796, A4 = 1.79320E-03, A6 = 1.26608E-06,$
$A8 = -2.43435E-09, A10 = -3.29548E-11$ 12th surface $K = 2.351, A4 = 6.63127E-04, A6 = -3.95308E-06,$
$A8 = 8.95305E-09, A10 = 1.76054E-11$ 15th surface $K = -5.973, A4 = 2.08145E-04, A6 = -3.11220E-07,$
$A8 = -3.39168E-09, A10 = -4.12341E-11$ Various data
Zoom ratio 4.80

|  | Wide-angle | Point of change on the wide-angle side | Intermediate |
|---|---|---|---|
| Focal length | 6.45 | 9.42 | 13.86 |
| F-NUMBER | 3.80 | 4.69 | 4.96 |
| Angle of view | 64.30 | 46.34 | 31.18 |
| Image height | 3.84 | 3.84 | 3.84 |
| Total lens length | 34.45 | 36.18 | 39.47 |
| BF | 6.00 | 5.78 | 6.68 |
| d4 | 0.37 | 1.07 | 5.05 |
| d9 | 9.99 | 7.12 | 4.81 |
| d14 | 4.12 | 8.23 | 8.95 |
| d16 | 4.30 | 4.07 | 4.96 |

|  | Point of change on the telephoto side | Telephoto |
|---|---|---|
| Focal length | 20.85 | 31.00 |
| F-NUMBER | 5.33 | 5.65 |
| Angle of view | 20.78 | 14.22 |
| Image height | 3.84 | 3.84 |
| Total lens length | 43.38 | 45.06 |

-continued

| Unit mm | | |
|---|---|---|
| BF | 5.75 | 5.79 |
| d4 | 9.10 | 11.71 |
| d9 | 3.48 | 1.09 |
| d14 | 11.07 | 12.49 |
| d16 | 4.05 | 4.06 |

Data on zoom lens groups

| Group | Starting surface | Focal length |
|---|---|---|
| 1 | 1 | 28.91 |
| 2 | 5 | −7.14 |
| 3 | 11 | 9.76 |
| 4 | 15 | 16.38 |

Numerical Example 3

Unit mm

Surface data

| Surface No. | r | d | nd | νd |
|---|---|---|---|---|
| 1 | 20.036 | 0.70 | 1.84666 | 23.78 |
| 2 | 14.064 | 3.33 | 1.58313 | 59.38 |
| 3 (Aspheric surface) | −45.329 | Variable | | |
| 4 (Aspheric surface) | −18.628 | 0.70 | 1.52542 | 55.78 |
| 5 (Aspheric surface) | 9.064 | 2.18 | | |
| 6 | −11.292 | 0.55 | 1.74100 | 52.64 |
| 7 | 22.629 | 1.26 | 1.92286 | 18.90 |
| 8 | −103.658 | Variable | | |
| 9 (Stop) | ∞ | 0.00 | | |
| 10 (Aspheric surface) | 3.621 | 1.90 | 1.58313 | 59.38 |
| 11 (Aspheric surface) | −12.057 | 0.39 | | |
| 12 | 9.689 | 0.60 | 1.60687 | 27.03 |
| 13 (Aspheric surface) | 2.733 | Variable | | |
| 14 (Aspheric surface) | 18.299 | 2.30 | 1.58313 | 59.38 |
| 15 | −21.127 | Variable | | |
| 16 | ∞ | 0.50 | 1.51633 | 64.14 |
| 17 | ∞ | 0.50 | | |
| 18 | ∞ | 0.50 | 1.51633 | 64.14 |
| 19 | ∞ | 0.59 | | |
| Image plane | ∞ | | | |

Aspheric Surface data

3rd surface $K = -15.332, A4 = -1.88932E-06, A6 = 1.70310E-07,$
$A8 = -2.61058E-09, A10 = 2.32345E-11$ 4th surface $K = -38.248, A4 = 5.19477E-04, A6 = -7.34006E-06,$
$A8 = 1.90845E-08, A10 = 1.82324E-10$ 5th surface $K = 1.559, A4 = 7.23100E-04, A6 = 7.91893E-06,$
$A8 = 3.94183E-08, A10 = -2.48833E-10$ 10th surface $K = -2.245, A4 = 4.57660E-03, A6 = 5.97720E-05,$
$A8 = -2.12712E-09, A10 = 1.45359E-11$ 11th surface $K = -35.219, A4 = 2.68117E-03, A6 = -4.95470E-05,$
$A8 = -3.64104E-09, A10 = 2.57477E-11$ 13th surface $K = 0.239, A4 = -5.63287E-03, A6 = 1.48575E-05,$
$A8 = -1.10759E-09, A10 = 1.06832E-10$ -continued Unit mm 14th surface $K = -12.385, A4 = 4.09059E-04, A6 = -1.61530E-06,$
$A8 = 3.70838E-08, A10 = 4.60643E-11$ Various data
Zoom ratio 4.80

| | Wide-angle | Point of change on the wide-angle side | Intermediate |
|---|---|---|---|
| Focal length | 6.45 | 9.44 | 13.88 |
| F-NUMBER | 3.80 | 4.65 | 4.84 |
| Angle of view | 64.70 | 46.02 | 30.54 |
| Image height | 3.84 | 3.84 | 3.84 |
| Total lens length | 33.93 | 35.63 | 38.89 |
| BF | 5.63 | 5.33 | 5.94 |
| d3 | 0.39 | 1.30 | 5.50 |
| d8 | 10.12 | 7.32 | 5.28 |
| d13 | 4.14 | 8.02 | 8.51 |
| d15 | 3.88 | 3.59 | 4.18 |

| | Point of change on the telephoto side | Telephoto |
|---|---|---|
| Focal length | 20.73 | 30.99 |
| F-NUMBER | 5.34 | 5.71 |
| Angle of view | 20.66 | 14.04 |
| Image height | 3.84 | 3.84 |
| Total lens length | 42.25 | 43.90 |
| BF | 5.19 | 5.02 |
| d3 | 8.66 | 11.15 |
| d8 | 3.72 | 1.40 |
| d13 | 11.02 | 12.66 |
| d15 | 3.44 | 3.25 |

Data on zoom lens groups

| Group | Starting surface | Focal length |
|---|---|---|
| 1 | 1 | 27.91 |
| 2 | 4 | −6.96 |
| 3 | 10 | 9.58 |
| 4 | 14 | 17.19 |

Numerical Example 4

Unit mm

Surface data

| Surface No. | r | d | nd | νd |
|---|---|---|---|---|
| 1 | 19.732 | 0.70 | 1.84666 | 23.78 |
| 2 | 13.986 | 3.34 | 1.58313 | 59.38 |
| 3 (Aspheric surface) | −45.780 | Variable | | |
| 4 (Aspheric surface) | −20.270 | 0.70 | 1.52542 | 55.78 |
| 5 (Aspheric surface) | 8.571 | 2.38 | | |
| 6 | −9.894 | 0.53 | 1.80400 | 46.57 |
| 7 | 29.964 | 1.35 | 1.92286 | 18.90 |
| 8 | −33.294 | Variable | | |
| 9 (Stop) | ∞ | 0.00 | | |
| 10 (Aspheric surface) | 4.723 | 2.50 | 1.58313 | 59.38 |
| 11 (Aspheric surface) | −13.496 | 0.50 | | |
| 12 | 6.692 | 1.30 | 1.92286 | 18.90 |
| 13 | 3.350 | Variable | | |
| 14 (Aspheric surface) | 33.603 | 1.99 | 1.80610 | 40.92 |
| 15 | −21.850 | Variable | | |
| 16 | ∞ | 0.50 | 1.51633 | 64.14 |
| 17 | ∞ | 0.50 | | |

-continued

Unit mm

| | | | | |
|---|---|---|---|---|
| 18 | ∞ | 0.50 | 1.51633 | 64.14 |
| 19 | ∞ | 0.59 | | |
| Image plane | ∞ | | | |

Aspheric Surface data

3rd surface

K = −7.057, A4 = 1.05631E−05, A6 = 2.58296E−07,
A8 = −7.15692E−09, A10 = 6.55564E−11

4th surface

K = −50.483, A4 = 5.03604E−04, A6 = −1.55886E−05,
A8 = 3.54867E−07, A10 = −3.55011E−09

5th surface

K = 0.508, A4 = 8.33489E−04, A6 = 1.33975E−05,
A8 = −2.05271E−06, A10 = 8.44310E−08

10th surface

K = −2.131, A4 = 1.32971E−03, A6 = −2.25779E−05,
A8 = 7.72276E−07, A10 = 1.86111E−09

11th surface

K = 6.891, A4 = 1.00237E−03, A6 = 5.07038E−06,
A8 = 4.73737E−07, A10 = 5.99148E−10

14th surface

K = −80.919, A4 = 3.55130E−04, A6 = 8.43817E−07,
A8 = −1.68853E−07, A10 = 3.23415E−09

Various data
Zoom ratio 4.80

| | Wide-angle | Point of change on the wide-angle side | Intermediate |
|---|---|---|---|
| Focal length | 6.45 | 9.28 | 13.86 |
| F-NUMBER | 3.80 | 4.70 | 5.00 |
| Angle of view | 64.46 | 46.60 | 30.76 |
| Image height | 3.84 | 3.84 | 3.84 |
| Total lens length | 35.26 | 36.79 | 39.65 |
| BF | 5.43 | 4.72 | 5.69 |
| d3 | 0.40 | 1.08 | 4.83 |
| d8 | 10.43 | 7.92 | 5.37 |
| d13 | 3.95 | 8.03 | 8.71 |
| d15 | 3.64 | 2.92 | 3.89 |

| | Point of change on the telephoto side | Telephoto |
|---|---|---|
| Focal length | 20.72 | 30.99 |
| F-NUMBER | 5.44 | 5.82 |
| Angle of view | 20.68 | 14.08 |
| Image height | 3.84 | 3.84 |
| Total lens length | 42.90 | 44.48 |
| BF | 4.96 | 5.05 |
| d3 | 8.26 | 10.73 |
| d8 | 3.84 | 1.40 |
| d13 | 10.80 | 12.26 |
| d15 | 3.16 | 3.25 |

Data on zoom lens groups

| Group | Starting surface | Focal length |
|---|---|---|
| 1 | 1 | 27.59 |
| 2 | 4 | −6.98 |
| 3 | 10 | 9.40 |
| 4 | 14 | 16.69 |

Numerical Example 5

Unit mm

Surface data

| Surface No. | r | d | nd | vd |
|---|---|---|---|---|
| 1 | 19.211 | 0.70 | 1.84666 | 23.78 |
| 2 | 13.442 | 3.13 | 1.58313 | 59.38 |
| 3 (Aspheric surface) | −46.093 | Variable | | |
| 4 (Aspheric surface) | −15.712 | 0.70 | 1.52542 | 55.78 |
| 5 (Aspheric surface) | 8.621 | 2.28 | | |
| 6 | −7.277 | 0.54 | 1.67003 | 47.23 |
| 7 | 33.920 | 1.23 | 1.92286 | 18.90 |
| 8 | −29.978 | Variable | | |
| 9 (Stop) | ∞ | 0.00 | | |
| 10 (Aspheric surface) | 5.354 | 2.50 | 1.58313 | 59.38 |
| 11 (Aspheric surface) | −9.544 | 0.50 | | |
| 12 | 6.757 | 1.33 | 1.92286 | 18.90 |
| 13 | 3.468 | Variable | | |
| 14 (Aspheric surface) | 20.341 | 2.45 | 1.52542 | 55.78 |
| 15 | −16.411 | Variable | | |
| 16 | ∞ | 0.50 | 1.51633 | 64.14 |
| 17 | ∞ | 0.50 | | |
| 18 | ∞ | 0.50 | 1.51633 | 64.14 |
| 19 | ∞ | 0.59 | | |
| Image plane | ∞ | | | |

Aspheric Surface data

3rd surface

K = −8.699, A4 = 1.05001E−05, A6 = 2.42963E−07,
A8 = −7.69542E−09, A10 = 7.49949E−11

4th surface

K = −69.107, A4 = 5.61318E−04, A6 = −5.30874E−06,
A8 = −2.51447E−11,
A10 = 5.53612E−10

5th surface

K = 0.582, A4 = 2.12517E−03, A6 = −9.16715E−05,
A8 = 6.17676E−06, A10 = −1.08110E−07

10th surface

K = −3.923, A4 = 1.44736E−03, A6 = −1.82223E−04,
A8 = 7.71523E−07, A10 = 9.49597E−10

11th surface

K = 7.044, A4 = 8.61437E−04, A6 = −3.74264E−05,
A8 = 4.81879E−07, A10 = 4.53288E−10

14th surface

K = −72.490, A4 = 1.08141E−03, A6 = −3.87140E−05,
A8 = 1.17932E−06, A10 = −1.71402E−08

Various data
Zoom ratio 4.81

| | Wide-angle | Point of change on the wide-angle side | Intermediate |
|---|---|---|---|
| Focal length | 6.45 | 9.27 | 13.88 |
| F-NUMBER | 3.79 | 4.79 | 5.17 |
| Angle of view | 64.78 | 47.08 | 31.14 |
| Image height | 3.84 | 3.84 | 3.84 |
| Total lens length | 33.04 | 35.49 | 38.77 |
| BF | 5.97 | 5.04 | 6.58 |
| d3 | 0.41 | 0.86 | 4.31 |
| d8 | 8.66 | 6.64 | 4.22 |
| d13 | 2.90 | 7.85 | 8.55 |
| d15 | 4.23 | 3.34 | 4.88 |

| | Point of change on the telephoto side | Telephoto |
|---|---|---|
| Focal length | 20.72 | 31.00 |
| F-NUMBER | 5.58 | 6.00 |
| Angle of view | 20.72 | 14.08 |

-continued

| Unit mm | | |
|---|---|---|
| Image height | 3.84 | 3.84 |
| Total lens length | 43.03 | 45.22 |
| BF | 5.07 | 5.06 |
| d3 | 8.42 | 10.94 |
| d8 | 3.41 | 1.40 |
| d13 | 11.03 | 12.71 |
| d15 | 3.35 | 3.36 |

Data on zoom lens groups

| Group | Starting surface | Focal length |
|---|---|---|
| 1 | 1 | 27.31 |
| 2 | 4 | −6.44 |
| 3 | 10 | 9.04 |
| 4 | 14 | 17.69 |

Numerical Example 6

Unit mm

Surface data

| Surface No. | r | d | nd | νd |
|---|---|---|---|---|
| 1 | 20.184 | 0.90 | 1.84666 | 23.78 |
| 2 | 14.448 | 2.80 | 1.72916 | 54.68 |
| 3 | 1073.037 | Variable | | |
| 4 | 427.844 | 0.80 | 1.88300 | 40.76 |
| 5 | 4.572 | 2.24 | | |
| 6 (Aspheric surface) | −39.093 | 0.50 | 1.52542 | 55.78 |
| 7 (Aspheric surface) | 14.533 | 0.10 | | |
| 8 | 10.744 | 1.27 | 1.94595 | 17.98 |
| 9 | 48.064 | Variable | | |
| 10 (Stop) | ∞ | −0.30 | | |
| 11 (Aspheric surface) | 4.104 | 2.18 | 1.49700 | 81.61 |
| 12 (Aspheric surface) | −13.761 | 0.10 | | |
| 13 | 6.192 | 1.22 | 2.10225 | 16.80 |
| 14 (Aspheric surface) | 3.854 | Variable | | |
| 15 | 10.500 | 1.80 | 1.52542 | 55.78 |
| 16 | 110.541 | Variable | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.50 | | |
| Image plane | ∞ | | | |

Aspheric Surface data

6th surface

K = −60.536, A4 = −6.40505E−04, A6 = 3.95672E−05,
A8 = −1.36935E−06
K = 0.000, A4 = −1.03560E−03, A6 = 3.59861E−05,
A8 = −2.60735E−06

11th surface

K = −0.520, A4 = −4.04394E−04, A6 = −3.22695E−05

12th surface

K = 0.000, A4 = −3.22817E−04, A6 = 2.06984E−05

14th surface

K = −0.840, A4 = 3.45125E−03, A6 = 1.54943E−04,
A8 = 1.54344E−05

Various data
Zoom ratio 4.84

| | Wide-angle | Point of change on the wide-angle side | Intermediate |
|---|---|---|---|
| Focal length | 5.07 | 7.34 | 10.99 |
| F-NUMBER | 3.30 | 3.68 | 4.15 |

-continued

| Unit mm | | | |
|---|---|---|---|
| Angle of view | 81.92 | 57.12 | 38.36 |
| Image height | 3.84 | 3.84 | 3.84 |
| Total lens length | 34.43 | 33.97 | 37.00 |
| BF | 4.25 | 5.89 | 6.74 |
| d3 | 0.30 | 2.05 | 5.14 |
| d9 | 11.00 | 7.12 | 4.79 |
| d14 | 5.28 | 5.31 | 6.71 |
| d16 | 2.59 | 4.23 | 5.08 |

| | Point of change on the telephoto side | Telephoto |
|---|---|---|
| Focal length | 16.41 | 24.56 |
| F-NUMBER | 4.83 | 5.81 |
| Angle of view | 25.84 | 17.55 |
| Image height | 3.84 | 3.84 |
| Total lens length | 41.76 | 46.65 |
| BF | 6.10 | 6.29 |
| d3 | 8.11 | 9.87 |
| d9 | 3.44 | 1.80 |
| d14 | 10.50 | 15.08 |
| d16 | 4.45 | 4.64 |

Data on zoom lens groups

| Group | Starting surface | Focal length |
|---|---|---|
| 1 | 1 | 29.98 |
| 2 | 4 | −6.17 |
| 3 | 11 | 8.90 |
| 4 | 15 | 21.95 |

FIGS. 7 to 18 are aberration diagrams for Examples 1 to 6 upon focusing on an object point at infinity. In these aberration diagrams, there are shown spherical aberrations, astigmatisms, distortions and chromatic aberrations of magnification (a) at the wide-angle end, (b) at the point of change on the wide-angle side, (c) in an intermediate state, (d) at the point of change on the telephoto side, and (e) at the telephoto end. Note here that FIY is indicative of a half angle of view.

Set out below are the values of conditions (1) to (12) in Examples 1 to 6.

| Condition | Example 1 | Example 2 | Example 3 | Example 4 | Example 5 | Example 6 |
|---|---|---|---|---|---|---|
| (A) | 1.525 | 1.525 | 1.525 | 1.525 | 1.525 | 1.525 |
| (B) | 0.262 | 0.555 | 0.345 | 0.406 | 0.291 | — |
| (B') | — | — | — | — | — | 0.458 |
| (C) | 0.150 | 0.143 | 0.149 | 0.141 | 0.147 | — |
| (C') | — | — | — | — | — | 0.102 |
| (D) | 0.098 | −0.049 | −0.109 | −0.072 | 0.085 | — |
| (E) | 0.092 | 0.358 | 0.216 | 0.279 | 0.145 | — |
| (F) | — | — | — | — | — | −0.791 |
| (G) | — | — | — | — | — | 0.358 |
| (1) | 1.943 | 1.639 | 1.542 | 1.428 | 1.894 | 2.413 |
| (2) | 1.392 | 1.260 | 1.226 | 1.227 | 1.387 | 2.341 |
| (3) | 35.52 | 28.86 | 35.60 | 35.60 | 35.60 | 30.900 |
| (4) | 33.895 | 29.370 | 35.310 | 32.275 | 32.605 | 30.285 |
| (5) | 0.964 | 0.763 | 0.775 | 0.979 | 0.972 | 1.309 |
| (6) | −0.280 | −0.725 | −0.538 | −0.481 | −0.281 | −0.541 |
| (7) | 3.024 | 2.588 | 1.786 | 3.005 | 3.109 | 4.297 |
| (8) | 18.90 | 18.90 | 27.03 | 18.90 | 18.90 | 16.800 |
| (9) | 40.40 | 21.61 | 32.35 | 40.48 | 40.48 | 64.810 |
| (10) | 0.286 | 0.315 | 0.309 | 0.303 | 0.292 | 0.362 |
| (11) | 0.561 | 0.528 | 0.554 | 0.539 | 0.571 | 0.893 |
| (12) | 4.841 | 4.805 | 4.805 | 4.802 | 4.805 | 4.850 |

Examples 1 to 6 may be modified as follows.

To cut off unwanted light such as ghosts and flares, it is acceptable to locate a flare stop other than the aperture stop S. That flare stop may then be located somewhere on the object side of the first lens group G1, between the first lens group G1 and the second lens group G2, between the second lens group G2 and the third lens group G3, between the third lens group G3 and the fourth lens group G4, and between the fourth lens group G4 and the image plane I. A frame member or other member may also be located to cut off flare rays. For that purpose, the optical system may be directly printed, coated or sealed in any desired shape inclusive of round, oval, rectangular, polygonal shapes or a shape delimited by a function curve. Further, just only a harmful light beam but also coma flares around the screen may be cut off.

Each lens may be applied with an antireflection coating to reduce ghosts and flares. A multicoating is then desired because of being capable of effectively reducing ghosts and flares. Each lens, a cover glass or the like may just as well be applied thereof with an infrared cut coating.

Desirously, focusing for the adjusting the focus is implemented with the fourth lens group G4. Focusing with the fourth lens group G4 eases off loads on a motor because there is a light lens weight, and works for making the lens barrel compact because there is none of the change in the total length during zooming, and a drive motor is mounted in the lens barrel. As noted just above, it is desired that focusing for adjusting the focus is implemented with the fourth lens group G4; however, it may be implemented with the first lens group G1, the second lens group G2 or the third lens group G3, or by the movement of multiple lens groups. Moreover, focusing may be implemented by letting out the whole lens system or letting out or in some lenses in the groups.

The shading of brightness at the peripheral position of an image may be reduced by shifting the microlenses of a CCD. For instance, the CCD microlens design may be modified in conformity with the angle of incidence of light rays at each image height, or decreases in the quantity of light at the peripheral position of the image may be corrected by image processing.

It is also acceptable to intentionally produce distortion at the optical system so as to correct image distortion by implementing electrical processing after taking operation.

Figure 19:
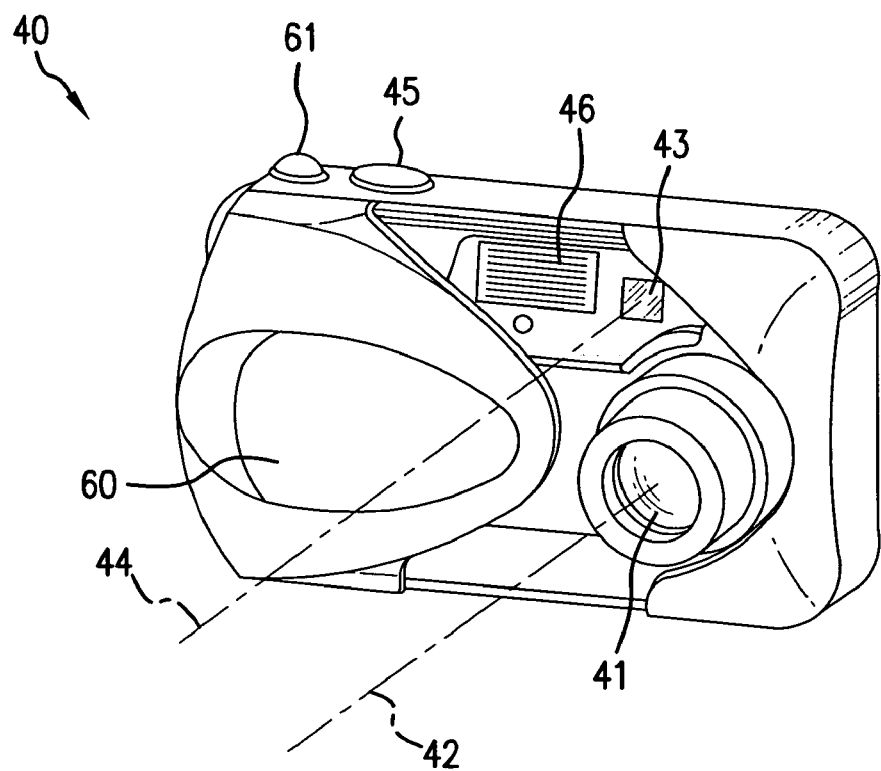
FIG. 19 is a front perspective view of the outside shape of the inventive digital camera.
Figure 20:
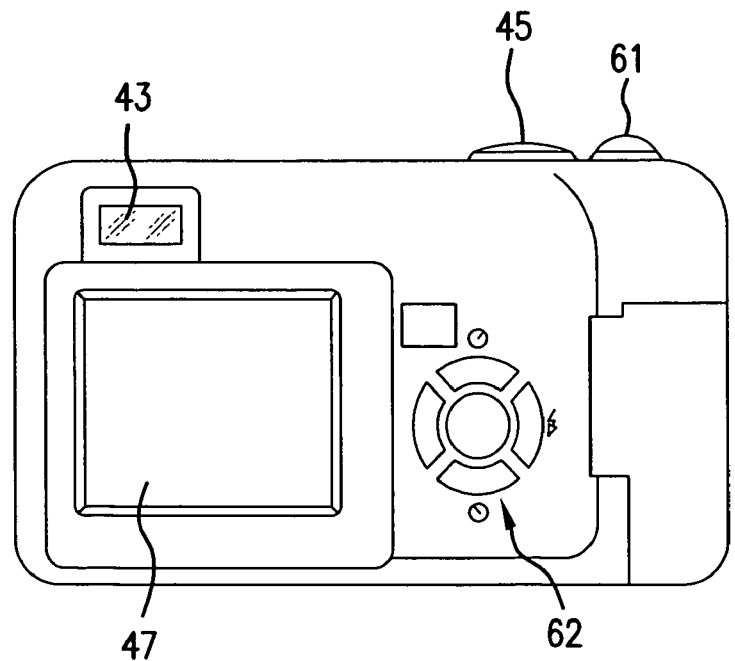
FIG. 20 is a rear perspective view of the digital camera of FIG. 19.
Figure 21:
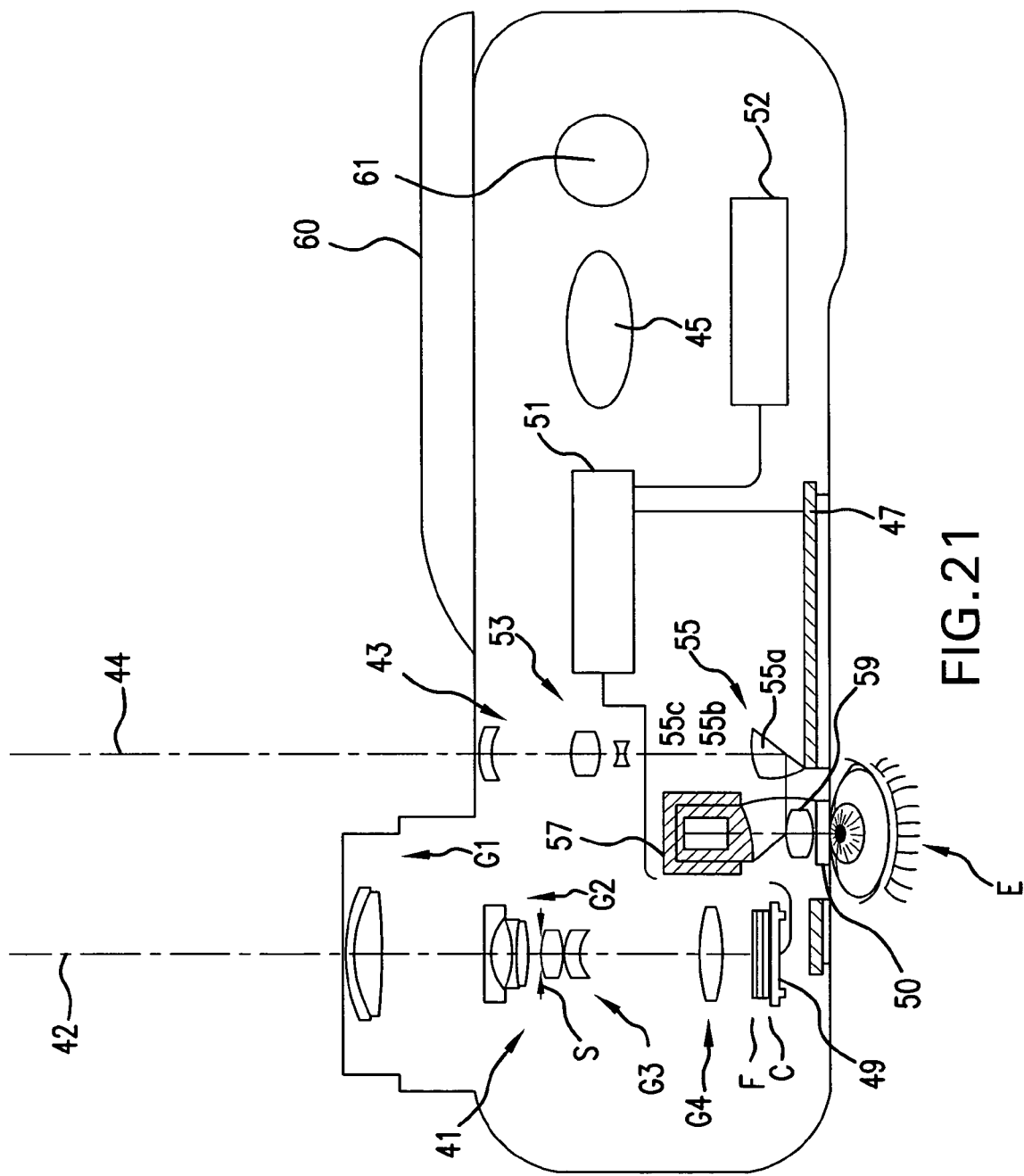
FIG. 21 is a sectional view of the digital camera of FIG. 19.

FIGS. 19, 20 and 21 are conceptual illustrations of a digital camera, in which such an inventive zoom lens as described above is incorporated in a taking optical system 41. FIG. 19 is a front perspective view of the outside shape of a digital camera 40; FIG. 20 is a rear perspective view of the same; and FIG. 21 is a schematic sectional view of the setup of the digital camera 40. However, FIGS. 19 and 21 show the taking optical system 41 in operation. In the embodiment here, the digital camera 40 comprises a taking optical system 41 positioned on a taking optical path 42, a finder optical system 43 positioned on a finder optical path 44, a shutter button 45, a flash 46, a liquid crystal display monitor 47, a focal length change button 61, a mode select switch 62, and so on. With the taking optical system 41 received at a lens mount, a cover 60 is slid over the taking optical system 41, finder optical system 43 and flash 46. And, as the cover 60 is slid open to place the camera 40 in operation, the taking optical system 41 is let out, as in FIG. 21. As the shutter button 45 mounted on the upper portion of the camera 40 is pressed down, it causes an image to be taken through the taking optical system 41, for instance, the zoom optical of Example 1. An object image formed by the taking optical system 41 is formed on the imaging plane (photoelectric plane) of CCD 49 via a low-pass filter F with a wavelength limiting coating applied on it and a cover glass C. An object image received at CCD 49 is shown as an electronic image on the liquid crystal display monitor 47 via processing means 51, which monitor is mounted on the back of the camera. This processing means 51 is connected with recording means 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera could also be constructed in the form of a silver-halide camera using a silver-halide film in place of CCD 49.

Moreover, a finder objective optical system 53 is located on the finder optical path 44. The finder objective optical system 53 comprises a zoom optical system which is made up of a plurality of lens groups (three in FIGS. 19-21) and an erecting prism system 55 composed of erecting prisms 55a, 55b and 55c, and whose focal length varies in association with the zoom optical system that is the taking optical system 41. An object image formed by the finder objective optical system 53 is in turn formed on the field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

Figure 22:
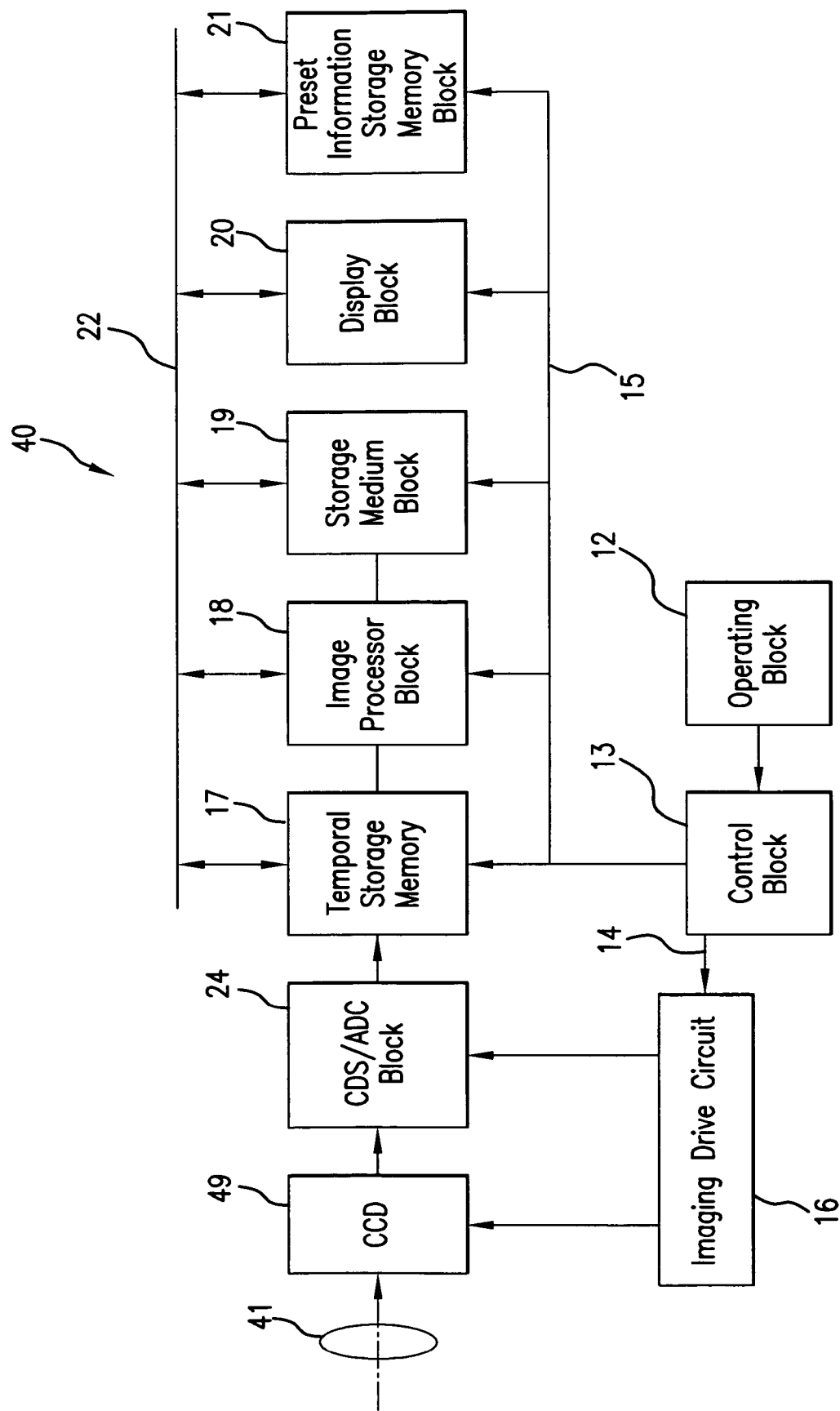
FIG. 22 is a component block diagram for internal circuits in the main part of the digital camera of FIG. 19.

FIG. 22 is a block diagram for the internal circuits of the main part of the aforesaid digital camera 40. In the following explanation, the aforesaid processing means 51 comprises, for instance, a CDS/ADC block 24, a temporal storage memory block 17, an image processor block 18 and so on, and the storage means 52 comprises, for instance, a storage medium block 19 and so on.

As shown in FIG. 22, the digital camera 40 is built up of an operating block 12, a control block 13 connected to the operating block 12 and an imaging drive circuit 16 connected to the control signal output port of the control block 13 via buses 14 and 15 as well as a temporal storage memory block 17, an image processor block 18, a storage medium block 19, a display block 20 and a preset information storage memory block 21.

Data may be entered in or produced out of the aforesaid temporal storage memory block 17, image processor block 18, storage medium block 19, display block 20 and preset information storage memory block 21 via a bus 22, and the imaging drive circuit 16 is connected with CCD 49 and CDS/ADC block 24.

The operating block 12 comprising various input buttons and switches is a circuit through which event information entered from outside (a camera operator) via such input buttons and switches is notified to the control block. The control block 13 is a central processor comprising a CPU as an example: it is a circuit that, according to a program loaded in a program memory (not shown) stored therein, puts the whole digital camera 40 under control in response to the instruction and order entered by the camera operator via the operating block 12.

The CCD 49 receives an object image formed through the inventive taking optical system 41. The CCD 49 is an imaging device that is driven and controlled by the imaging drive circuit 16 to convert the quantity of light of that object image for each pixel into an electric signal and produce it to the CDS/ADC block 24.

The CDS/ADC block 24 is a circuit that amplifies an electric signal entered from CCD 49 and subjects it to analog/digital conversion to produce image raw data (Bayer data:

hereinafter called RAW data) only subjected to such amplification and digital conversion to the temporal storage memory 17.

The temporal storage memory 17 is a buffer comprising SDRAM for instance: it is a memory device that temporarily stores the aforesaid RAW data produced out of the CDS/ADC block 24. The image processor block 18 is a circuit that reads the RAW data stored in the temporal storage memory 17 or the RAW data stored in the storage medium 19 to implement a variety of image processing including distortion correction on the basis of an image quality parameter designated from the control block 13.

The recording medium block 19 is a control circuit that detachably receives a card type or stick type recording medium comprising, for instance, a flash memory or the like so that the RAW data transferred from the temporal storage memory 17 or the image data subjected to image processing at the image processor block 18 are recorded and loaded in the card type or stick type flash memory.

The display block 20 is a circuit that comprises a liquid crystal display monitor 47 to display images, menus or the like on that liquid crystal display monitor 47. The preset information storage memory block 21 comprises a ROM block having various image quality parameters previously loaded in it and a RAM block in which an image quality parameter selected by input operation at the operating block 12 from the image quality parameters read out of that ROM block is stored. The preset information storage memory block 21 is a circuit that puts inputs in and outputs from those memories under control.

With the thus constructed digital camera 40, it is possible to achieve high performance, size reductions and a wide-angle arrangement, because the taking optical system 41 incorporated in it has high zoom capabilities and extremely stable imaging capabilities all over the zoom range, albeit having a sufficient wide-angle arrangement and compact construction. And faster focusing operation is achievable on the wide-angle and telephoto sides.

The present invention may be applied to just only the so-called compact digital camera adapted to take pictures of general subjects but also surveillance cameras required to have wide angles of view and lens interchangeable type cameras.

What we claim is:

1. A zoom lens comprising, in order from an object side thereof,
    a first lens group having positive refracting power,
    a second lens group having negative refracting power,
    a third lens group having positive refracting power,
    a fourth lens group having positive refracting power, and
    an aperture stop located on an object side of said third lens group for determining an axial light beam, wherein:
    at least said first lens group and said third lens group move to implement zooming from a wide-angle end to a telephoto end of the zoom lens,
    in a state at said telephoto end vs. a state at said wide-angle end,
    said first lens group, said third lens group and said aperture stop are positioned on the object side,
    a spacing sandwiched between said first lens group and said second lens group grows wide,
    a spacing sandwiched between said second lens group and said third lens group becomes narrow,
    a spacing sandwiched between said third lens group and said fourth lens group grows wide,
    said first lens group consists of two lenses: one positive lens element and one negative lens element,
    said second lens group consists of three lenses: one positive lens element and two negative lens elements,
    said third lens group consists of two lenses: one positive lens element and one negative lens element,
    said fourth lens group consists of one lens: one positive lens element,
    said third lens group consists of, in order from the object side, one positive lens element and a negative lens element,
    said positive lens in said third lens group is a double-convex positive lens having convex surfaces on both sides, and
    said negative lens in said third lens group is a meniscus lens convex on its object side and concave on its image side.

2. The zoom lens according to claim 1, wherein said first lens group satisfies the following condition:

$$0.3 < \Delta 1G/fw < 3.0 \quad (1)$$

where $\Delta 1G$ is a difference in the position of the first lens group between at the wide-angle end and at the telephoto end, and fw is the focal length of the whole zoom lens system at the wide-angle end.

3. The zoom lens according to claim 1, wherein said third lens group satisfies the following condition:

$$0.3 < \Delta 3G/fw < 2.5 \quad (2)$$

where $\Delta 3G$ is a difference in the position of the third lens group between at the wide-angle end and at the telephoto end, and fw is the focal length of the whole zoom lens system at the wide-angle end.

4. The zoom lens according to claim 1, wherein upon zooming from said wide-angle end to said telephoto end, said second lens group and said fourth lens group move.

5. The zoom lens according to claim 1, wherein said fourth lens group is positioned more on the image side in a state at said telephoto end than in a state at said wide-angle end.

6. The zoom lens according to claim 1, wherein upon zooming from aid wide-angle end to said telephoto end, said aperture stop moves in unison with said third lens group.

7. The zoom lens according to claim 1, wherein:
    said first lens group consists of, in order from the object side, a negative lens element and a positive lens element,
    said negative lens in said first lens group has an image-side surface that is larger in the absolute value of paraxial curvature than an object-side surface, and
    said positive lens in said first lens group has an object-side surface that is larger in the absolute value of paraxial curvature than an image-side surface.

8. The zoom lens according to claim 1, wherein said negative lens and said positive lens in said first lens group satisfy the following condition:

$$20 < v1p - v1n < 60 \quad (3)$$

where v1n is the Abbe constant of the negative lens in the first lens group, and v1p is the Abbe constant of the positive lens in the first lens group.

9. The zoom lens according to claim 1, wherein:
    said second lens group consists of, in order from the object side, a negative lens element having a concave image-side surface, a negative lens element having a concave object-side surface and a positive lens element, and
    the object-side negative lens in said second lens group has an aspheric surface.

10. The zoom lens according to claim 1, wherein said two negative lens and said positive lens in said second lens group satisfy the following condition:

$$20 < (v2n1 + v2n2)/2 - v2p < 60 \quad (4)$$

where n2n1 is the Abbe constant of the object-side negative lens in the second lens group, ν2n2 is the Abbe constant of the image-side negative lens in the second lens group, and ν2p is the Abbe constant of the positive lens in the second lens group.

11. The zoom lens according to claim 1, wherein a refracting surface located in, and nearest the image side of, said first lens group is a convex surface that is convex on the image side on an optical axis, and a refracting surface located in, and nearest to the object side of, said second lens group is a concave surface that is concave on the object side on an optical axis.

12. The zoom lens according to claim 1, wherein a lens located in, and nearest to the object side of, said second lens group is a double-concave negative lens that is of double-concave shape on an optical axis, wherein said double-concave negative lens has an object-side surface shape defined by an aspheric surface having negative refracting power decreasing with a distance from an optical axis.

13. The zoom lens according to claim 1, wherein said positive lens in the said third lens group satisfies the following condition:

$$0.3 < f3p/fw < 2.0 \quad (5)$$

where f3p is the focal length of the positive lens in the third lens group, and fw is the focal length of the whole zoom lens system at the wide-angle end.

14. The zoom lens according to claim 1, wherein the object- and image-side surfaces of said positive lens in said third lens group are both aspheric surfaces.

15. The zoom lens according to claim 1, wherein said positive lens in said third lens group satisfies the following condition:

$$-1 < (R3pf+R3pr)/(R3pf-R3pr) < -0.05 \quad (6)$$

where R3pf is the paraxial radius of curvature of the object-side surface of the positive lens in the third lens group, and R3pr is the paraxial radius of curvature of the image-side surface of the positive lens in the third lens group.

16. The zoom lens according to claim 1, wherein said negative lens in said third lens group satisfies the following condition:

$$1.05 < (R3nf+R3nr)/(R3nf-R3nr) < 9 \quad (7)$$

where R3nf is the paraxial radius of curvature of the object-side surface of the negative lens in the third lens group, and R3nr is the paraxial radius of curvature of the image-side surface of the negative lens in the third lens group.

17. The zoom lens according to claim 1, wherein said negative lens in said third lens group satisfies the following condition:

$$15 < \nu 3n < 40 \quad (8)$$

where ν3n is the Abbe constant of the negative lens in the third lens group.

18. The zoom lens according to claim 1, wherein said positive lens in said third lens group satisfies the following condition:

$$10 < \nu 3p - \nu 3n < 70 \quad (9)$$

where ν3p is the Abbe constant of the positive lens in the third lens group, and ν3n is the Abbe constant of the negative lens in the third lens group.

19. The zoom lens according to claim 1, wherein said third lens group satisfies the following condition:

$$0.1 < f3/ft < 0.5 \quad (10)$$

where f3 is the focal length of the third lens group, and ft is the focal length of the whole zoom lens system at the telephoto end.

20. The zoom lens according to claim 1, wherein said fourth lens group comprises a double-convex positive lens having an aspheric surface.

21. The zoom lens according to claim 1, wherein said fourth lens group moves toward the object side for focusing from an far object to a nearby object.

22. The zoom lens according to claim 1, wherein said fourth lens group satisfies the following condition:

$$0.1 < f4/ft < 2.0 \quad (11)$$

where f4 is the focal length of the fourth lens group, and ft is the focal length of the whole zoom lens system at the telephoto end.

23. The zoom lens according to claim 1, which satisfies the following condition:

$$3.5 < ft/fw \quad (12)$$

where fw is the focal length of the whole zoom lens system at the wide-angle end, and ft is the focal length of the whole zoom lens system at the telephoto end.

24. A zoom lens comprising, in order from an object side thereof, a first lens group having positive refracting power, a second lens group having negative refracting power, a third lens group having positive refracting power and a fourth lens group having positive refracting power, wherein:
upon zooming from a wide-angle end to a telephoto end of the zoom lens, a spacing between said first lens group and said second lens group grows wide, a spacing between said second lens group and said third lens group becomes narrow, and a spacing between said third lens group and said fourth lens group changes,
said second lens group comprises a plastic double-concave negative lens element and a positive lens element located more on the image side than that, and
said second lens group satisfies the following condition:

$$1.45 < N_{2n} < 0.70 \quad (A)$$

where $N_{2n}$ is the d-line refractive index of said plastic double-concave negative lens in the second lens group.

25. The zoom lens according to claim 24, wherein said plastic double-concave negative lens is a lens located in, and nearest to the object side of, said second lens group.

26. The zoom lens according to claim 25, wherein said plastic double-concave negative lens is of shape that satisfies the following condition:

$$0.1 < SF_{2n} < 0.9 \quad (B)$$

where $SF_{2n} = (R_{2f}+R_{2r})/(R_{2f}-R_{2r})$ where $R_{2f}$ is the paraxial radius of curvature of the object-side surface of said plastic double-concave negative lens, and $R_{2r}$ is the paraxial radius of curvature of the image-side surface of said plastic double-concave negative lens.

27. The zoom lens according to claim 25, wherein the object-side surface of the plastic double-concave negative lens in said second lens group is an aspheric-surface having negative refracting power decreasing with a distance from an optical axis.

28. The zoom lens according to claim 27, wherein the image-side surface of the plastic double-concave negative lens in said second lens group is an aspheric surface.

29. The zoom lens according to claim 24, wherein said plastic double-concave negative lens satisfies the following condition:

$$0.10 < D_{2n}/D_{2G} < 0.18 \quad (C)$$

where $D_{2n}$ is the axial thickness of said plastic double-concave negative lens, and $D_{2G}$ is the axial thickness of said second lens group.

30. The zoom lens according to claim 25, wherein said second lens group comprises a negative lens located more on the image side than said plastic double-concave negative lens.

31. The zoom lens according to claim 25, wherein said second lens group consists of three lenses: in order from the object side to the image side, said plastic double-concave negative lens element, said negative lens and said positive lens.

32. The zoom lens according to claim 31, wherein said second lens group satisfies the following condition:

$$-0.18 < SF_{G2n} < 0.18 \tag{D}$$

where $SF_{G2n} = (R_{2r}+R_{3f})/(R_{2r}-R_{3f})$ where $R_{2r}$ is the paraxial radius of curvature of the image-side surface of said plastic double-concave negative lens, and $R_{3f}$ is the paraxial radius of curvature of the object-side surface of the aforesaid negative lens located more on the image side than said double-concave negative lens.

33. The zoom lens according to claim 31, wherein said negative lens located on said plastic double-concave negative lens is a glass lens concave on the object side, and satisfies the following condition:

$$0.09 < N_{3n} - N_{2n} < 0.6 \tag{E}$$

where $N_{3n}$ is the d-line refractive index of the negative lens on the image side of the aforesaid plastic double-concave negative lens in the second lens group.

34. The zoom lens according to claim 24, wherein said second lens group comprises a negative lens element located nearest to the object side, wherein said plastic double-concave negative lens element is located more on the image side than said negative lens element located, nearest to the object side.

35. The zoom lens according to claim 34, wherein said plastic double-concave negative lens is of shape that satisfies the following condition:

$$-0.5 < SF_{2n} < 0.9 \tag{B'}$$

where $SF_{2n} = (R_2f+R_{2r})/(R_{2f}-R_{2r})$ where R2f is the paraxial radius of curvature of the object-side surface of said plastic double-concave negative lens, and R2r is the paraxial radius of curvature of the image-side surface of said plastic double-concave negative lens.

36. The zoom lens according to claim 34, wherein the plastic double-concave negative lens in said second lens group is an aspheric lens.

37. The zoom lens according to claim 36, wherein the plastic double-concave negative lens in said second lens group is a lens having aspheric surfaces on both sides.

38. The zoom lens according to claim 34, wherein said plastic double-concave negative lens satisfies the following condition:

$$0.06 < D_{2n}/D_{2G} < 0.18 \tag{C'}$$

where $D_{2n}$ is the axial thickness of said plastic double-concave negative lens, and $D_{2G}$ is the axial thickness of said second lens group.

39. The zoom lens according to claim 34, wherein said second lens group consists of three lenses: in order from the object side to the image side, said negative lens element located nearest to the object side, said plastic double-concave negative lens element and said positive lens element.

40. The zoom lens according to claim 34, wherein said negative lens located in, and nearest to the object side of, said second lens group is a glass lens, and said second lens group satisfies the following condition:

$$-0.97 < SF_{G2n'} < -0.05 \tag{F}$$

where $SF_{G2n'} = (R_{1r}+R_{2f})/(R_{1r}-R_{2f})$ where $R_{1r}$ is the paraxial radius of curvature of the image-side surface of said negative lens located more on the object side than the aforesaid double-concave negative lens, and $R_{2f}$ is the paraxial radius of curvature of the object-side surface of said plastic double-concave negative lens.

41. The zoom lens according to claim 39, wherein said negative lens located on the object side of said plastic double-concave negative lens is a glass lens concave on the image side, and satisfies the following condition:

$$0.09 < N_{1n} - N_{2n} < 0.6 \tag{G}$$

where $N_{1n}$ is the d-line refractive index of the negative lens on the object side of said plastic double-concave negative lens in the second lens group.

42. An imaging apparatus, comprising a zoom lens as recited in claim 1, and an imaging device located on an image side of said zoom lens and adapted to convert an image formed by said zoom lens into an electrical signal.

43. An imaging apparatus, comprising a zoom lens as recited in claim 24, and an imaging device located on an image side of said zoom lens and adapted to convert an image formed by said zoom lens into an electrical signal.

* * * * *